(12) United States Patent
Fujimaki

(10) Patent No.: US 7,351,773 B2
(45) Date of Patent: Apr. 1, 2008

(54) POLYMERIZABLE COMPOSITION

(75) Inventor: Kazuhiro Fujimaki, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 220 days.

(21) Appl. No.: 10/902,097

(22) Filed: Jul. 30, 2004

(65) Prior Publication Data

US 2005/0023508 A1 Feb. 3, 2005

(30) Foreign Application Priority Data

Jul. 31, 2003 (JP) ............... P.2003-284336
Jul. 31, 2003 (JP) ............... P.2003-284337

(51) Int. Cl.
*C08F 20/00* (2006.01)
*G03C 1/00* (2006.01)

(52) U.S. Cl. ............... 525/437; 430/270.1; 430/281.1; 430/287.1

(58) Field of Classification Search ............... 525/437; 430/270.1, 287.1, 281.1
See application file for complete search history.

(56) References Cited

U.S. PATENT DOCUMENTS

| 4,421,841 A * | 12/1983 | Shimizu et al. ......... 430/285.1 |
| 4,567,237 A * | 1/1986 | Johnson et al. ......... 525/170 |
| 4,708,925 A * | 11/1987 | Newman ............... 430/270.1 |
| 5,976,744 A * | 11/1999 | Fuller et al. ............. 430/58.8 |
| 6,410,611 B1 * | 6/2002 | Sakurai et al. ........... 522/103 |
| 7,052,822 B2 * | 5/2006 | Goto ..................... 430/283.1 |
| 2002/0015911 A1 * | 2/2002 | Nakamura ............. 430/270.1 |
| 2003/0129524 A1 * | 7/2003 | Yanaka ................... 430/157 |
| 2003/0215745 A1 * | 11/2003 | Fujimaki ................ 430/280.1 |

FOREIGN PATENT DOCUMENTS

| JP | 8-276558 A | 10/1996 |
| JP | 10-115914 A | 5/1998 |
| JP | 2001-242612 A | 9/2001 |
| JP | 2001-312062 A | 11/2001 |
| JP | 2002-62648 A | 2/2002 |

* cited by examiner

*Primary Examiner*—Randy Gulakowski
*Assistant Examiner*—Alicia M. Toscano
(74) *Attorney, Agent, or Firm*—Sughrue Mion, PLLC

(57) ABSTRACT

A polymerizable composition comprising (A) a resin selected from the group consisting of a polyamide resin which is soluble or swells in water or aqueous alkali solutions and a polyester resin which is soluble or swells in water or aqueous alkali solutions, (B) an infrared absorber, (C) a radical polymerization initiator, and (D) a radical-polymerizable compound.

12 Claims, No Drawings

POLYMERIZABLE COMPOSITION

FIELD OF THE INVENTION

The present invention relates to a polymerizable composition for use in image-recording materials in applications such as three-dimensional optical shaping, holography, lithographic printing plates, color proofs, photoresists, and color filters and in inks, coating materials, adhesives, and the like. More particularly, the invention relates to a polymerizable composition suitable for use as the recording layer of a negative type lithographic printing plate precursor of the so-called direct platemaking type, from which a printing plate can be directly obtained with an infrared laser based on digital signals from, e.g., a computer.

BACKGROUND OF THE INVENTION

Remarkable progress in lasers have been made in recent years. In particular, solid lasers and semiconductor lasers which emit infrared rays having a wavelength of 760-1,200 nm (hereinafter often referred to as "infrared lasers") have come to be easily available as high-output small apparatus. Especially in the field of lithography, these infrared lasers are exceedingly useful as recording light sources in direct platemaking based on digital data from, e.g., a computer. With the progress of lasers, various investigations are being made on image-recording materials sensitive to such various laser lights. A positive type recording material (see U.S. Pat. No. 4,708,925) and a negative type recording material crosslinking with an acid catalyst (see JP-A-8-276558) are known which are sensitive to a light having a wavelength of 760 nm or longer and are usable with an infrared laser.

A negative type image-recording material in which recording is possible with exposure to infrared rays (infrared-sensitive recording material) generally comprises an infrared absorber which absorbs the energy of infrared light and converts it into heat, a radical polymerization initiator which generates radicals by the action of the heat produced by the infrared absorber, and a radical-polymerizable compound which polymerizes with the aid of the radicals generated as an initiator. In lithographic printing plate precursors employing this recording material, recording is conducted by a mechanism in which the polymerization reaction of the radical-polymerizable compound occurs and proceeds to thereby cure exposed areas of the recording layer (image-recording material) and thus form an image. In particular, a lithographic printing plate precursor having a photopolymerizable recording layer containing a binder polymer soluble in alkaline developing solutions besides the ingredients shown above has advantages of excellent productivity, ease of development, satisfactory resolution, and satisfactory ink receptivity and, hence, can give a printing plate having desirable printing performances.

Known as the infrared-sensitive recording material utilizing a radical polymerization reaction is one containing a resin having amide groups in side chains as a binder polymer. However, this recording material is insufficient in printing durability (see JP-A-2001-242612). Furthermore, one containing a vinyl resin having (meth)acryloyl groups in side chains as a binder polymer is insufficient in sensitivity and printing durability (see JP-A-2002-62648), while one containing a polyurethane resin as a binder polymer has had problems of, e.g., insufficient removability of nonimage areas in development (see JP-A-2001-312062).

On the other hand, examples of infrared-sensitive recording materials which are cured by a reaction mechanism other than radical polymerization include an infrared-sensitive recording material comprising a polyazide photoinitiator, an infrared-absorbing dye, and a polyamide resin containing carboxy groups in side chains as a binder polymer. However, this recording material failed to give an excellent cured film through exposure and has been insufficient in both of sensitivity and printing durability (see JP-A-10-115914).

SUMMARY OF THE INVENTION

An object of the invention, which has been achieved in view of the drawbacks of related-art techniques described above, is to provide a polymerizable composition useful as the image-recording layer of a negative type lithographic printing plate precursor excellent in printing durability and storage stability.

As a result of intensive investigations, the present inventors have found that the object can be accomplished when a polyamide resin which is soluble or swells in water or aqueous alkali solutions is used as a component of a polymerizable composition. The invention has been completed based on this finding.

The invention provides a polymerizable composition comprising (A) a polyamide resin which is soluble or swells in water or aqueous alkali solutions (a first embodiment of the invention) or a polyester resin which is soluble or swells in water or aqueous alkali solutions (a second embodiment of the invention), (B) an infrared absorber, (C) a radical polymerization initiator, and (D) a radical-polymerizable compound.

In a preferred embodiment of the composition of the invention, the polyamide resin or the polyester resin (A) which is soluble or swells in water or aqueous alkali solutions has carbon-carbon unsaturated bonds in side chains or the main chain thereof.

Although the mechanisms by which the first embodiment of the invention produces its effects have not been elucidated, the following is presumed. The polyamide resin (A) which is soluble or swells in water or aqueous alkali solutions (hereinafter often referred to as "specific polyamide resin") contained in the polymerizable composition of the first embodiment of the invention has excellent film-forming properties. Because of this, the polymerizable composition gives a coating film having a reduced dissolved-oxygen amount. In general, large amounts of oxygen dissolved in films have posed a problem that radical deactivation by oxygen is apt to occur and a sufficient amount of radicals are not supplied for the reaction of the polymerizable compound, resulting in an insufficient curing reaction. In the first embodiment of the invention, the reduction in dissolved-oxygen amount effectively inhibits polymerization inhibition by oxygen and the radicals generated by exposure efficiently act on the polymerizable group of the radical polymerizable compound, which has a low molecular weight and is highly movable, and on the carbon-carbon unsaturated bonds present in side chains of the specific polyamide resin to cause polymerization reactions to occur and proceed. The composition of the first embodiment of the invention is presumed to be capable of thus forming a coating film which has been cured to a high degree.

Furthermore, the specific polyamide resin (A) has satisfactory compatibility with (meth)acrylic esters, which are radical-polymerizable compounds having highly excellent sensitivity. Because of this, the radical-polymerizable compound in the polymerizable composition is evenly dispersed without aggregating and this compound in the matrix is present close to the infrared absorber and the radical polymerization initiator. Consequently, the heat energy and radicals generated by exposure efficiently act on the polymerizable compound and accelerate the polymerization reaction. As a result, the film in the cured areas has excellent properties and an elevated crosslink density, and is hence effectively inhibited from suffering infiltration of an alkaline developing solution during development. It is thought that for the reasons described above, lithographic printing plate precursors employing the polymerizable composition of the first embodiment of the invention as the recording layer attain excellent printing durability.

In addition, since the specific polyamide resin and the radical-polymerizable compound in the polymerizable composition of the first embodiment of the invention have satisfactory compatibility with each other, these two ingredients do not separate into respective phases even with the lapse of time. Because of this, lithographic printing plate precursors to which the polymerizable composition of the first embodiment of the invention has been applied have excellent storage stability, are inhibited from suffering a decrease in the removability of nonimage areas in development and from suffering a decrease in radical crosslink density in image areas, and can give lithographic printing plates retaining excellent printing durability.

The specific polyamide resin (A) has better compatibility especially when a radical-polymerizable compound having an amide group or urethane group is used.

As a result of intensive investigations, the present inventors have found that the object can be accomplished when a polyester resin which is soluble or swells in water or aqueous alkali solutions is used as a component of a polymerizable composition. The second embodiment of the invention has been completed based on this finding.

The second embodiment of the invention provides a polymerizable composition comprising (A) a polyester resin which is soluble or swells in water or aqueous alkali solutions, (B) an infrared absorber, (C) a radical polymerization initiator, and (D) a radical-polymerizable compound.

In a preferred embodiment of the composition of the second embodiment of the invention, the polyester resin (A) which is soluble or swells in water or aqueous alkali solutions has carbon-carbon unsaturated bonds in side chains or the main chain thereof.

Although the mechanisms by which the second embodiment of the invention produces its effects have not been elucidated, the following is presumed.

In general, large amounts of oxygen dissolved in films pose a problem that radicals generated from a radical polymerization initiator are deactivated by oxygen and, hence, polymerization does not proceed sufficiently. However, since the polyester resin (A) which is soluble or swells in water or aqueous alkali solutions (hereinafter often referred to as "specific polyester resin") in the second embodiment of the invention has excellent film-forming properties, the composition gives a coating film having a reduced dissolved-oxygen amount. Because of this, the polymerizable compound according to the second embodiment of the invention is thought to be inhibited from undergoing polymerization inhibition by oxygen and capable of giving a coating film cured to a high degree. It is further thought that when this polymerizable compound is applied to the recording layer of a lithographic printing plate precursor, excellent printing durability can be realized because sufficiently cured image areas can be formed from the compound.

Furthermore, the specific polyester resin (A) has satisfactory compatibility with (meth)acrylic esters, which are radical-polymerizable compounds having highly excellent sensitivity. Because of this, the radical-polymerizable compound in the polymerizable composition is evenly dispersed without aggregating. Consequently, the infrared absorber and radical polymerization initiator which are present close to the polymerizable compound are thought to be activated by exposure and thereby efficiently function to cause polymerization reactions to occur and proceed. As a result, the cured parts have a high crosslink density and are hence effectively inhibited from suffering infiltration of an alkaline developing solution during development. It is thought that for the reasons described above, lithographic printing plate precursors employing the polymerizable composition of the second embodiment of the invention as the recording layer have excellent printing durability.

In addition, since the specific polyester resin and the radical-polymerizable compound in the polymerizable composition of the second embodiment of the invention have satisfactory compatibility with each other, these two ingredients do not separate into respective phases even with the lapse of time. Because of this, lithographic printing plate precursors to which the polymerizable composition of the second embodiment of the invention has been applied have excellent storage stability, are inhibited from suffering a decrease in the removability of nonimage areas in development and from suffering a decrease in radical crosslink density in image areas, and can give lithographic printing plates retaining excellent printing durability.

According to the invention, a polymerizable composition useful as the image-recording layer of a negative type lithographic printing plate precursor excellent in printing durability and storage stability can be obtained.

DETAILED DESCRIPTION OF THE INVENTION (A) Polyamide Resin Soluble or Swelling in Water or Aqueous Alkali Solution (the First Embodiment of the Invention)

The specific polyamide resin to be used in the invention is not particularly limited as long as it is a polyamide resin which is soluble or swells in water or aqueous alkali solutions. The term "soluble in water or aqueous alkali solutions" as used in the invention means that addition of the specific polyamide resin to water or an aqueous alkali solution each having a pH of 7 or higher gives a transparent homogeneous solution, while the term "swelling in water or aqueous alkali solutions" means that when the specific polyamide resin is added to water or an aqueous alkali solution each having a pH of 7 or higher, this specific polymeric compound absorbs water or the aqueous solution and thus swells.

In order for the specific polyamide resin according to the invention to have the property described above, it preferably has alkali-soluble groups in the molecule. It is especially preferred in the invention to use a specific polyamide resin having carboxy groups in side chains thereof.

The specific polyamide resin having carboxy groups in side chains thereof can be synthesized, for example, by the following method (1) or (2).

(1) A diamine compound is reacted with a tetracarboxylic dianhydride.

(2) A dicarboxylic acid or a derivative thereof is reacted with an excess of a diamine compound to synthesize a polyamide resin having amino groups at ends, and this resin is reacted with a tetracarboxylic dianhydride.

Examples of the diamine compound to be used in method (1) or (2) are as follows.

Examples thereof include aliphatic diamines such as ethylenediamine, 1,3-diaminopropane, 1,2-diaminopropane, 1,4-diaminobutane, 1,2-diamino-2-methylpropane, 1,5-diaminopentane, 2,2-dimethyl-1,3-propanediamine, hexamethylenediamine, 1,7-diaminoheptane, 1,8-diaminooctane, 1,10-diaminodecene, 4,4'-methylenebis(cyclohexylamine), 1,2-diaminocyclohexane, 1,4-diaminocyclohexane, isophoronediamine, 2,2'-(ethylenedioxy)bis(ethyleneamine), and 4,7,10-trioxa-1,13-tridecanediamine; and aromatic diamines such as 1,2-phenylenediamine, 2,3-diaminotoluene, 3,4-diaminotoluene, 4-chloro-1,2-phenylenediamine, 4,5-dimethyl-1,2-phenylenediamaine, 4,5-dichloro-1,2-phenylenediamine, 1,3-phenylenediamine, 2,6-diaminotoluene, 2,4-diaminotoluene, 2,4,6-trimethyl-1,3-phenylenediamaine, 1,4-phenylenediamine, 2,5-dimethyl-1,4-phenylenediamine, 2,5-dichloro-1,4-phenylenediamine, 4,4'-(hexafluoroisopropylidene)diamine, 2,3-diaminonaphthalene, 1,5-diaminonaphthalene, p-xylenediamine, 4-aminobenzylamine, 2-(4-aminophenyl)ethylenamine, bis(4-aminophenylmethane), and bis(4-aminophenyl) ether. Especially preferred of these are the diamine compounds having an aromatic group and the aliphatic diamine compounds having 2-10 carbon atoms.

Examples of the tetracarboxylic dianhydride to be used in method (1) or (2) include compounds represented by the following formula (I).

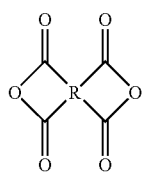

Formula (I)

In formula (I), R represents a tetravalent organic group having at least two carbon atoms.

Specific examples of the tetracarboxylic dianhydride include aromatic tetracarboxylic dianhydrides such as pyromellitic dianhydride, 3,3',4,4'-benzophenonetetracarboxylic dianhydride, 2,3,7-naphthalenetetracarboxylic dianhydride, 1,4,5,8-naphthalenetetracarboxylic dianhydride, 4,4'-sulfonyldiphthalic dianhydride, 2,2-bis(3,4-dicarboxyphenyl)propane dianhydride, 4,4'-{3,3'-(alkylphosphoryldiphenylene)bis(iminocarbonyl)}diphthalic dianhydrides, adducts of hydroquinone diacetate with trimellitic anhydride, and adducts of diacetyldiamine with trimellitic anhydride; and aliphatic or alicyclic tetracarboxylic dianhydrides such as butane-1,2,3,4-tetracarboxylic dianhydride and cyclopentanetetracarboxylic dianhydride. Especially preferred of these are the aromatic tetracarboxylic dianhydrides.

Examples of the dicarboxylic acid or derivative thereof to be used in method (2) include dicarboxylic acids such as succinic acid, adipic acid, azelaic acid, sebacic acid, phthalic acid, isophthalic acid, terephthalic acid, tetrahydrophthalic acid, hexahydrophthalic acid, tetrabromophthalic acid, tetrachlorophthalic acid, 1,4-cyclohexanedicarboxylic acid, carboxynorbornane acid, 5-sodiumsulfoisophthalic acid, 4-hydroxybenzylidenemalonic acid, and 3-hydroxyphthalic acid and derivatives of these acids. Especially preferred of these are the dicarboxylic acids having an aromatic group or derivatives of these acids and the aliphatic dicarboxylic acids having 2-10 carbon atoms or derivatives of these acids.

The specific polyamide resin according to the invention can be easily produced by the methods described in, e.g., *Shin Kôbunshi Jikken-gaku* 3, *Kôbunshi-No Gôsei/Hannô* (2), edited by The Society of Polymer Science, Japan, published by Kyoritsu Shuppan Co., Ltd.

The content of carboxy groups in the specific polyamide resin is preferably 0.4 meq/g or higher, more preferably 0.8-2.0 meq/g. When the polyamide resin has a carboxy group content within this range, use of the polymerizable composition of the invention as the recording layer of a lithographic printing plate precursor brings about excellent developability and excellent printing durability.

In a preferred embodiment, the specific polyamide resin according to the invention has carbon-carbon unsaturated bonds in side chains thereof. Although the carbon-carbon unsaturated bonds may be either ethylenic bonds or acetylenic bonds, they preferably are ethylenic bonds. Especially preferred are bonds represented by the following formulae (II) to (V).

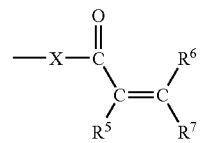

Formula (II)

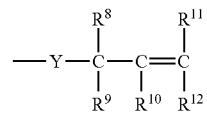

Formula (III)

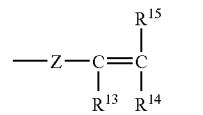

Formula (IV)

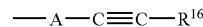

Formula (V)

In formula (II), $R^5$ to $R^7$ each independently represent a hydrogen atom or a monovalent organic group. Preferred examples of $R^5$ include a hydrogen atom and optionally substituted alkyl groups. In particular, a hydrogen atom and methyl are especially preferred of these because they bring about high radical reactivity. $R^6$ and $R^7$ each independently represent a hydrogen atom, halogen atom, amino, carboxy, alkoxycarbonyl, sulfo, nitro, cyano, optionally substituted alkyl, optionally substituted aryl, optionally substituted alkoxy, optionally substituted aryloxy, optionally substituted alkylamino, optionally substituted arylamino, optionally substituted alkylsulfonyl, optionally substituted arylsulfonyl, or the like. Of these, a hydrogen atom, carboxy, alkoxycarbonyl, optionally substituted alkyl, and optionally substituted aryl are preferred because they bring about high radical reactivity.

X represents an oxygen atom, a sulfur atom, or $-N(R^{17})-$, wherein $R^{17}$ represents a hydrogen atom or a monovalent organic group. Examples of $R^{17}$ include optionally substituted alkyl groups. Of these, a hydrogen atom, methyl, ethyl, and isopropyl are preferred because they bring about high radical reactivity.

Examples of the substituents which can be incorporated include alkyl groups, alkenyl groups, alkynyl groups, aryl groups, alkoxy groups, aryloxy groups, halogen atoms, amino, alkylamino groups, arylamino groups, carboxy, alkoxycarbonyl groups, sulfo, nitro, cyano, amide, alkylsulfonyl groups, and arylsulfonyl groups.

In formula (III), $R^8$ to $R^{12}$ each independently represent a hydrogen atom or a monovalent organic group. Preferred examples of $R^8$ to $R^{12}$ include a hydrogen atom, halogen atoms, amino, dialkylamino groups, carboxy, alkoxycarbonyl groups, sulfo, nitro, cyano, optionally substituted alkyl groups, optionally substituted aryl groups, optionally substituted alkoxy groups, optionally substituted aryloxy groups, optionally substituted alkylamino groups, optionally substituted arylamino groups, optionally substituted alkylsulfonyl groups, and optionally substituted arylsulfonyl groups. Preferred of these from the standpoint of reactivity are a hydrogen atom, carboxy, alkoxycarbonyl groups, optionally substituted alkyl groups, and optionally substituted aryl groups.

Examples of the substituents which can be incorporated include the same substituents as in formula (II). Y represents an oxygen atom, a sulfur atom, or —N($R^{18}$)—, wherein $R^{18}$ has the same meaning as $R^{17}$ in formula (II). Preferred examples of $R^{18}$ also are the same as those of $R^{17}$.

In formula (IV), $R^{13}$ to $R^{15}$ each independently represent a hydrogen atom or a monovalent organic group. Preferred examples of $R^{13}$ include a hydrogen atom and optionally substituted alkyl groups. Of these, a hydrogen atom and methyl are preferred because they bring about high radical reactivity. $R^{14}$ and $R^{15}$ each independently represent a hydrogen atom, halogen atom, amino, dialkylamino, carboxy, alkoxycarbonyl, sulfo, nitro, cyano, optionally substituted alkyl, optionally substituted aryl, optionally substituted alkoxy, optionally substituted aryloxy, optionally substituted alkylamino, optionally substituted arylamino, optionally substituted alkylsulfonyl, optionally substituted arylsulfonyl, or the like. Of these, a hydrogen atom, carboxy, alkoxycarbonyl, optionally substituted alkyl, and optionally substituted aryl are preferred because they bring about high radical reactivity.

Examples of the substituents which can be incorporated include the same substituents as in formula (II). Z represents an oxygen atom, a sulfur atom, —N($R^{18}$)—, or optionally substituted phenylene. $R^{18}$ has the same meaning as $R^{17}$ in formula (II), and preferred examples thereof also are the same as those of $R^{17}$.

In formula (V), $R^{16}$ represents a hydrogen atom or a monovalent organic group. Preferred examples of the monovalent organic group represented by $R^{16}$ include optionally substituted alkyl groups and optionally substituted aromatic groups. Of these, a hydrogen atom, methyl, and optionally substituted phenyl are preferred because they bring about high radical reactivity. Symbol A represents an optionally substituted alkylene or optionally substituted phenylene group. Of these, methylene is preferred because it brings about high radical reactivity.

Examples of the substituents which can be incorporated include the same substituents as in formula (II).

Carbon-carbon unsaturated bonds can be incorporated, for example, by the following method (3) or (4).

(3) Method (1) or (2) described above is conducted using a dicarboxylic acid having a carbon-carbon unsaturated bond or a derivative thereof either as the only dicarboxylic acid or derivative thereof or in combination with other dicarboxylic acid(s) or derivative(s) thereof.

(4) Part of the carboxy groups of the specific polyamide resin having carboxy groups in side chains synthesized by method (1) or (2) described above are reacted with a halide or epoxy compound having a carbon-carbon unsaturated bond.

Examples of the dicarboxylic acid having a carbon-carbon unsaturated bond or derivative thereof to be used in method (3) include dicarboxylic acids such as maleic acid, fumaric acid, itaconic acid, citraconic acid, tetrahydrophthalic acid, Himic acid, p-phenylenediacrylic acid, m-phenylenediacrylic acid, cinnamylidenemalonic acid, and p-carboxycinnamic acid and the anhydrides and ester derivatives of these acids. Especially preferred of these are the dicarboxylic acids which are fumaric acid, itaconic acid, citraconic acid, p-phenylenediacrylic acid, and m-phenylenediacrylic acid and the anhydrides and ester derivatives of these acids.

Examples of the halide or epoxy compound having a carbon-carbon unsaturated bond to be used in method (4) include halides such as allyl bromide, 2-butenyl bromide, 1-phenyl-1-propenyl 3-bromide, 2-bromoethyl cinnamate, bromomethylstyrene, chloromethylstyrene, propargyl bromide, and bromo-2-butyne and epoxy compounds such as allyl glycidyl ether, 2-butenyl glycidyl ether, 1-phenylpropenyl glycidyl ether, glycidyl acrylate, glycidyl methacrylate, glycidyl cinnamate, propargyl glycidyl ether, and cyclic epoxy compounds such as the compounds shown below. Especially preferred of these are the halides which are allyl bromide, chloromethylstyrene, and propargyl bromide and allyl glycidyl ether, glycidyl acrylate, glycidyl methacrylate, and cyclic epoxy compounds such as the following compounds.

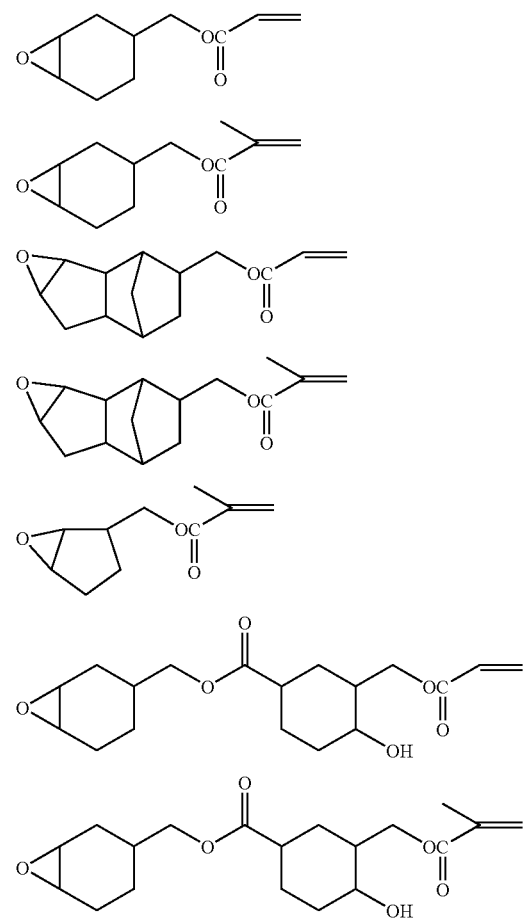

-continued

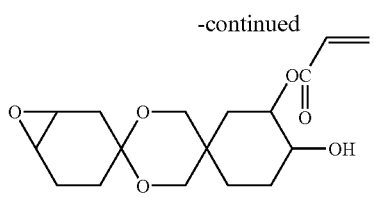

The content of the carbon-carbon unsaturated bonds in the specific polyamide resin is preferably 0.1 meq/g or higher, more preferably 0.5-3.0 meq/g. When the polyamide resin has a carbon-carbon unsaturated bond content within this range, the polymerizable composition of the invention has excellent storage stability and use of the polymerizable composition as the recording layer of a lithographic printing plate precursor brings about excellent printing durability.

Furthermore, the specific polyamide resin according to the invention preferably has aromatic groups in the molecule in an amount of 10% by weight or larger, especially preferably 20% by weight or larger.

The weight-average molecular weight of the specific polyamide resin according to the invention is preferably 5,000 or higher, more preferably in the range of 30,000-150,000. The number-average molecular weight thereof is preferably 10,000 or higher, more preferably in the range of 30,000-120,000. The polydispersity coefficient (weight-average molecular weight/number-average molecular weight) of the resin is preferably 1 or higher, more preferably in the range of 1.1-10. When the polyamide resin has a weight-average molecular weight within that range, use of the polymerizable composition of the invention as the recording layer of a lithographic printing plate precursor brings about excellent developability and excellent printing durability.

The molecular chain of the specific polyamide resin may contain other bonds such as, e.g., urethane, ester, ureido, and ether bonds.

Specific polyamide resins according to the invention may be used alone or as a mixture of two or more thereof. Furthermore, the specific polyamide resin can be used as a mixture thereof with one or more other polymeric compounds, such as, e.g., the binder polymers (E) which will be described later, as long as this does not impair the effects of the invention. In this case, the proportion of other polymeric compounds is preferably up to 90% by weight, more preferably up to 60% by weight, based on all polymeric compounds including the specific polyamide resin.

The content of the specific polyamide resin (A) in the polymerizable composition of the invention is about 10-95% by weight, preferably about 30-85% by weight, on a solid basis. When the content of the polyamide resin is within this range, use of the polymerizable composition of the invention as the recording layer of a lithographic printing plate precursor brings about excellent image-forming properties and excellent printing durability.

(A) Polyester Resin Soluble or Swelling in Water or Aqueous Alkali Solution (the Second Embodiment of the Invention)

The specific polyester resin to be used in the invention is not particularly limited as long as it is a polyester resin which is soluble or swells in water or aqueous alkali solutions. The term "soluble in water or aqueous alkali solutions" as used in the invention means that addition of the specific polyester resin to water or an aqueous alkali solution each having a pH of 7 or higher gives a transparent homogeneous solution, while the term "swelling in water or aqueous alkali solutions" means that when the specific polyester resin is added to water or an aqueous alkali solution each having a pH of 7 or higher, this specific polymeric compound absorbs water or the aqueous solution and thus swells.

In order for the specific polyester resin according to the invention to have the property described above, it preferably has alkali-soluble groups in the molecule. It is especially preferred in the invention to use a specific polyester resin having carboxy groups in side chains thereof.

The polyester resin having carboxy groups in side chains thereof can be synthesized, for example, by the following method (1') or (2').

(1') A diol compound which has a carboxyl group and is represented by the following formula (I') is reacted with a dicarboxylic acid or a derivative thereof.

(2') A dicarboxylic acid or a derivative thereof is reacted with an excess of a diol compound to synthesize a polyester resin having hydroxy groups at ends, and this resin is reacted with a tetracarboxylic dianhydride.

Formula (I')

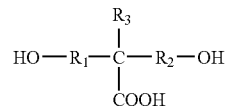

In formula (I'), $R^1$ and $R^2$ may be the same or different and each represent an optionally substituted, divalent aliphatic hydrocarbon group having 1-20 carbon atoms. $R^3$ represents an optionally substituted alkyl group having 1-8 carbon atoms, an optionally substituted alkenyl group having 1-8 carbon atoms, or an optionally substituted aryl group having 6-15 carbon atoms.

Examples of the carboxyl-containing diol compound represented by formula (I') include 2,2-bis(hydroxymethyl) propionic acid, 2,2-bis(hydroxyethyl)propionic acid, 2,2-bis(3-hydroxypropyl)propionic acid, 2,2-bis(2-hydroxypropyl) propionic acid, and 2,2-bis(hydroxymethyl)butyric acid.

In method (1'), a diol compound having no carboxyl group can be further used. This diol compound may be the same as the diol compound to be used in method (2').

Examples of the diol compound which can be optionally used in method (1') and the diol compound to be used in method (2') are as follows.

Examples thereof include ethylene glycol, diethylene glycol, triethylene glycol, tetraethylene glycol, propylene glycol, dipropylene glycol, polyethylene glycol, polypropylene glycol, neopentyl glycol, 1,3-butylene glycol, 1,6-hexanediol, 2,2,4-trimethyl-1,3-pentanediol, 1,4-bis-β-hydroxyethoxycyclohexane, cyclohexanedimethanol, tricyclodecanedimethanol, hydrogenated bisphenol A, hydrogenated bisphenol F, ethylene oxide adducts of bisphenol A, propylene oxide adducts of bisphenol A, ethylene oxide adducts of bisphenol F, propylene oxide adducts of bisphenol F, ethylene oxide adducts of hydrogenated bisphenol A, propylene oxide adducts of hydrogenated bisphenol A, hydroquinone dihydroxyethyl ether, p-xylylene glycol, and bis(2-hydroxyethyl) isophthalate.

Especially preferred of these diol compounds for use in method (1') or (2') are the diol compounds having one or more aromatic groups and the aliphatic diol compounds having 2-10 carbon atoms.

Examples of the dicarboxylic acid or derivative thereof to be used in method (1') or (2') include dicarboxylic acids such as succinic acid, adipic acid, azelaic acid, sebacic acid, phthalic acid, isophthalic acid, terephthalic acid, tetrahydrophthalic acid, hexahydrophthalic acid, tetrabromophthalic acid, tetrachlorophthalic acid, 1,4-cyclohexanedicarboxylic acid, carboxynorbornane acid, 5-sodiumsulfoisophthalic acid, 4-hydroxybenzylidenemalonic acid, and 3-hydroxyphthalic acid and derivatives of these acids.

Especially preferred of these dicarboxylic acids and derivatives thereof for use in method (1') or (2') are the dicarboxylic acids having an aromatic group or derivatives of these acids and the aliphatic dicarboxylic acids having 2-10 carbon atoms or derivatives of these acids.

Examples of the tetracarboxylic dianhydride to be used in method (2') include compounds represented by the following formula (II').

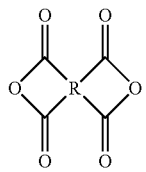

Formula (II')

In formula (II'), R represents a tetravalent organic group having at least two carbon atoms.

Specific examples of the tetracarboxylic dianhydride include aromatic tetracarboxylic dianhydrides such as pyromellitic dianhydride, 3,3',4,4'-benzophenonetetracarboxylic dianhydride, 2,3,7-naphthalenetetracarboxylic dianhydride, 1,4,5,8-naphthalenetetracarboxylic dianhydride, 4,4'-sulfonyldiphthalic dianhydride, 2,2-bis(3,4-dicarboxyphenyl)propane dianhydride, 4,4'-{3,3'-(alkylphosphoryldiphenylene)bis(iminocarbonyl)}diphthalic dianhydrides, adducts of hydroquinone diacetate with trimellitic anhydride, and adducts of diacetyldiamine with trimellitic anhydride; and aliphatic or alicyclic tetracarboxylic dianhydrides such as butane-1,2,3,4-tetracarboxylic dianhydride and cyclopentanetetracarboxylic dianhydride. Especially preferred of these are the aromatic tetracarboxylic dianhydrides.

The specific polyester resin according to the invention can be easily produced by the methods described, e.g., in *Kôza Jûgôhannô-ron 9, Jûshukugô*, written by Ogata, published by Kagaku Dozin Co., Ltd. or in JP-A-60-165646 and U.S. Pat. No. 3,622,320.

From the standpoint of printing durability, the specific polyester resin contains aromatic groups in an amount of preferably 5% by weight or larger, more preferably 10% by weight or larger, especially preferably 20% by weight or larger.

The content of carboxyl groups in the specific polyester resin is preferably 0.4 meq/g or higher from the standpoint of developability, and is preferably 0.8-2.0 meq/g from the standpoints of developability and printing durability.

Method (1') or (2') may be conducted in the following manner. A polyester resin containing carboxyl groups in side chains is synthesized so as to have terminal hydroxy groups, and this polyester resin is reacted with a compound having in the molecule two or more functional groups reactive with the terminal hydroxy groups (this compound is referred to as chain extender) to thereby heighten the molecular weight of the resin.

Examples of the chain extender having functional groups reactive with terminal hydroxy groups include diaryl oxalate compounds, diaryl phthalate compounds, diaryl carbonate compounds, bis(N-acyllactam) compounds, bis(N-acrylimide) compounds, bisbenzoxazinone compounds, polyisocyanate compounds, bisoxazolone compounds, bis(N-acylimidazole) compounds, alkoxysilane compounds, silanol compounds, furoxane compounds, bisaziridine compounds, polyisothiocyanate compounds, divinyl ether compounds, diketene acetal compounds, unsaturated cycloacetal compounds, and biscarbodiimide compounds.

The polyester resin whose molecular weight has been heightened by reaction with a chain extender can be easily synthesized, for example, by the method described in JP-A-60-191244.

In a preferred embodiment, the specific polyester resin according to the invention has carbon-carbon unsaturated bonds in side chains thereof. Although the carbon-carbon unsaturated bonds may be either ethylenic bonds or acetylenic bonds, they preferably are ethylenic bonds. Especially preferred are bonds represented by the foregoing formulae (II) to (V).

Carbon-carbon unsaturated bonds can be incorporated, for example, by the following method (3') or (4').

(3') Method (1') or (2') described above is conducted using a dicarboxylic acid having a carbon-carbon unsaturated bond or a derivative thereof either as the only dicarboxylic acid or derivative thereof or in combination with other dicarboxylic acid(s) or derivative(s) thereof.

(4') Part of the carboxy groups of the specific polyester resin having carboxy groups in side chains synthesized by method (1') or (2') described above are reacted with a halide or epoxy compound having a carbon-carbon unsaturated bond.

Examples of the dicarboxylic acid having a carbon-carbon unsaturated bond or derivative thereof to be used in method (3') include dicarboxylic acids such as maleic acid, fumaric acid, itaconic acid, citraconic acid, tetrahydrophthalic acid, Himic acid, p-phenylenediacrylic acid, m-phenylenediacrylic acid, cinnamylidenemalonic acid, and p-carboxycinnamic acid and the anhydrides and ester derivatives of these acids. Especially preferred of these are the dicarboxylic acids which are fumaric acid, itaconic acid, citraconic acid, p-phenylenediacrylic acid, and m-phenylenediacrylic acid and the anhydrides and ester derivatives of these acids.

Examples of the halide or epoxy compound having a carbon-carbon unsaturated bond to be used in method (4') include halides such as allyl bromide, 2-butenyl bromide, 1-phenyl-1-propenyl 3-bromide, 2-bromoethyl cinnamate, bromomethylstyrene, chloromethylstyrene, propargyl bromide, and bromo-2-butyne and epoxy compounds such as allyl glycidyl ether, 2-butenyl glycidyl ether, 1-phenylpropenyl glycidyl ether, glycidyl acrylate, glycidyl methacrylate, glycidyl cinnamate, propargyl glycidyl ether, and the compounds shown below. Especially preferred of these are the halides which are allyl bromide, chloromethylstyrene, and propargyl bromide, allyl glycidyl ether, glycidyl acrylate, glycidyl methacrylate, and cyclic epoxy compounds such as the following compounds.

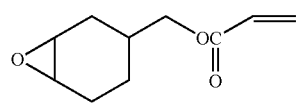

-continued

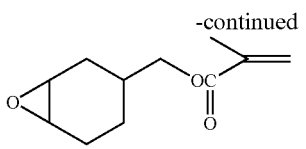

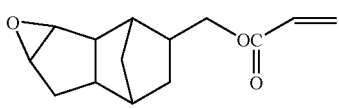

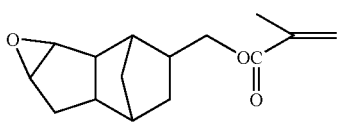

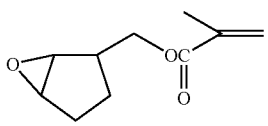

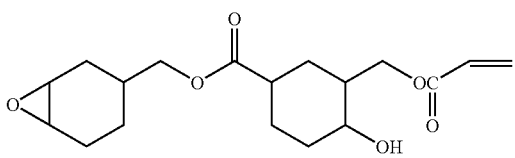

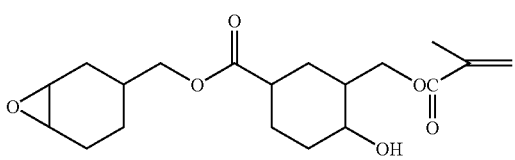

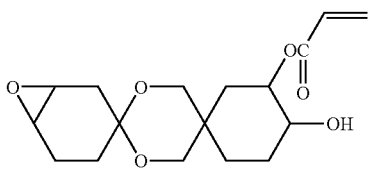

The content of the carbon-carbon unsaturated bonds in the specific polyester resin is preferably 0.1 meq/g or higher, more preferably 0.5-3.0 meq/g. When the content thereof is lower than 0.1 meq/g, there are cases where the effect of enhancing printing durability produced by the incorporation of carbon-carbon unsaturated bonds is insufficient. On the other hand, contents thereof higher than 3.0 meq/g tend to result in reduced storage stability.

The weight-average molecular weight of the specific polyester resin according to the invention is preferably 5,000 or higher, more preferably in the range of 40,000-150,000. The number-average molecular weight thereof is preferably 10,000 or higher, more preferably in the range of 30,000-120,000. The polydispersity coefficient (weight-average molecular weight/number-average molecular weight) of the resin is preferably 1 or higher, more preferably in the range of 1.1-10. When the polyester resin has a weight-average molecular weight within that range, use of the polymerizable composition of the invention as the recording layer of a lithographic printing plate precursor brings about excellent developability and excellent printing durability.

The molecular chain of the specific polyester resin may contain other bonds such as, e.g., urethane, ester, ureido, and ether bonds.

Specific polyester resins according to the invention may be used alone or as a mixture of two or more thereof. Furthermore, the specific polyester resin can be used as a mixture thereof with one or more other polymeric compounds, such as, e.g., the binder polymers (E) which will be described later, as long as this does not impair the effects of the invention. In this case, the proportion of other polymeric compounds is preferably up to 90% by weight, more preferably up to 60% by weight, based on all polymeric compounds including the specific polyester resin.

The content of the specific polyester resin (A) in the polymerizable composition of the invention is about 10-95% by weight, preferably about 30-85% by weight, on a solid basis. When the content of the polyester resin is within this range, use of the polymerizable composition of the invention as the recording layer of a lithographic printing plate precursor brings about excellent image-forming properties and excellent printing durability.

(B) Infrared Absorber

The polymerizable composition of the invention is characterized by containing an infrared absorber which absorbs infrared light and converts it into heat energy. Exposure to a light having a given wavelength which can be absorbed by the infrared absorber accelerates the radical-generating reaction of the radical polymerization initiator and the resultant polymerization reaction of the radical-polymerizable compound. Examples of this infrared absorber include known spectral sensitizing dyes and the dyes or pigments which absorb light and interact with the radical polymerization initiator.

<Spectral Sensitizing Dyes>

Preferred examples of the spectral sensitizing dyes for use as the infrared absorber in the invention include polynuclear aromatic compounds (e.g., pyrene, perylene, and triphenylene), xanthene compounds (e.g., fluoresceine, Eosine, erythrosine, Rhodamine B, and Rose Bengal), cyanine compounds (e.g., thiacarbocyanine and oxacarbocyanine), merocyanine compounds (e.g., merocyanine and carbomerocyanine), thiazine compounds (e.g., Thionine, Methylene Blue, and Toluidine Blue), acridine compounds (e.g., Acridine Orange, chlorofravine, and acrifravine), phthalocyanine compounds (e.g., phthalocyanine and metal phthalocyanines), porphyrin compounds (e.g., tetraphenylporphyrin and central-metal-substituted porphyrins), chlorophyll compounds (e.g., chlorophyll, chlorophyllin, and central-metal-substituted chlorophylls), metal complexes (e.g., the following compound), anthraquinone compounds (e.g., anthraquinone), and squarylium compounds (e.g., squarylium).

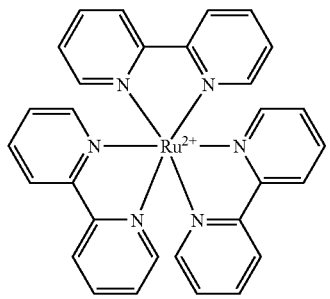
More preferred examples of the spectral sensitizing dyes include the pyrylium salts shown in JP-B-40-28499, for example, the following:
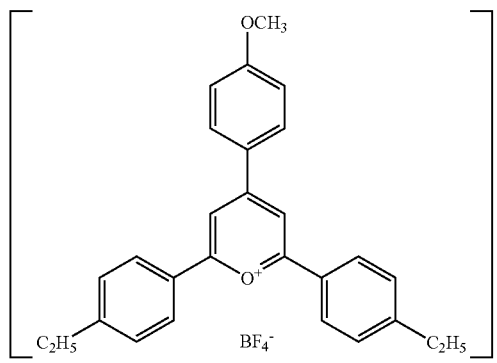
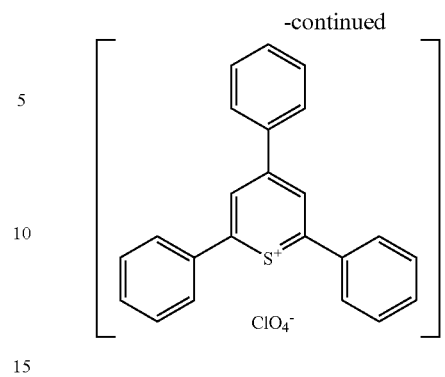
the cyanine compounds shown in JP-B-46-42363, for example, the following:
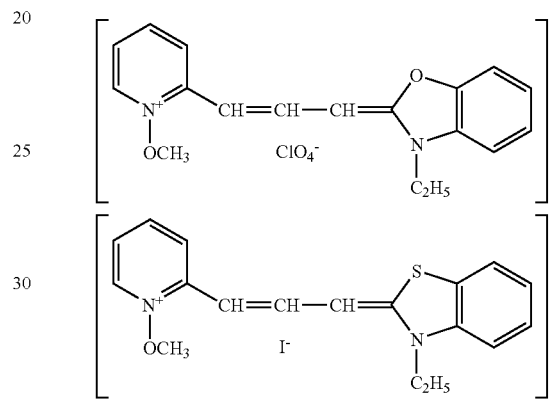
the benzofuran dyes shown in JP-A-2-63053, for example, the following:
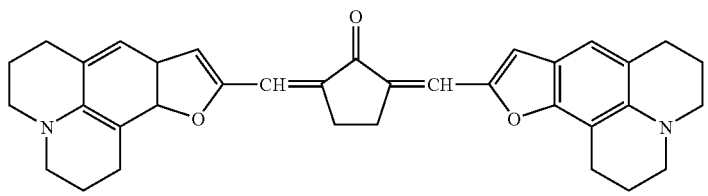
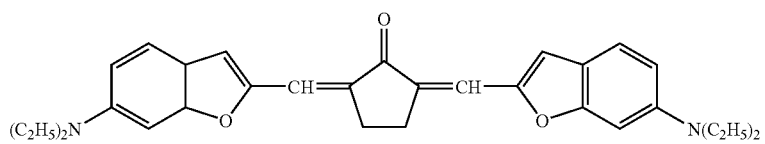

the conjugated ketone dyes shown in JP-A-2-85858 and JP-A-2-216154, for example, the following:

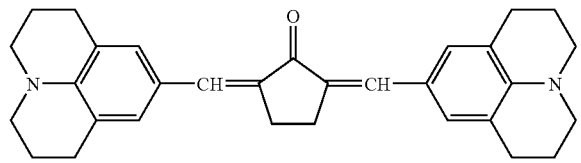

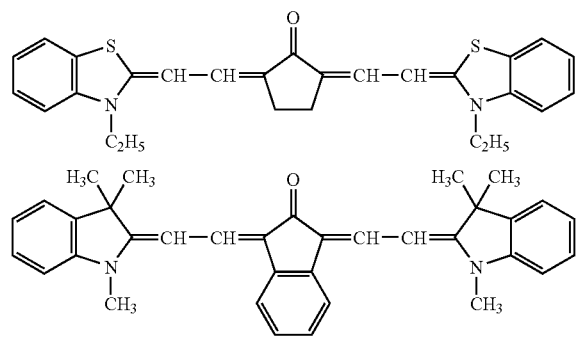

the dyes shown in JP-A-57-10605, the azocinnamylidene derivatives shown in JP-B-2-30321, for example, the following:

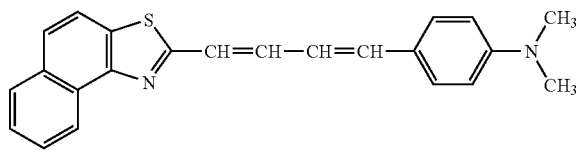

the cyanine dyes shown in JP-A-1-287105, for example, the following:

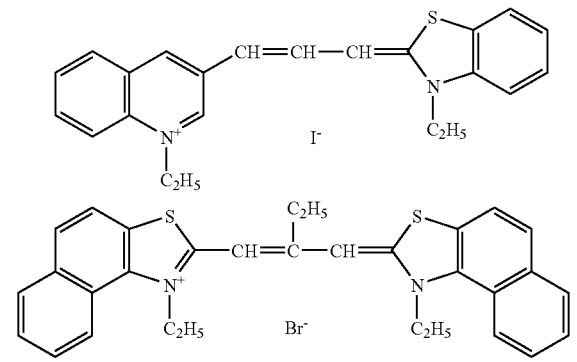

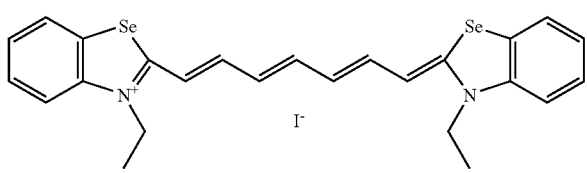

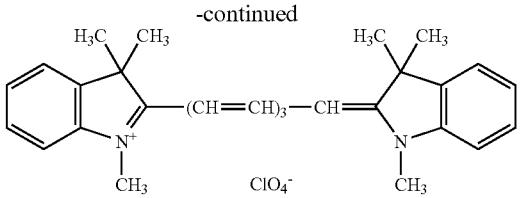

the xanthene dyes shown in JP-A-62-31844, JP-A-62-31848, and JP-A-62-143043, for example, the following:

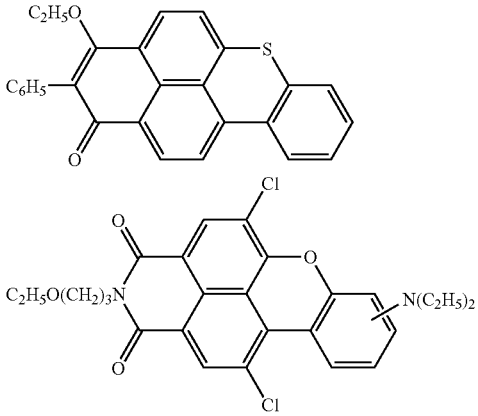

and the aminostyryl ketones shown in JP-B-59-28325, for example, the following.

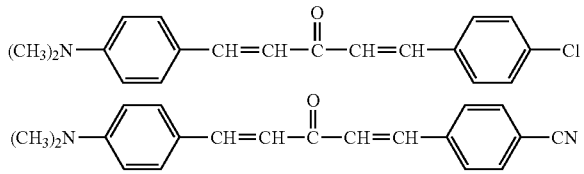

Infrared absorbers (dyes or pigments), in particular the following ones, are also advantageously used as sensitizing dyes. Preferred examples of such dyes include the cyanine dyes shown in JP-A-58-125246, JP-A-59-84356, JP-A-59-202829, and JP-A-60-78787 and the cyanine dyes shown in British Patent 434,875.

Other cyanine dyes suitable for use in the invention include the ones shown in JP-A-2001-133969, paragraphs Nos. [0017]-[0019], in JP-A-2002-40638, paragraphs Nos. [0012]-[0038], and in JP-A-2002-23360, paragraphs Nos. [0012]-[0023]. Specific examples thereof include the following.

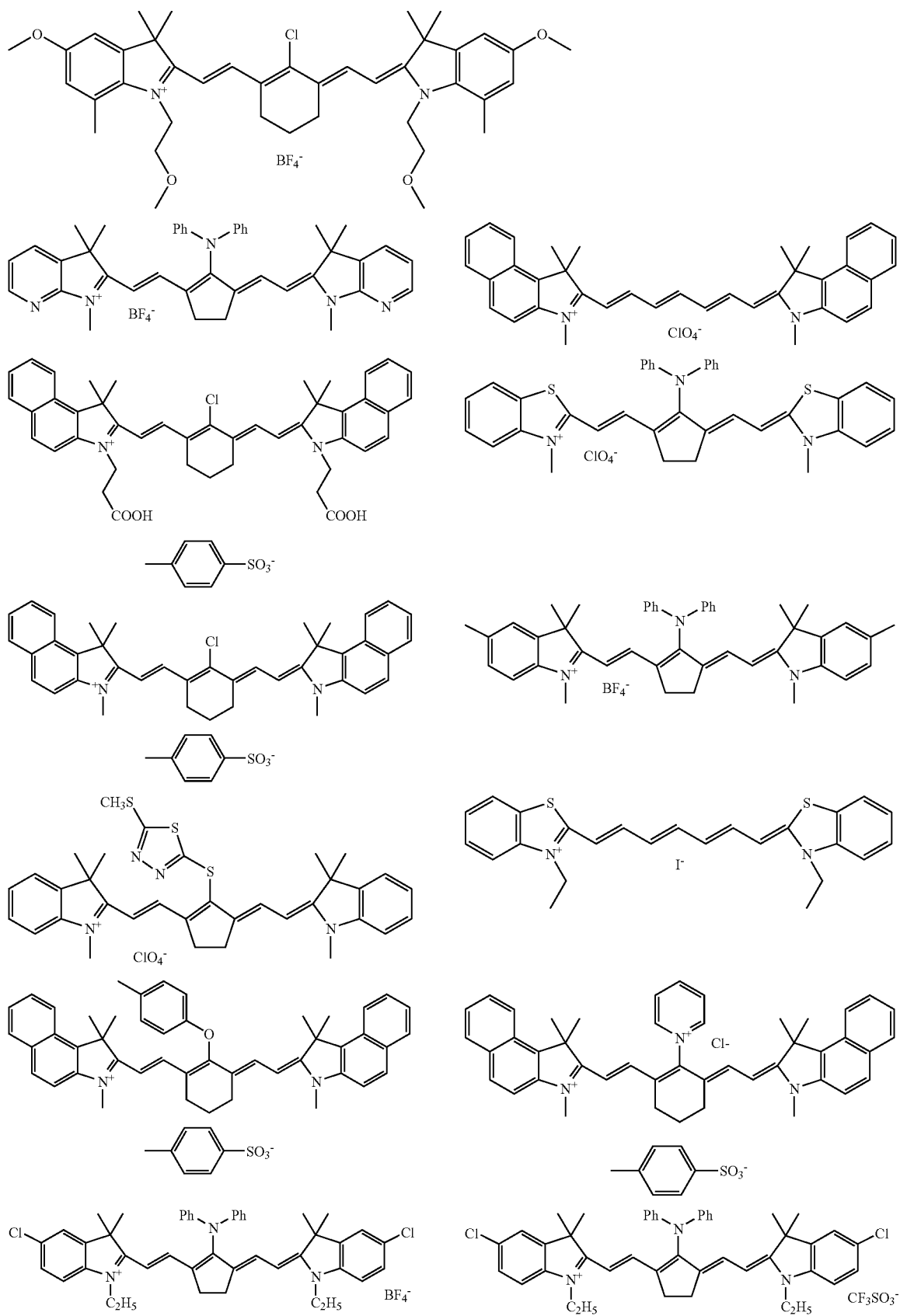

-continued

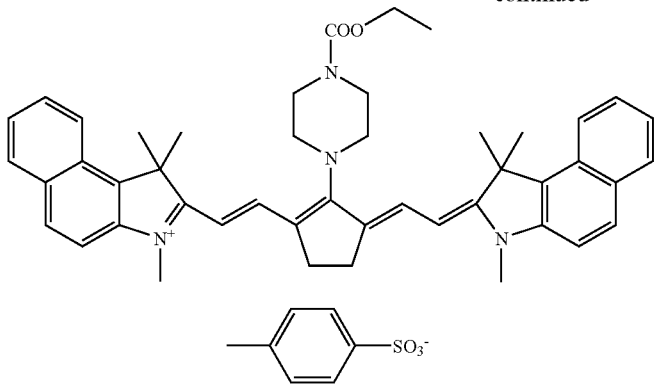

Furthermore, the near-infrared-absorbing sensitizers shown in U.S. Pat. No. 5,156,938 are suitable for use. Also usable advantageously are the substituted arylbenzo(thio)pyrylium salts shown in U.S. Pat. No. 3,881,924, the trimethine thiapyrylium salts shown in JP-A-57-142645 (U.S. Pat. No. 4,327,169), the pyrylium compounds shown in JP-A-58-181051, JP-A-58-220143, JP-A-59-41363, JP-A-59-84248, JP-A-59-84249, JP-A-59-146063, and JP-A-59-146061, the cyanine dyes shown in JP-A-59-216146, the pentamethine thiopyrylium salts shown in U.S. Pat. No. 4,283,475, and the pyrylium compounds shown in JP-B-5-13514 and JP-B-5-19702.

Examples of preferred dyes further include the near-infrared-absorbing dyes represented by the formulae (I) and (II) described in U.S. Pat. No. 4,756,993 and the phthalocyanine dyes shown in EP 916513 A2.

The anionic infrared absorber described in Japanese Patent Application No. 10-79912 can also be advantageously used. The term "anionic infrared absorber" means an infrared absorber in which the dye framework which substantially absorbs infrared has no cationic structure and has one or more anionic structures. Examples thereof include (i) an anionic metal complex, (ii) an anionic carbon black, (iii) an anionic phthalocyanine, and (iv) a compound represented by the following formula (21). The counter cations of these anionic infrared absorbers are monovalent or polyvalent cations containing one or more protons.

$$[G^9\text{-}M^5\text{-}G^{10}]_m(X^{10})^+ \qquad \text{Formula (21)}$$

The anionic metal complex (i) means one which as a whole, including the central atom substantially absorbing light and the ligand, is an anion.

Examples of the anionic carbon black (ii) include carbon blacks having anionic groups, such as sulfo, carboxy, or phosphono groups, bonded thereto. For incorporating these groups into a carbon black, use may be made of, e.g., a method in which the carbon black is oxidized with a given acid, as described in *Kâbon Burakku Binran,* 3rd ed. (edited by Carbon Black Association, published by Carbon Black Association on Apr. 5, 1995), page 12.

The anionic phthalocyanine (iii) means one which comprises a phthalocyanine framework and, bonded thereto as a substituent, any of the anionic groups shown above in the explanation on ingredient (ii), and which as a whole is an anion.

The compound (iv) represented by formula (21) is then explained below in detail. In formula (21), $G^9$ represents an anionic substituent and $G^{10}$ represents a neutral substituent.

$(X^{10})^+$ represents a cation having a valence of 1 to m and containing one or more protons, and m represents an integer of 1-6. $M^5$ represents a conjugated chain, and this conjugated chain $M^5$ may have one or more substituents or ring structures. The conjugated chain $M^5$ can be represented by the following formula.

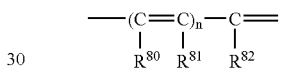

In the formula, $R^{80}$, $R^{81}$, and $R^{82}$ each independently represent a hydrogen atom, halogen atom, cyano, alkyl, aryl, alkenyl, alkynyl, carbonyl, thio, sulfonyl, sulfinyl, oxy, or amino, and may be bonded to each other to form a ring structure. Symbol n represents an integer of 1-8.

Preferred of the anionic infrared absorbers represented by formula (21) are the following IRA-1 to IRA-5.

IRA-1

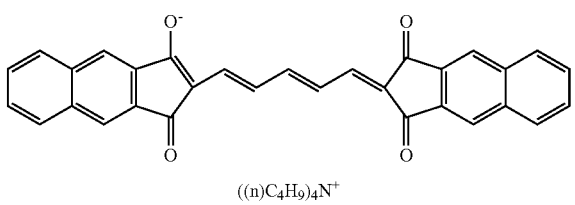

IRA-2

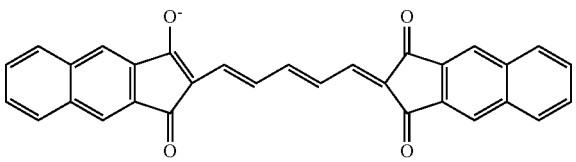

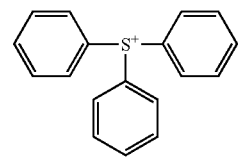

IRA-3
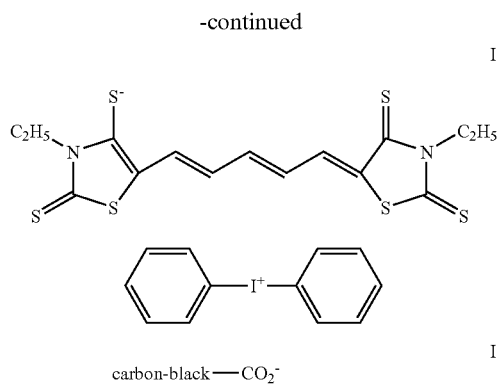
IRA-5
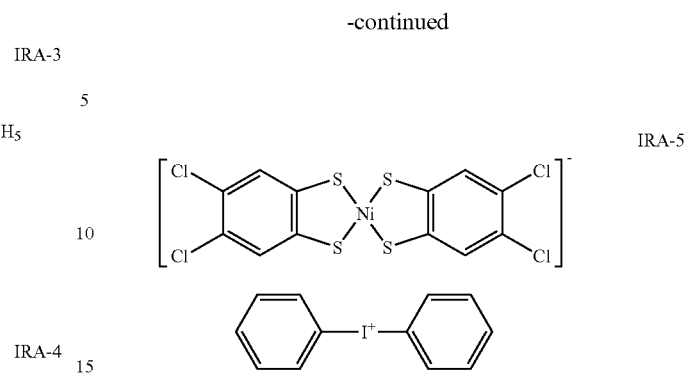
IRA-4
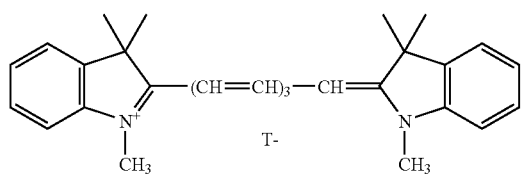
The following cationic infrared absorbers IRC-1 to IRC-44 can also be advantageously used.
IRC-1
IRC-2
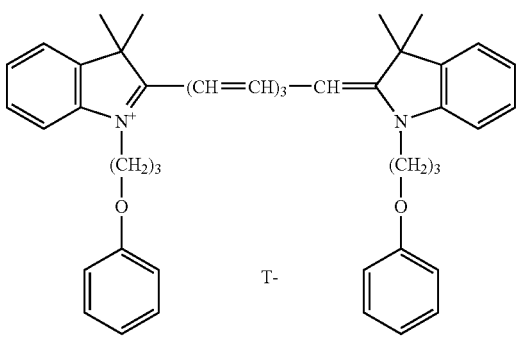
IRC-3
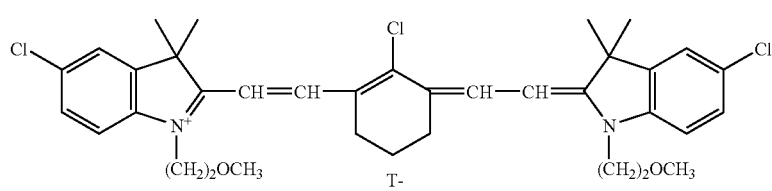
IRC-4
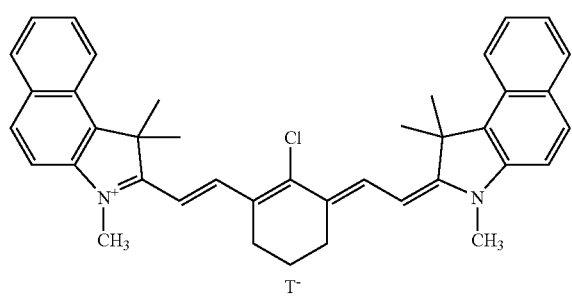

-continued
IRC-5
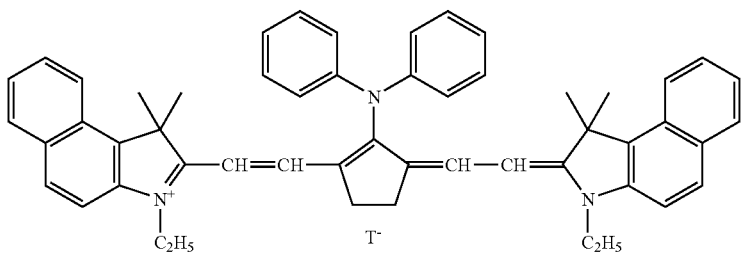
IRC-6
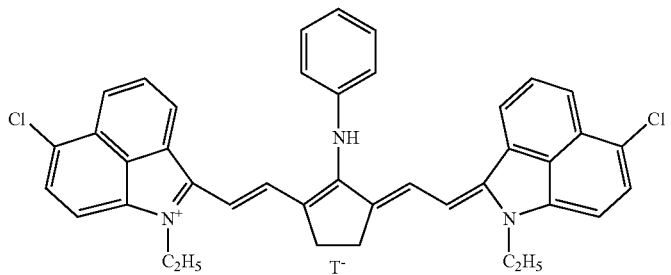
IRC-7
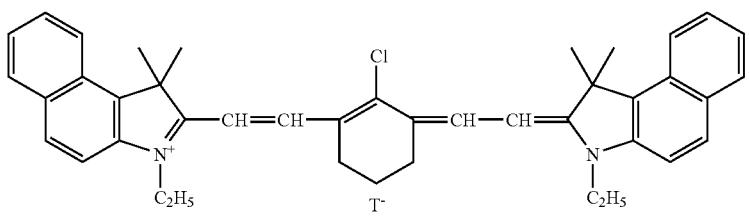
IRC-8
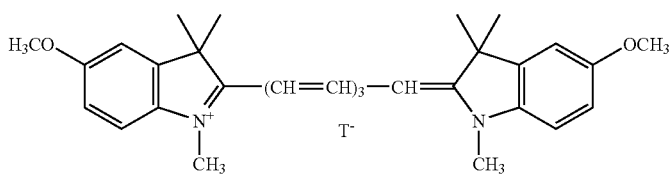
IRC-9
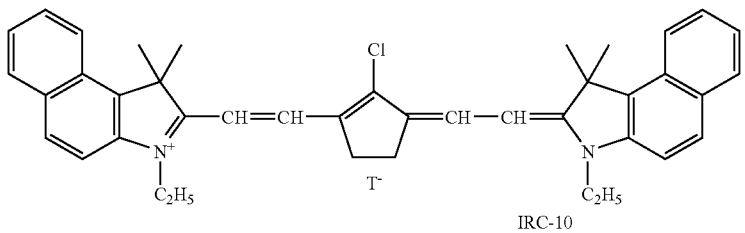
IRC-10
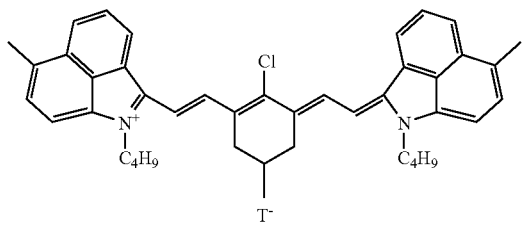
IRC-11
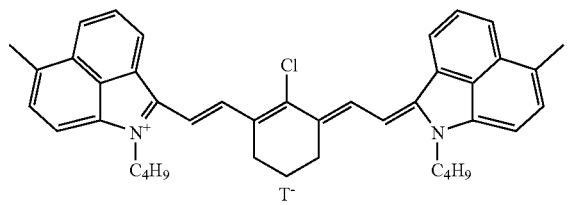
IRC-12
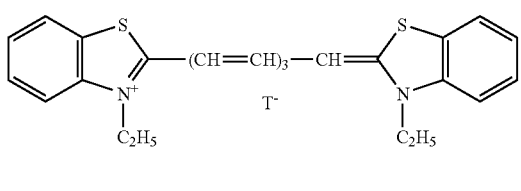
IRC-13
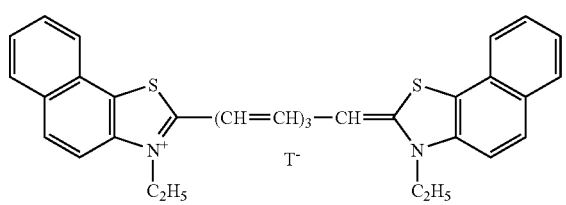

-continued
IRC-14
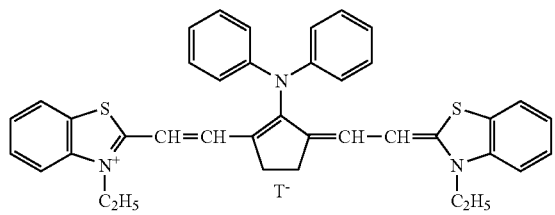
IRC-15
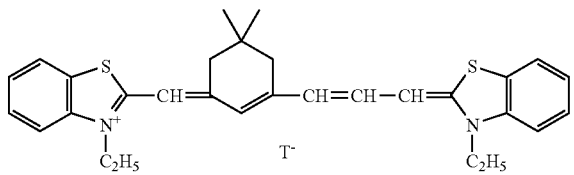
IRC-16
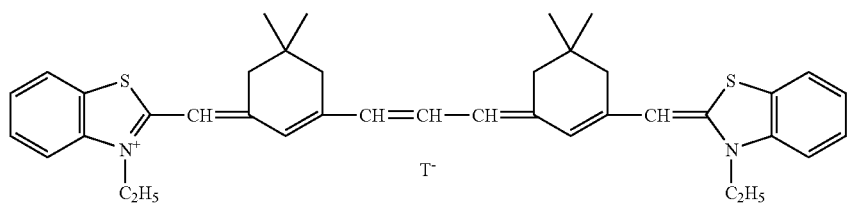
IRC-17
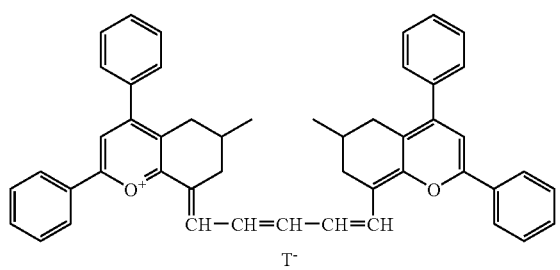
IRC-18
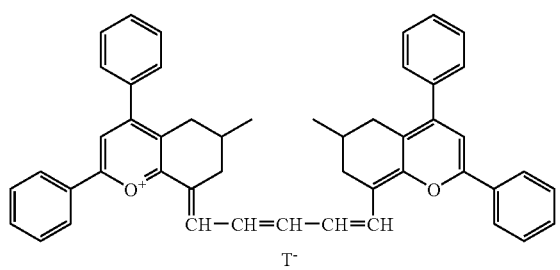
IRC-19
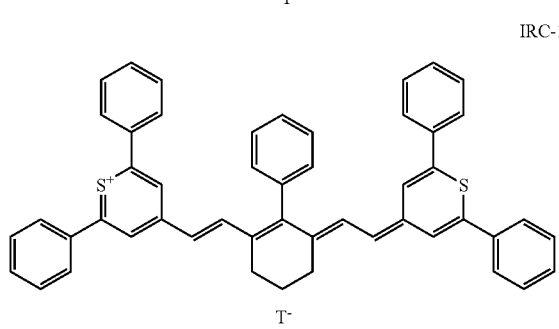
IRC-20
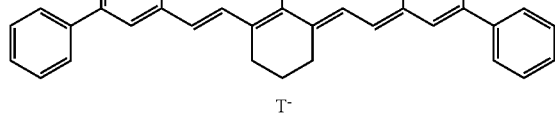
IRC-21
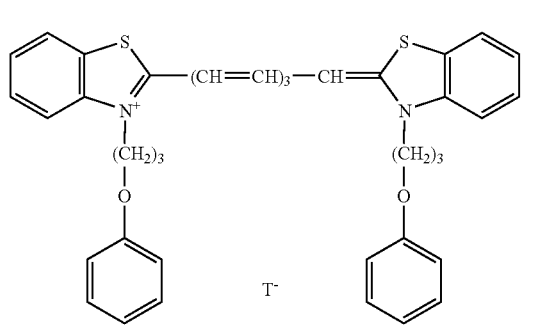
IRC-22
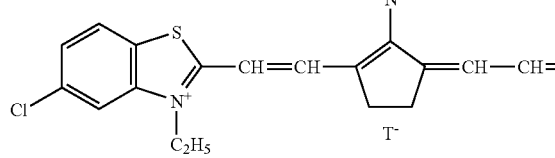

-continued
IRC-23
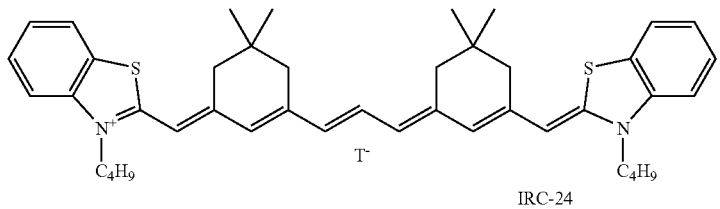
IRC-24
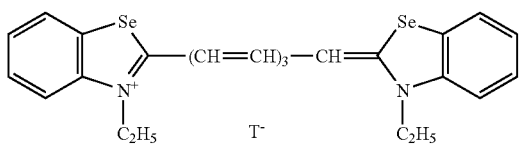
IRC-25
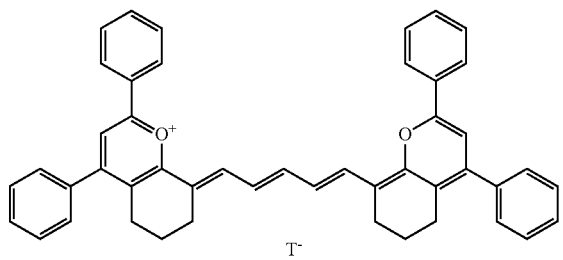
IRC-26
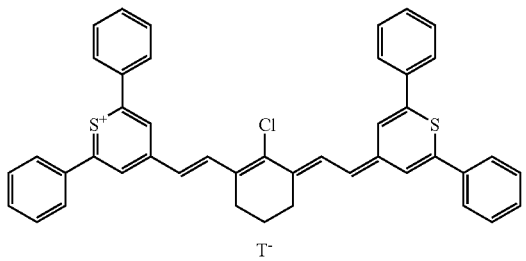
IRC-27
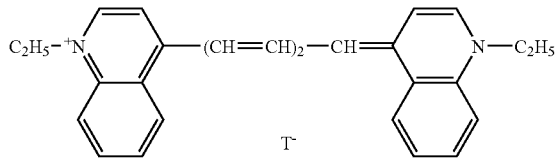
IRC-28
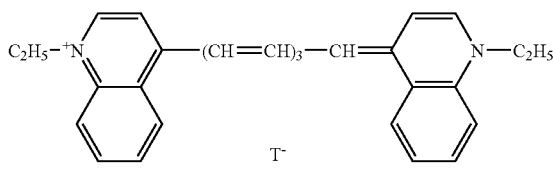
IRC-29
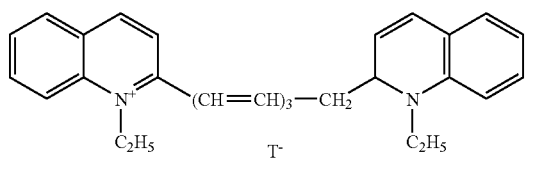
IRC-30
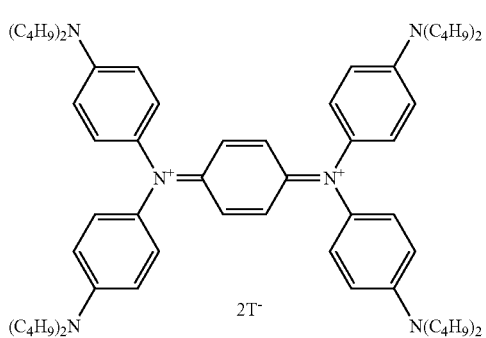
IRC-31
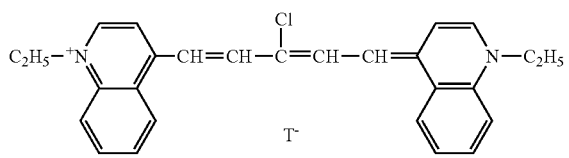
IRC-32
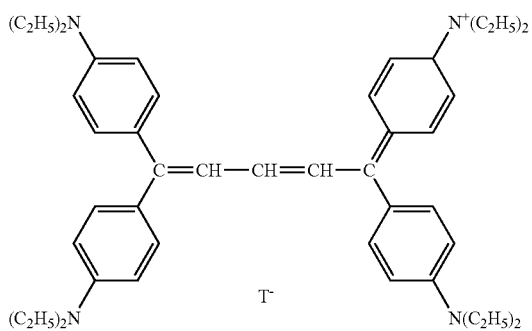
IRC-33

-continued
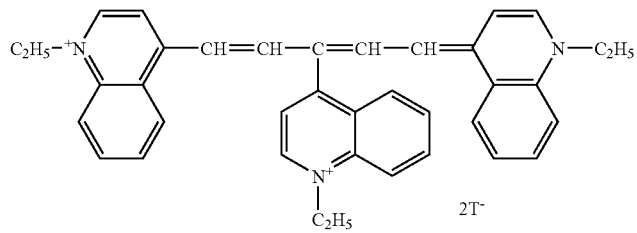
IRC-34
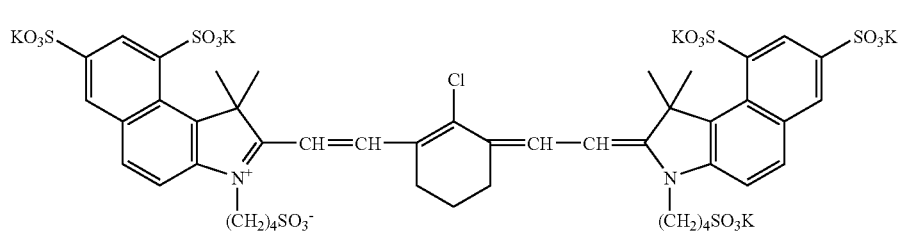
IRC-35
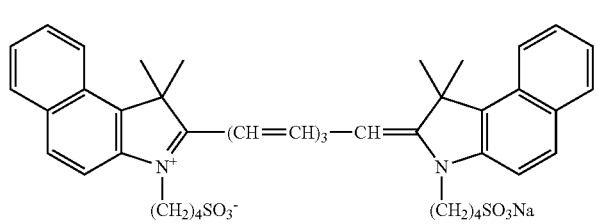
IRC-36
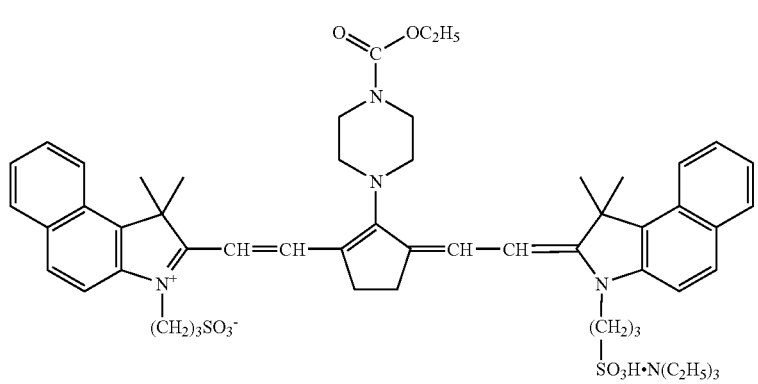
IRC-37
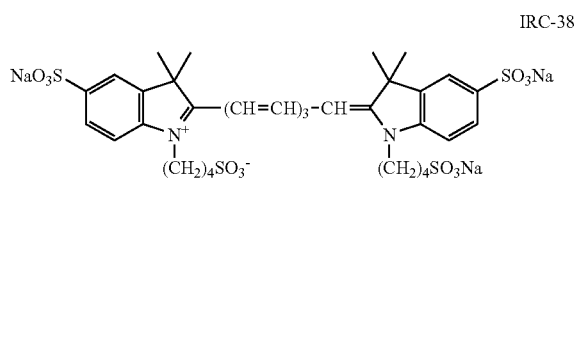
IRC-38
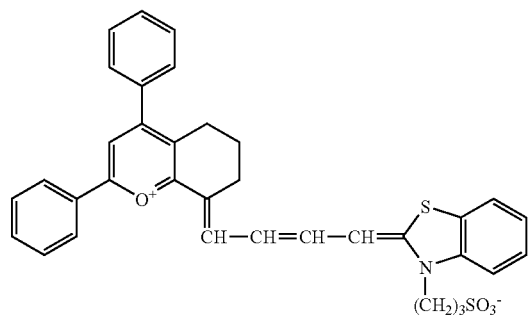
IRC-39

-continued

IRC-40
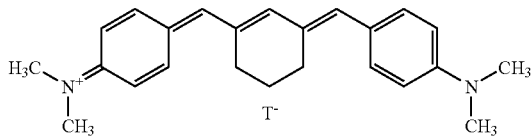

IRC-41
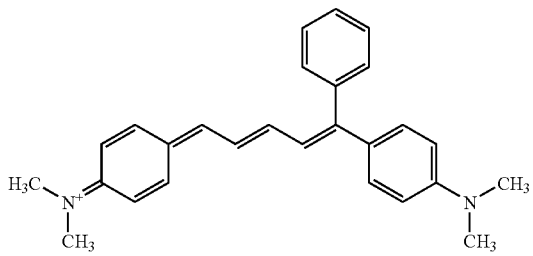

IRC-42
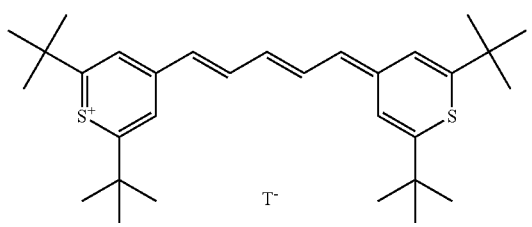

IRC-43
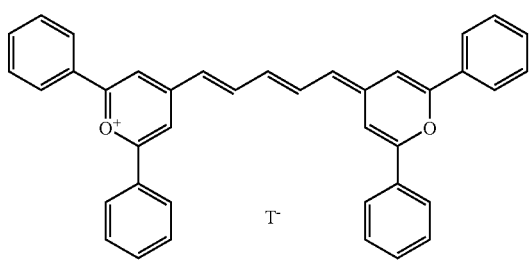

IRC-44
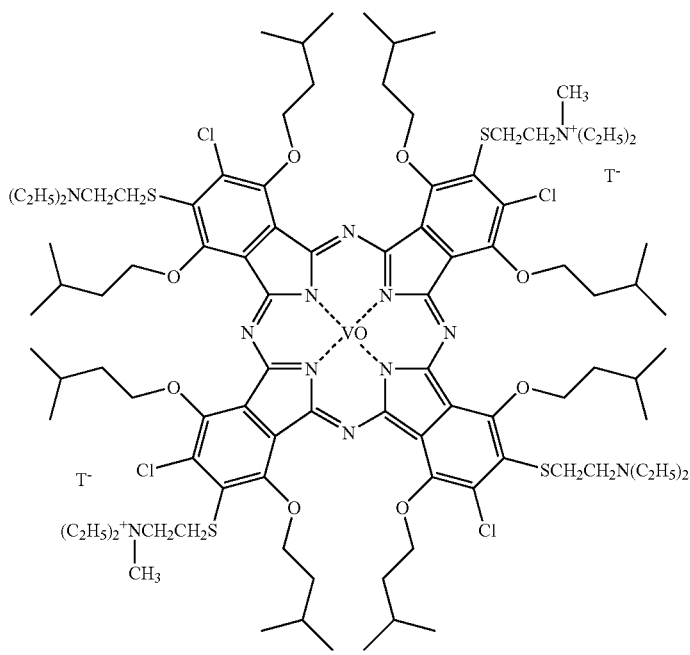

In the structural formulae given above, $T^-$ represents a monovalent counter anion and preferably is a halogen anion ($F^-$, $Cl^-$, $Br^-$, or $I^-$), Lewis acid anion ($BF_4^-$, $PF_6^-$, $SbCl_6^-$, or $ClO_4^-$), alkanesulfonic acid anion, or arenesulfonic acid anion.

The alkyl group in the alkanesulfonic acid is a linear, branched, or cyclic alkyl group having 1-20 carbon atoms. Examples thereof include methyl, ethyl, propyl, butyl, pentyl, hexyl, heptyl, octyl, nonyl, decyl, undecyl, dodecyl, tridecyl, hexadecyl, octadecyl, eicosyl, isopropyl, isobutyl, s-butyl, t-butyl, isopentyl, neopentyl, 1-methylbutyl, iso-hexyl, 2-ethylhexyl, 2-methylhexyl, cyclohexyl, cyclopentyl, and 2-norbornyl. More preferred of these are the linear alkyl groups having 1-12 carbon atoms, the branched alkyl groups having 3-12 carbon atoms, and the cycloalkyl groups having 5-10 carbon atoms.

The aryl group in the arenesulfonic acid is one consisting of one benzene ring, one consisting of a fused ring formed from two or three benzene rings, or one consisting of a fused ring formed from one or more benzene rings and one or more five-membered unsaturated rings. Examples thereof include phenyl, naphthyl, anthryl, phenanthryl, indenyl, acenaphthenyl, and fluorenyl. More preferred of these are phenyl and naphthyl.

The following nonionic infrared absorbers IRN-1 to IRN-9 can also be advantageously used.

IRN-1
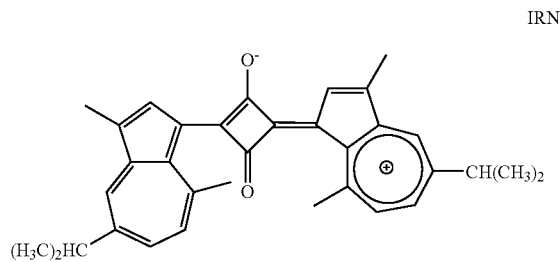
IRN-2
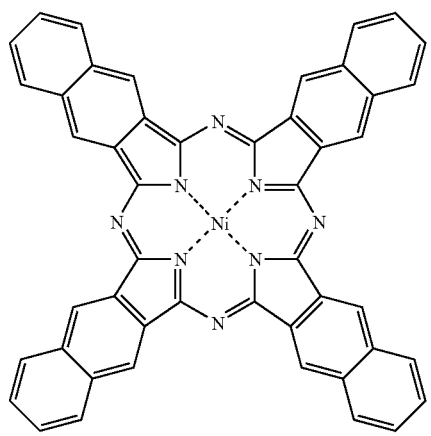
IRN-4
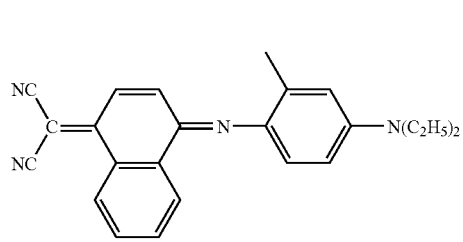
IRN-3
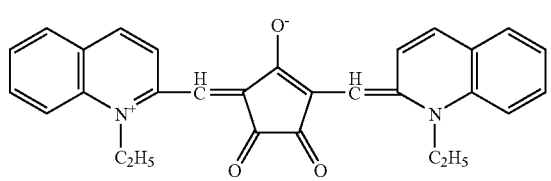
IRN-5
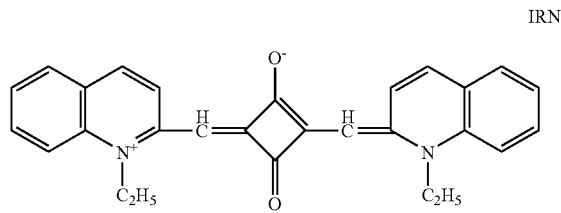
IRN-6
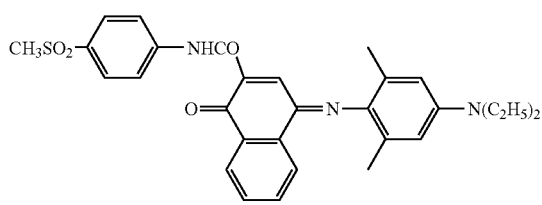
IRN-7
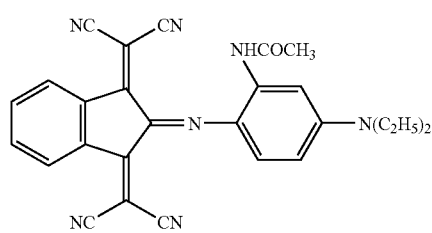

-continued

IRN-8

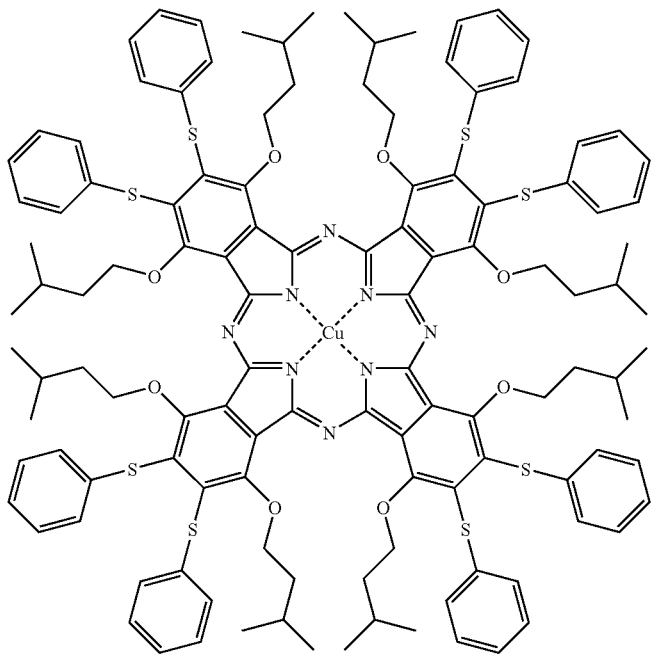

IRN-9

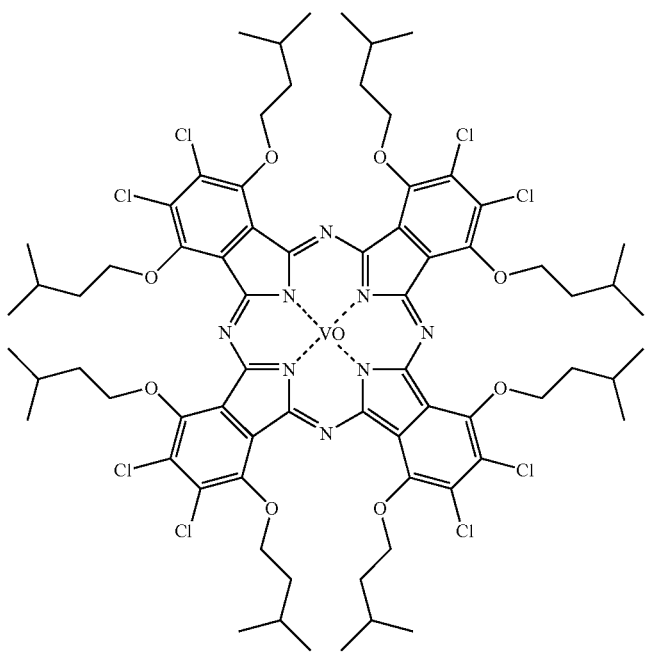

Especially preferred examples among the infrared absorber compounds shown above include anionic infrared absorber IRA-1, cationic infrared absorbers IRC-7, IRC-30, IRC-40, and IRC-42, and nonionic infrared absorber IRN-9.

<Pigments>

The pigments usable in the invention are commercial pigments and pigments described in *Color Index* (*C.I.*) *Binran, Saishin Ganryô Binran* (edited by Japan Association of Pigment Technology, published in 1977), *Saishin Ganryô Ôyô Gijutsu* (CMC Publishing Co., Ltd., published in 1986), and *Insatsu Inki Gijutsu* (CMC Publishing Co., Ltd., published in 1984).

Examples of the kinds of such pigments include black pigments, yellow pigments, orange pigments, brown pigments, red pigments, violet pigments, blue pigments, green pigments, fluorescent pigments, metal powder pigments, and polymer-bonded dyes. Specific examples thereof include insoluble azo pigments, azo lake pigments, condensation azo pigments, chelate azo pigments, phthalocyanine pigments, anthraquinone pigments, perylene and perinone pigments, thioindigo pigments, quinacridone pigments, dioxazine pigments, isoindolinone pigments, quinophthalone pigments, dyed lake pigments, azine pigments, nitroso pigments, nitro pigments, natural pigments, fluorescent pigments, inorganic pigments, and carbon black. Preferred of these pigments is carbon black.

Those pigments maybe used without being surface-treated, or may be used after having undergone a surface treatment. Possible techniques for the surface treatment include a method in which the pigment surface is coated with a resin or wax, a method in which a surfactant is adhered, and a method in which a reactive substance (e.g., a silane coupling agent, epoxy compound, or polyisocyanate) is bonded to the pigment surface. These surface treatment techniques are described in *Kinzoku Sekken No Seishitsu To Ôyô* (Saiwai Shobo), *Insatsu Inki Gijutsu* (CMC Publishing Co., Ltd., published in 1984), and *Saishin Ganryô Ôyô Gijutsu* (CMC Publishing Co., Ltd., published in 1986).

The particle diameter of the pigments is in the range of preferably 0.01-10 μm, more preferably 0.05-1 μm, especially preferably 0.1-1 μm. Pigment particle diameters smaller than 0.01 μm are undesirable from the standpoint of dispersion stability in a coating fluid for image-recording layer formation, while pigment particle diameters exceeding 10 μm are undesirable from the standpoint of the evenness of an image recording layer.

For dispersing the pigments, known dispersion techniques for use in ink production, toner production, or the like can be used. Examples of dispersing machines include an ultrasonic disperser, sand mill, attritor, pearl mill, supermill, ball mill, impeller, disperser, KD mill, colloid mill, dynatron, three-roll mill, and pressure kneader. Such dispersion techniques are described in detail in *Saishin Ganryô Ôyô Gijutsu* (CMC Publishing Co., Ltd., published in 1986).

Although the infrared absorber used for accelerating the curing reaction of the polymerizable composition of the invention may be directly added to the composition together with other ingredients, it is also possible to separately form a layer containing the infrared absorber adjacently to a layer of the polymerizable composition. This can produce the same effect.

Especially when the polymerizable composition of the invention is used as the negative type image-recording layer of a lithographic printing plate precursor which will be described later, then the infrared absorber may be added to the same layer in the image recording layer as the other ingredients or may be incorporated in another layer formed separately. It is, however, preferred that when a negative type image-recording layer is formed, the optical density of the recording layer, as measured at an absorption maximum in the wavelength range of 300-1,200 nm, be in the range of 0.1-3.0. In case where the optical density thereof is outside the range, sensitivity tends to decrease. Since optical density is determined by the amount of the sensitizing dye added and the thickness of the recording layer, a given value of optical density is obtained by regulating these two factors. The optical density of a recording layer can be measured by ordinary methods. Examples of the measuring methods include: a method in which a recording layer is formed on a transparent or white substrate by coating in an amount which on a dry basis corresponds to a thickness suitably determined so as to be in the range necessary for lithographic printing plates and this recording layer is examined with a transmission type optical densitometer; and a method in which a recording layer is formed on a reflective substrate, e.g., aluminum, and the reflection density thereof is measured.

(C) Radical Polymerization Initiator

The polymerizable composition of the invention is characterized by containing a radical polymerization initiator. The term "radical polymerization initiator" means a compound which generates radicals by the action of light and/or heat energy and thus initiates and accelerates the polymerization reaction of the radical-polymerizable compound (D) which will be described later.

Preferred examples of the radical polymerization initiator in the invention include (a) aromatic ketones, (b) onium salt compounds, (c) organic peroxides, (d) thio compounds, (e) hexaarylbiimidazole compounds, (f) ketoxime ester compounds, (g) borate compounds, (h) azinium compounds, (i) metallocene compounds, (j) active ester compounds, (k) compounds having a carbon-halogen bond, and (l) azo compounds. Specific examples of these compounds (a) to (l) are shown below. However, the radical polymerization initiator to be used in the invention should not be construed as being limited to these examples.

(a) Aromatic Ketones

Examples of the aromatic ketones (a) which are preferred radical polymerization initiators for use in the invention include the compounds having a benzophenone framework or thioxanthone framework which are shown in J. P. Fouassier and J. F. Rabek, *RADIATION CURING IN POLYMER SCIENCE AND TECHNOLOGY* (1993), PP. 77-117. For example, the following are included.

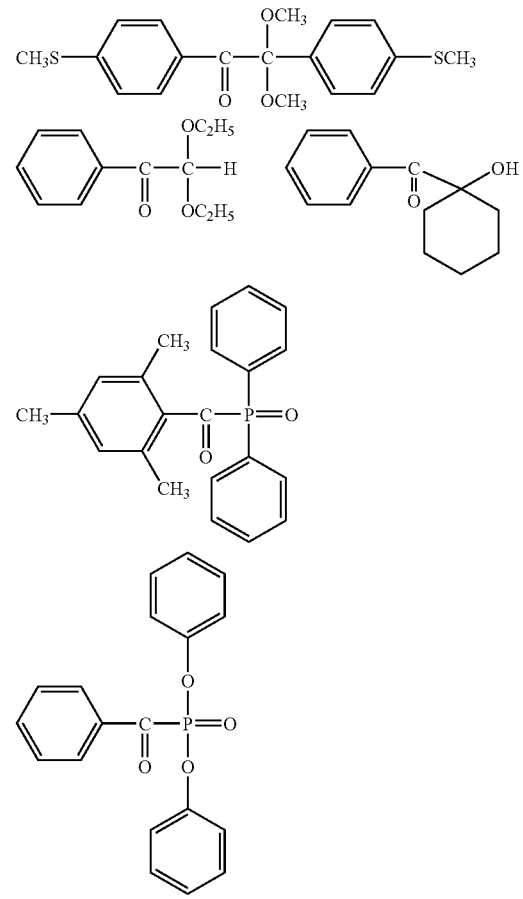

-continued

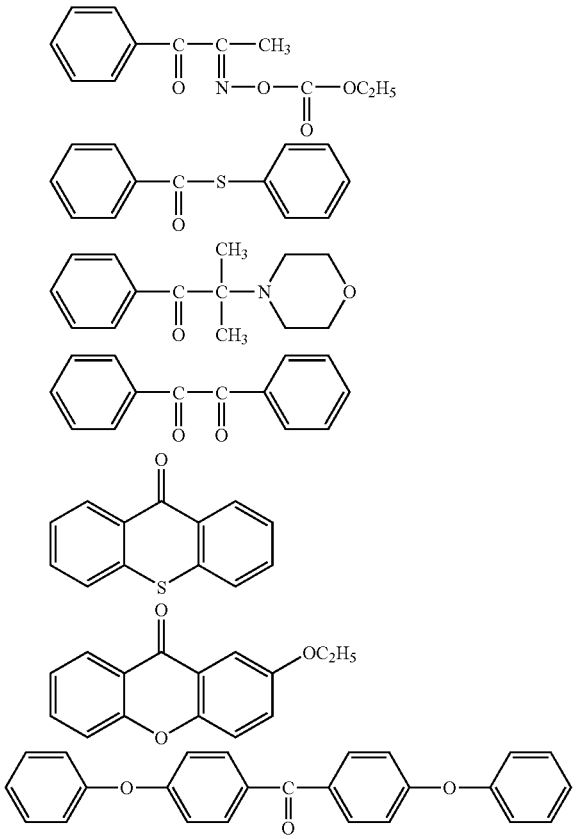

Of these, especially preferred examples of the aromatic ketones (a) include the α-thiobenzophenone compounds shown in JP-B-47-6416 and the benzoin ester compounds shown in JP-B-47-3981, for example, the following compound.

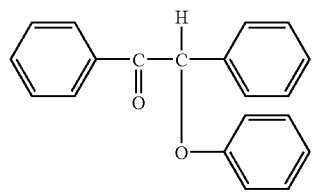

Especially preferred examples thereof further include the α-substituted benzoin compounds shown in JP-B-47-22326, for example, the following compound.

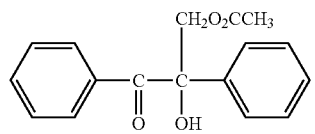

Especially preferred examples thereof furthermore include the benzoin derivatives shown in JP-B-47-23664, the aroylphosphonic esters shown in JP-A-57-30704, and the dialkoxybenzophenones shown in JP-B-60-26483, for example, the following compound.

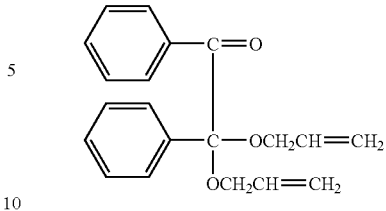

Especially preferred examples thereof still further include the benzoic ethers shown in JP-B-60-26403 and JP-A-62-81345, for example, the following compound.

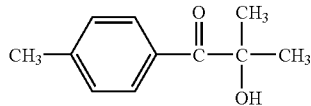

Especially preferred examples thereof still further include the α-aminobenzophenone compounds shown in JP-B-1-34242, U.S. Pat. No. 4,318,791, and European Patent 0284561 A1, for example, the following compounds.

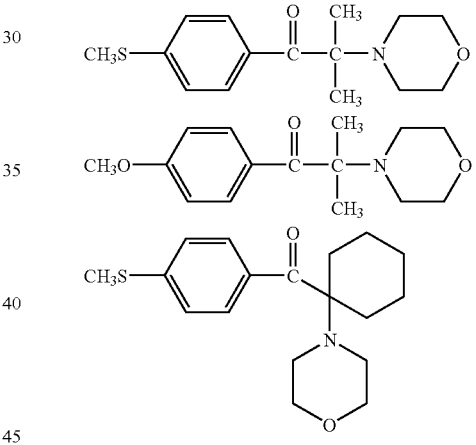

Especially preferred examples thereof still further include p-di(dimethylaminobenzoyl)benzene, the following. compound, which is shown in JP-A-2-211452.

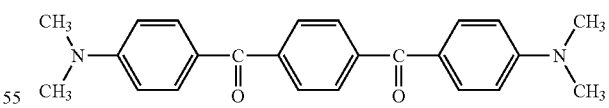

Especially preferred examples thereof still further include the thio-substituted aromatic ketones shown in JP-A-61-194062, for example, the following compound.

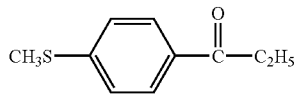

Especially preferred examples thereof still further include the acylphosphine sulfides shown in JP-B-2-9597, for example, the following compounds.

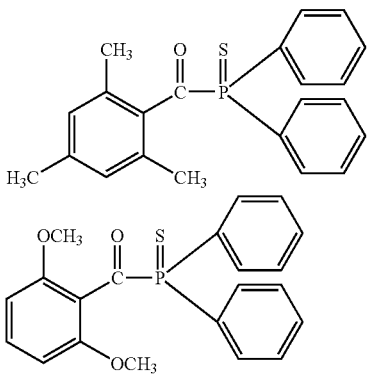

Especially preferred examples thereof still further include the acylphosphines shown in JP-B-2-9596, for example, the following compounds.

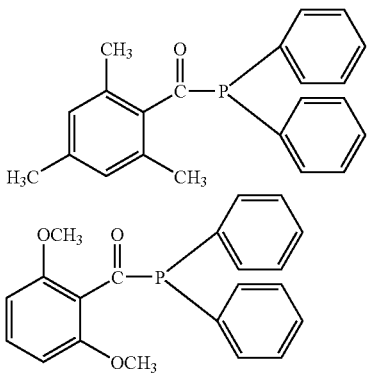

Especially preferred examples thereof still further include the thioxanthone compounds shown in JP-B-63-61950 and the coumarin compounds shown in JP-B-59-42864.

(b) Onium Salt Compounds

Examples of the onium salt compounds (b) which are preferred radical polymerization initiators for use in the invention include compounds represented by the following formulae (1) to (3).

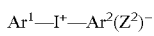 Formula (1)

 Formula (2)

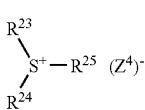 Formula (3)

In formula (1), $Ar^1$ and $Ar^2$ each independently represents an aryl group which has up to 20 carbon atoms and may have one or more substituents. In the case where this aryl group has one or more substituents, preferred examples of the substituents include halogen atoms, nitro, alkyl groups having up to 12 carbon atoms, alkoxy groups having up to 12 carbon atoms, and aryloxy groups having up to 12 carbon atoms. $(Z^2)^-$ represents a counter ion selected from the group consisting of a halogen ion, perchloric acid ion, carboxylic acid ion, tetrafluoroborate ion, hexafluorophosphate ion, and sulfonic acid ion. Preferred of these are a perchloric acid ion, a hexafluorophosphate ion, and an arenesulfonic acid ion.

In formula (2), $Ar^3$ represents an aryl group which has up to 20 carbon atoms and may have one or more substituents. Preferred examples of the substituents include halogen atoms, nitro, alkyl groups having up to 12 carbon atoms, alkoxy groups having up to 12 carbon atoms, aryloxy groups having up to 12 carbon atoms, alkylamino groups having up to 12 carbon atoms, dialkylamino groups having up to 12 carbon atoms, arylamino groups having up to 12 carbon atoms, and diarylamino groups having up to 12 carbon atoms. $(Z^3)^-$ represents a counter ion, which has the same meaning as $(Z^2)^-$.

In formula (3), $R^{23}$, $R^{24}$, and $R^{25}$ may be the same or different and each represent a hydrocarbon group which has up to 20 carbon atoms and may have one or more substituents. Preferred examples of the substituents include halogen atoms, nitro, alkyl groups having up to 12 carbon atoms, alkoxy groups having up to 12 carbon atoms, and aryloxy groups having up to 12 carbon atoms. $(Z^4)^-$ represents a counter ion, which has the same meaning as $(Z^2)^-$.

Specific examples of the onium salts suitable for use in the invention include the onium salts previously proposed by the applicant in Japanese Patent Application No. 11-310623, paragraphs Nos. [0030]-[0033] and in Japanese Patent Application No. 2000-160323, paragraphs Nos. [0015]-[0046] and the specific aromatic sulfonium salt compounds previously proposed by the applicant in Japanese Patent Applications Nos. 2000-266797, 2001-177150, 2000-160323, 2000-184603, 2000-310808, 2002-265467, and 2002-366539.

The onium salt to be used in the invention has a maximum-absorption wavelength of preferably 400 nm or shorter, more preferably 360 nm or shorter. By using such an onium salt having an absorption wavelength in the ultraviolet region, the lithographic printing plate precursor can be handled in white light.

(c) Organic Peroxides

Examples of the organic peroxides (c) which are preferred radical polymerization initiators for use in the invention include almost all of the organic compounds having one or more oxygen-oxygen bonds in the molecule. Specific examples thereof include methyl ethyl ketone peroxide, cyclohexanone peroxide, 3,3,5-trimethylcyclohexanone peroxide, methylcyclohexanone peroxide, acetylacetone peroxide, 1,1-bis(t-butylperoxy)-3,3,5-trimethylcyclohexane, 1,1-bis(t-butylperoxy)cyclohexane, 2,2-bis(t-butylperoxy) butane, t-butyl hydroperoxide, cumene hydroperoxide, diisopropylbenzene hydroperoxide, paramethane hydroperoxide, 2,5-dimethylhexane 2,5-dihydroperoxide, 1,1,3,3-tetramethylbutyl hydroperoxide, di-t-butyl hydroperoxide, t-butyl cumyl peroxide, dicumyl peroxide, bis(t-butylperoxyisopropyl)benzene, 2,5-dimethyl-2,5-di(t-butylperoxy) hexane, hexanoyl peroxide, succinic acid peroxide, benzoyl peroxide, 2,4-dichlorobenzoyl peroxide, m-toluoyl peroxide, diisopropyl peroxydicarbonate, di-2-ethylhexyl peroxydicarbonate, di-2-ethoxyethyl peroxydicarbonate, dimethoxyisopropyl peroxycarbonate, di(3-methyl-3-methoxybutyl) peroxydicarbonate, t-butyl peroxyacetate, t-butyl peroxypivalate, t-butyl peroxyneodecanoate, t-butyl peroxyoctanoate, t-butyl peroxy-3,5,5-trimethylhexanoate, t-butyl peroxylaurate, t-butyl peroxycarbonate, 3,3',4,4'-tetra(t-butylperoxycarbonyl)benzophenone, 3,3',4,4'-tetra(t-amylperoxycarbonyl)benzophenone, 3,3',4,4'-tetra(t-hexylperoxycarbonyl)benzophenone, 3,3',4,4'-tetra(t-octylperoxycarbonyl)benzophenone, 3,3',4,4'-tetra (cumylperoxycarbonyl)benzophenone, 3,3',4,4'-tetra(p-isopropylcumylperoxycarbonyl)benzophenone, carbonyldi(t-butyl peroxydihydrogenediphthalate), and carbonyldi(t-hexyl peroxydihydrogenediphthalate).

Preferred of these are ester peroxides such as 3,3',4,4'-tetra(t-butylperoxycarbonyl)benzophenone, 3,3',4,4'-tetra(t-amylperoxycarbonyl)benzophenone, 3,3',4,4'-tetra(t-hexylperoxycarbonyl)benzophenone, 3,3',4,4'-tetra(t-octylperoxycarbonyl)benzophenone, 3,3',4,4'-tetra (cumylperoxycarbonyl)benzophenone, 3,3',4,4'-tetra(p-isopropylcumylperoxycarbonyl)benzophenone, and di-t-butyl diperoxyisophthalate.

(d) Thio Compounds

Examples of the thio compounds (d) which are preferred radical polymerization initiators for use in the invention include compounds having a structure represented by the following formula (4).

Formula (4)

(In the formulae, $R^{26}$ represents an alkyl, aryl, or substituted aryl group, and $R^{27}$ represents a hydrogen atom or an alkyl group, provided that $R^{26}$ and $R^{27}$ may represent groups of non-metallic atoms which are necessary, when $R^{26}$ and $R^{27}$ are bonded to each other, for forming a five- to seven-membered ring optionally containing one or more heteroatoms selected from oxygen, sulfur, and nitrogen atoms.)

The alkyl groups in formula (4) preferably are ones having 1-4 carbon atoms. The aryl groups preferably are ones having 6-10 carbon atoms, such as phenyl and naphthyl. Examples of the substituted aryl groups include such aryl groups which have been substituted with one or more substituents selected from halogen atoms such as chlorine, alkyl groups such as methyl, and alkoxy groups such as methoxy and ethoxy. $R^{27}$ preferably is an alkyl group having 1-4 carbon atoms. Specific examples of the thio compounds represented by formula (4) include the

| No. | $R^{26}$ | $R^{27}$ |
|---|---|---|
| 1 | —H | —H |
| 2 | —H | —CH₃ |
| 3 | —CH₃ | —H |
| 4 | —CH₃ | —CH₃ |
| 5 | —C₆H₅ | —C₂H₅ |
| 6 | —C₆H₅ | —C₄H₉ |
| 7 | —C₆H₄Cl | —CH₃ |
| 8 | —C₆H₄Cl | —C₄H₉ |
| 9 | —C₆H₄—CH₃ | —C₄H₉ |
| 10 | —C₆H₄—OCH₃ | —CH₃ |
| 11 | —C₆H₄—OCH₃ | —C₂H₅ |
| 12 | —C₆H₄—OC₂H₅ | —CH₃ |
| 13 | —C₆H₄—OC₂H₅ | —C₂H₅ |
| 14 | —C₆H₄—OCH₃ | —C₄H₉ |
| 15 | | —(CH₂)₂— |
| 16 | | —(CH₂)₂—S— |
| 17 | | —CH(CH₃)—CH₂—S— |
| 18 | | —CH₂—CH(CH₃)—S— |
| 19 | | —C(CH₃)₂—CH₂—S— |
| 20 | | —CH₂—C(CH₃)₂—S— |
| 21 | | —(CH₂)₂—O— |
| 22 | | —CH(CH₃)—CH₂—O— |
| 23 | | —C(CH₃)₂—CH₂—O— |
| 24 | | —CH=CH—N(CH₃)— |
| 25 | | —(CH₂)₃—S— |
| 26 | | —(CH₂)₂—CH(CH₃)—S— |
| 27 | | —(CH₂)₃—O— |
| 28 | | —(CH₂)₅— |
| 29 | | —C₆H₄—O— |
| 30 | | —N=O(SCH₃)—S— |
| 31 | | —C₆H₄—NH— |
| 32 | | 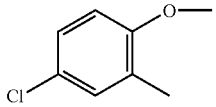 |

(e) Hexaarylbiimidazole Compounds

Examples of the hexaarylbiimidazole compounds (e) which are preferred radical polymerization initiators for use in the invention include the lophine dimer compounds shown in JP-B-45-37377 and JP-B-44-86516, e.g., 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl)biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole, and 2,2'-bis(o-trifluoromethylphenyl)-4,4',5,5'-tetraphenylbiimidazole.

(f) Ketoxime Ester Compounds

Examples of the ketoxime ester compounds (f) which are preferred radical polymerization initiators for use in the invention include 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one, and 2-ethyoxycarbonyloxyimino-1-phenylpropan-1-one.

(g) Borate Compounds

Examples of the borate compounds (g) which are preferred radical polymerization initiators for use in the invention include compounds represented by the following formula (5).

Formula (5)

(In the formula, $R^{28}$, $R^{29}$, $R^{30}$, and $R^{31}$ may be the same or different and each represent an optionally substituted alkyl, optionally substituted aryl, optionally substituted alkenyl, optionally substituted alkynyl, or optionally substituted heterocyclic group, provided that two or more of $R^{28}$, $R^{29}$, $R^{30}$, and $R^{31}$ may be bonded to each other to form a ring structure, and that at least one of $R^{28}$, $R^{29}$, $R^{30}$, and $R^{31}$ is an optionally substituted alkyl group. $(Z^5)^+$ represents an alkali metal cation or a quaternary ammonium cation.)

Examples of the alkyl groups represented by $R^{28}$ to $R^{31}$ include linear, branched and cyclic ones preferably having 1-18 carbon atoms. Specific examples thereof include methyl, ethyl, propyl, isopropyl, butyl, pentyl, hexyl, octyl, stearyl, cyclobutyl, cyclopentyl, and cyclohexyl. Examples of the substituted alkyl groups include such alkyl groups which have one or more substituents selected from halogen atoms (e.g., —Cl and —Br), cyano, nitro, aryl groups (preferably phenyl), hydroxy, —COOR$^{32}$ (wherein R$^{32}$ represents a hydrogen atom, an alkyl group having 1-14 carbon atoms, or an aryl group), —OCOR$^{33}$ or —OR$^{34}$ (wherein R$^{33}$ and R$^{34}$ represent an alkyl group having 1-14 carbon atoms or an aryl group), and groups represented by the following formula.

(In the formula, R$^{35}$ and R$^{36}$ each independently represent a hydrogen atom, an alkyl group having 1-14 carbon atoms, or an aryl group.)

Examples of the aryl groups represented by R$^{28}$ to R$^{31}$ include mono- to tricyclicaryl groups such as phenyl and naphthyl. Examples of the substituted aryl groups include such aryl groups which have one or more substituents selected from the substituents for the substituted alkyl groups and from alkyl groups having 1-14 carbon atoms. Examples of the alkenyl groups represented by R$^{28}$ to R$^{31}$ include linear, branched, and cyclic ones having 2-18 carbon atoms. Examples of the substituents for the substituted alkenyl groups include those enumerated above as substituents for the substituted alkyl groups. Examples of the alkynyl groups represented by R$^{28}$ to R$^{31}$ include linear or branched ones having 2-28 carbon atoms. Examples of the substituents for the substituted alkynyl groups include those enumerated above as substituents for the substituted alkyl groups. Examples of the heterocyclic groups represented by R$^{28}$ to R$^{31}$ include five-membered and larger, preferably five- to seven-membered, heterocyclic groups containing at least one of nitrogen, sulfur, and oxygen atoms. These heterocyclic groups may include fused rings. The heterocyclic groups may have one or more substituents selected from those enumerated above as substituents for the substituted aryl groups. Specific examples of the compounds represented by formula (5) include the compounds shown in U.S. Pat. Nos. 3,567,453 and 4,343,891 and European Patents 109,772 and 109,773 and the following compounds.

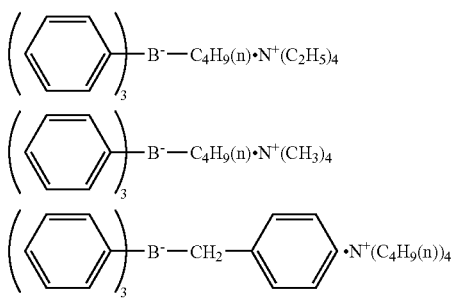

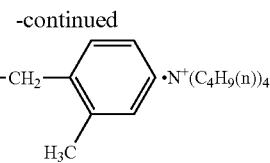

(h) Azinium Compounds

Examples of the azinium compounds (h) which are preferred radical polymerization initiators for use in the invention include the compounds having an N—O bond which are shown in JP-A-63-138345, JP-A-63-142345, JP-A-63-142346, JP-A-63-143537, and JP-B-46-42363.

(i) Metallocene Compounds

Examples of the metallocene compounds (i) which are preferred radical polymerization initiators for use in the invention include the titanocene compounds shown in JP-A-59-152396, JP-A-61-151197, JP-A-63-41484, JP-A-2-249, and JP-A-2-4705 and the iron-arene complexes shown in JP-A-1-304453 and JP-A-1-152109.

Examples of the titanocene compounds include dicyclopentadienyltitanium dichloride, dicyclopentadienyltitanium bisphenyl, dicyclopentadienyltitanium bis-2,3,4,5,6-pentafluorophen-1-yl, dicyclopentadienyltitanium bis-2,3,5,6-tetrafluorophen-1-yl, dicyclopentadienyltitanium bis-2,4,6-trifluorophen-1-yl, dicyclopentadienyltitanium 2,6-difluorophen-1-yl, dicyclopentadienyltitanium bis-2,4-difluorophen-1-yl, di(methylcyclopentadienyl)titanium bis-2,3,4,5,6-pentafluorophen-1-yl, di(methylcyclopentadienyl)titanium bis-2,3,5,6-tetrafluorophen-1-yl, di(methylcyclopentadienyl)titanium bis-2,4-difluorophen-1-yl, bis(cyclopentadienyl)bis(2,6-difluoro-3-(pir-1-yl)phenyl)titanium, bis(cyclopentadienyl)bis[2,6-difluoro-3-(methylsulfonamido)phenyl]titanium, bis(cyclopentadienyl)bis[2,6-difluoro-3-(N-butylbiaroylamino)phenyl]titaniums, bis(cyclopentadienyl)bis[2,6-difluoro-3(N-butyl-(4-chlorobenzyl)amino)phenyl]titanium, bis(cyclopentadienyl)bis[2,6-difluoro-3-(N-benzyl-2,2-dimethylpentanoylamino)phenyl]titanium, bis(cyclopentadienyl)bis[2,6-difluoro-3-(N-(2-ethylhexyl)-4-tolylsulfonyl)amino]phenyl]titanium, bis(cyclopentadienyl)bis[2,6-difluoro-3-(N-(3-oxaheptyl)benzoylamino)phenyl]titanium, bis(cyclopentadienyl)bis[2,6-difluoro-3-(N-(3,6-dioxadecyl)benzoylamino)phenyl]titanium, bis(cyclopentadienyl)bis[2,6-difluoro-3-(trifluoromethylsulfonyl)amino]phenyl]titanium, bis(cyclopentadienyl)bis[2,6-difluoro-3-(trifluoroacetylamino)phenyl]titanium, bis(cyclopentadienyl)bis[2,6-difluoro-3-(2-chlorobenzoyl)amino]phenyl]titanium, bis(cyclopentadienyl)bis[2,6-difluoro-3-(4-chlorobenzoyl)amino]phenyl]titanium, bis(cyclopentadienyl)bis[2,6-difluoro-3-(N-(3,6-dioxadecyl)-2,2-dimethylpentanoylamino)phenyl]titanium, bis(cyclopentadienyl)bis[2,6-difluoro-3-(N-(3,7-dimethyl-7-methoxyoctyl)benzoylamino)phenyl]titanium, and bis(cyclopentadienyl)bis[2,6-difluoro-3-(N-cyclohexylbenzoylamino)phenyl]titanium.

(j) Active Ester Compounds

Examples of the active ester compounds (j) which are preferred radical polymerization initiators for use in the invention include the imidosulfonate compounds shown in JP-B-62-6223 and the active sulfonates shown in JP-B-63-14340 and JP-A-59-174831.

(k) Compounds having Carbon-Halogen Bond

Examples of the compounds having a carbon-halogen bond (k) which are preferred radical polymerization initiators for use in the invention include compounds represented by the following formulae (6) to (12).

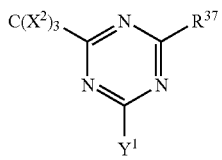

Formula (6)

(In formula (6), $X^2$ represents a halogen atom; $Y^1$ represents $-C(X^2)_3$, $-NH_2$, $-NHR^{38}$, $-NR^{38}$, or $OR^{38}$, wherein $R^{38}$ represents an alkyl, substituted alkyl, aryl, or substituted aryl; and $R^{37}$ represents $-C(X^2)_3$ or an alkyl, substituted alkyl, aryl, substituted aryl, or substituted alkenyl.)

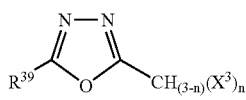

Formula (7)

(In formula (7), $R^{39}$ is an alkyl, substituted alkyl, alkenyl, substituted alkenyl, aryl, substituted aryl, halogen atom, alkoxy, substituted alkoxy, nitro, or cyano; $X^3$ is a halogen atom; and n is an integer of 1-3.)

Formula (8)

(In formula (8), $R^{40}$ is an aryl or a substituted aryl; $R^{41}$ is any of the groups shown below or a halogen; $Z^6$ is $-C(=O)-$, $-C(=S)-$, or $-SO_2-$; $X^3$ is a halogen atom; and m is 1 or 2.)

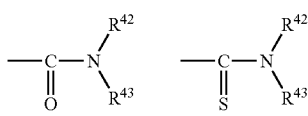

(In the formulae, $R^{42}$ and $R^{43}$ each are an alkyl, substituted alkyl, alkenyl, substituted alkenyl, aryl, or substituted aryl; and $R^{44}$ has the same meaning as $R^{38}$ in formula (6).)

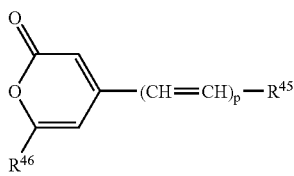

Formula (9)

(In formula (9), $R^{45}$ is an optionally substituted aryl or heterocyclic group; $R^{46}$ is a trihaloalkyl or trihaloalkenyl having 1-3 carbon atoms; and p is 1, 2, or 3.)

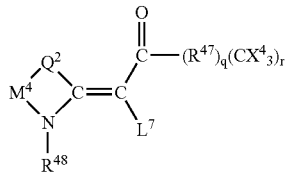

Formula (10)

(Formula (10) represents a carbonylmethylene heterocyclic compound having one or more trihalogenomethyl groups. $L^7$ is a hydrogen atom or a substituent of the moiety represented by the formula $CO-(R^{47})_q(C(X^4)_3)_r$; $Q^2$ is a sulfur, selenium, or oxygen atom, dialkylmethylene, alken-1,2-ylene, 1,2-phenylene, or N—R group; $M^4$ is an optionally substituted alkylene or alkenylene or a 1,2-arylene; $R^{48}$ is an alkyl, aralkyl, or alkoxyalkyl; $R^{47}$ is a carbocyclic or heterocyclic, divalent aromatic group; $X^4$ is a chlorine, bromine, or iodine atom; and q=0 and r=1, or q=1 and r=1 or 2.)

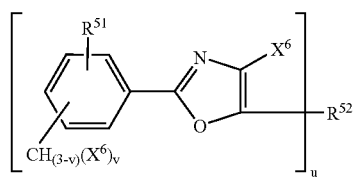

Formula (11)

(Formula (11) represents a 4-halogeno-5-(halogenomethylphenyl)oxazole derivative. $X^5$ is a halogen atom; t is an integer of 1-3; s is an integer of 1-4; $R^{49}$ is a hydrogen atom or a $CH_{3-t}X^5_t$ group; and $R^{50}$ is an optionally substituted, unsaturated organic group having the valence s.)

Formula (12)

(Formula (12) represents a 2-(halogenomethylphenyl)-4-halogenoxazole derivative. $X^6$ is a halogen atom; v is an integer of 1-3; u is an integer of 1-4; $R^{51}$ is a hydrogen atom or a $CH_{3-v}X^6_v$ group; and $R^{52}$ is an optionally substituted, unsaturated organic group having the valence u.)

Specific examples of such compounds having a carbon-halogen bond include the compounds shown in Wakabayashi et al., *Bull. Chem. Soc. Japan*, 42, 2924(1969), for example, 2-phenyl-4,6-bis(trichloromethyl)-s-triazine, 2-(p-chlorophenyl)-4,6-bis(trichloromethyl)-s-triazine, 2-(p-tolyl)-4,6-bis(trichloromethyl)-s-triazine, 2-(p-methoxyphenyl)-4,6-bis(trichloromethyl)-s-triazine, 2-(2',4'-dichlorophenyl)-4,6-bis(trichloromethyl)-s-triazine, 2,4,6-tris(trichloromethyl)-s-triazine, 2-methyl-4,6-bis (trichloromethyl)-s-triazine, 2-n-nonyl-4,6-bis(trichloromethyl)-s-triazine, and 2-(α,α,β-trichloroethyl)-4,6-bis(trichloromethyl)-s-triazine. Examples thereof further include the compounds shown in British Patent 1,388,492, for example, 2-styryl-4,6-bis(trichloromethyl)-s-triazine, 2-(p-methylstyryl)-4,6-bis(trichloromethyl)-s-triazine, 2-(p-methoxystyryl)-4,6-bis(trichloromethyl)-s-triazine, and 2-(p-methoxystyryl)-4-amino-6-trichloromethyl-s-triazine, the compounds shown in JP-A-53-133428, for example, 2-(4-methoxynaphth-1-yl)-4,6-bistrichloromethyl-s-triazine, 2-(4-ethoxynaphth-1-yl)-4,6-bistrichloromethyl-s-triazine, 2-[4-(2-ethoxyethyl)naphth-1-yl]-4,6-bistrichloromethyl-s-triazine, 2-(4,7-dimethoxynaphth-1-yl)-4,6-bistrichloromethyl-s-triazine and 2-(acenaphth-5-yl)-4,6-bistrichloromethyl-s-triazine, and the compounds shown in German Patent 3,337,024, for example, the following compounds.

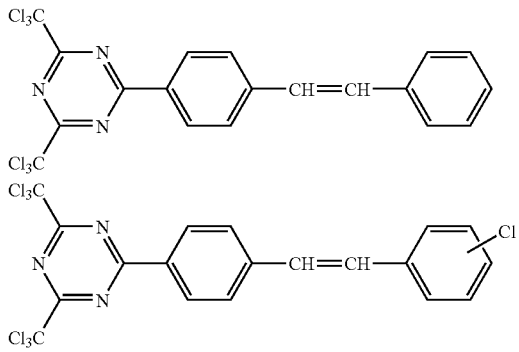

Examples of the compounds having a carbon-halogen bond further include the compounds shown in F. C. Schaefer et al., *J. Org. Chem.*, 29, 1527(1964), for example, 2-methyl-4,6-bis(tribromomethyl)-s-triazine, 2,4,6-tris(tribromomethyl)-s-triazine, 2,4,6-tris(dibromomethyl)-s-triazine, 2-amino-4-methyl-6-tribromomethyl-s-triazine, and 2-methoxy-4-methyl-6-trichloromethyl-s-triazine.

Examples thereof furthermore include the compounds shown in JP-A-62-58241, for example, the following compounds.

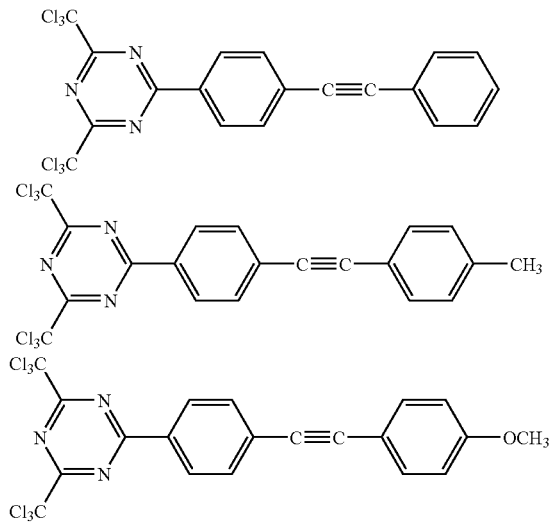

Examples thereof still further include the compounds shown in JP-A-5-281728, for example, the following compounds.

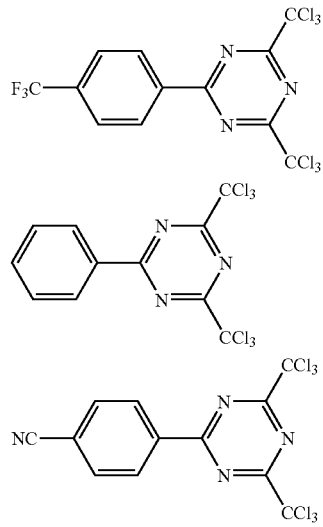

Examples thereof furthermore include the following compounds, which can be easily synthesized by persons skilled in the art according to the synthesis methods described in M. P. Hutt, E. F. Elslager, and L. M. Herbel, *Journal of Heterocyclic Chemistry*, Vol. 7 (No. 3), pp. 511- (1970).

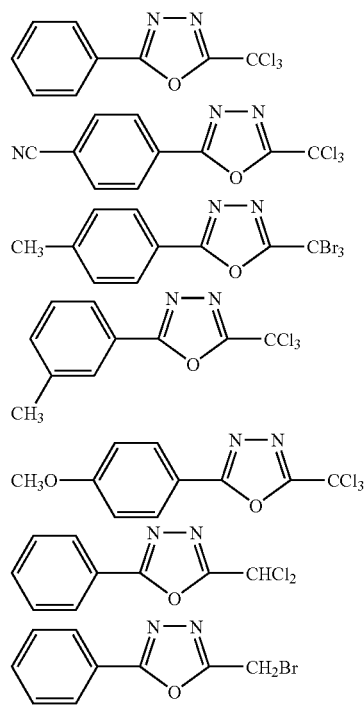

(l) Azo Compounds

Examples of azo compounds (l) which are preferred radical polymerization initiators for use in the invention include 2,2'-azobisisobutyronitrile, 2,2'-azobispropionitrile, 1,1'-azobis(cyclohexane-1-carbonitrile), 2,2'-azobis(2-methylbutyronitrile), 2,2'-azobis(2,4-dimethylvaleronitrile), 2,2'-azobis(4-methoxy-2,4-dimethylvaleronitrile), 4,4'-azobis(4-cyanovaleric acid), 2,2'-azobis(dimethylisobutyrate), 2,2'-azobis(2-methylpropionamide oxime), 2,2'-azobis[2-(2-imidazolin-2-yl)propane], 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N-butyl-2-methylpropionamide), 2,2'-azobis(N-cyclohexyl-2-methylpropionamide), 2,2'-azobis[N-(2-propenyl)-2-methylpropionamide], and 2,2'-azobis(2,4,4-trimethylpentane).

More preferred examples of the radical polymerization initiator in the invention include the aromatic ketones (a), onium salt compounds (b), organic peroxides (c), hexaarylbiimidazole compounds (e), metallocene compounds (i), and compounds having a carbon-halogen bond (k) described above. Most preferred examples thereof include aromatic iodonium salts, aromatic sulfonium salts, titanocene compounds, and the trihalomethyl-s-triazine compounds represented by formula (6).

These radical polymerization initiators can be added to the polymerizable composition in an amount of 0.1-50% by weight, preferably 0.5-30% by weight, especially preferably 5-20% by weight, based on all solid components of the polymerizable composition.

In the invention, such radical polymerization initiators can be advantageously used alone or in combination of two or more thereof.

(D) Radical-Polymerizable Compound

The radical-polymerizable compound to be used in the polymerizable composition of the invention is selected from compounds having at least one, preferably two or more ethylenically unsaturated bonds. Such compounds are well known in this industrial field and can be used in the invention without particular limitations. These are in chemical forms such as, e.g., a monomer, a prepolymer, i.e., dimer, trimer, or oligomer, a mixture of two or more of these, and a copolymer of two or more of these. Examples of the monomer and copolymers thereof include unsaturated carboxylic acids (e.g., acrylic acid, methacrylic acid, itaconic acid, crotonic acid, isocrotonic acid, and maleic acid) and esters and amides if these. Preferably, an ester of an unsaturated carboxylic acid with an aliphatic polyhydric alcohol compound or an amide of an unsaturated carboxylic acid with an aliphatic polyamine compound is used. Also preferably used are: a product of the addition reaction of an unsaturated carboxylic acid ester or amide having a nucleophilic substituent, such as hydroxyl, amino, or mercapto, with a mono- or polyfunctional isocyanate or epoxy; a product of a dehydrating condensation reaction with a mono- or polyfunctional carboxylic acid; and the like. Furthermore, a product of the addition reaction of an unsaturated carboxylic acid ester or amide having an electrophilic substituent, such as an isocyanate group or epoxy group, with a mono- or polyfunctional alcohol, amine, or thiol and a product of the substitution reaction of an unsaturated carboxylic acid ester or amide having an eliminable substituent, such as a halogen group or tosyloxy, with a mono- or polyfunctional alcohol, amine, or thiol are also preferred. Other usable examples include compounds obtained through these reactions using an unsaturated phosphonic acid, styrene, vinyl ether, or the like in place of the unsaturated carboxylic acid.

Examples of the monomeric ester of an aliphatic polyhydric alcohol compound with an unsaturated carboxylic acid include acrylic esters such as ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl) ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri(acryloyloxyethyl) isocyanurate, and polyester acrylate oligomers.

Examples of methacrylic esters include tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloxy-2-hydroxypropoxy)phenyl]dimethylmethane, and bis[p-(methacryloxyethoxy)phenyl]dimethylmethane.

Examples of itaconic esters include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate. Examples of crotonic esters include ethylene glycol dicrotonate, tetramethylene glycol dicrotonate, pentaerythritol dicrotonate, and sorbitol tetradicrotonate. Examples of isocrotonic esters include ethylene glycol diisocrotonate, pentaerythritol diisocrotonate, and sorbitol tetraisocrotonate. Examples of maleic esters include ethylene glycol dimaleate, triethylene glycol dimaleate, pentaerythritol dimaleate, and sorbitol tetramaleate.

Examples of other preferred esters include the aliphatic alcohol esters shown in JP-B-46-27926, JP-B-51-47334, and JP-A-57-196231, the esters having an aromatic framework which are shown in JP-A-59-5240, JP-A-59-5241, and JP-A-2-226149, and the esters having an amino group which are shown in JP-A-1-165613. The ester monomers mentioned above can be used also as a mixture of two or more thereof.

Examples of the monomeric amide of an aliphatic polyamine compound with an unsaturated carboxylic acid include methylenebisacrylamide, methylenebismethacrylamide, 1,6-hexamethylenebisacrylamide, 1,6-hexamethylenebismethacrylamide, diethylenetriaminetrisacrylamide, xylylenebisacrylamide, and xylylenebismethacrylamide. Other preferred examples of the amide monomer include the amides having a cyclohexylene structure which are described in JP-B-54-21726.

An addition-polymerizable urethane compound produced by the addition reaction of an isocyanate with hydroxyl groups is also preferred. Examples of this compound include the vinyl urethane compounds having two or more polymerizable vinyl groups per molecule which are described in JP-B-48-41708. These vinyl urethane compounds are obtained by causing a hydroxyl-containing vinyl monomer represented by the following formula to add to a polyisocyanate compound having two or more isocyanate groups per molecule.

$$CH_2=C(R_4)COOCH_2CH(R_5)OH$$

(In the formula, $R_4$ and $R_5$ each represent H or $CH_3$.)

Furthermore, the urethane acrylates shown in JP-A-51-37193, JP-B-2-32293, and JP-B-2-16765 and the urethane compounds having an ethylene oxide-based backbone which are shown in JP-B-58-49860, JP-B-56-17654, JP-B-62-39417, and JP-B-62-39418 are also preferred. In addition, when any of the addition-polymerizable compounds having an amino structure or sulfide structure in the molecule which are described in JP-A-63-277653, JP-A-63-260909, and JP-A-1-105238 is used, a polymerizable composition having exceedingly high rapidity of photoreaction can be obtained.

Other examples of the polymerizable compound include polyfunctional acrylates or methacrylates, such as the polyester acrylates shown in JP-A-48-64183, JP-B-49-43191, and JP-B-52-30490 and epoxy acrylates obtained by reacting an epoxy resin with (meth)acrylic acid. Examples thereof further include the specific unsaturated compounds shown in JP-B-46-43946, JP-B-1-40337, and JP-B-1-40336 and the vinylphosphonic acid compound shown in JP-A-2-25493. In some cases, the perfluoroalkyl-containing structure described in JP-A-61-22048 is advantageously used. Furthermore, the photocurable monomers and oligomers shown in *Nihon Setchaku Kyôkai-shi*, Vol. 20, No. 7, pp. 300-308 (1984) can be used.

Especially preferred of those radical-polymerizable compounds in the invention are the (meth) acrylic esters and/or compounds having an amide or urethane group in the molecule from the standpoint of compatibility with the specific polyamide or polyester resin (A).

Details of the structures of those radical-polymerizable compounds and of methods of using these, e.g., as to whether the compounds are used alone or in combination and the amount of the compounds to be added, can be determined at will according to the intended use thereof. In the case where the polymerizable composition of the invention is used, for example, as the recording layer of a lithographic printing plate precursor, the structures and methods of use are suitably determined according to the performance design of the final lithographic printing plate precursor. For example, selections are made from the following standpoints. From the standpoint of rapidity of photoreaction, a structure having a larger amount of unsaturated groups per molecule is preferred. In many cases, a structure having a functionality of 2 or higher is preferred. From the standpoint of enhancing the structure of image areas, i.e., cured film, a structure having a functionality of 3 or higher is preferred. To use a combination of compounds having different functionalities or different polymerizable groups (e.g., an acrylic ester, methacrylic ester, styrene compound, and vinyl ester compound) is an effective method for regulating both sensitivity and strength. Although compounds having a high molecular weight and compounds which are highly hydrophobic are excellent in rapidity of photoreaction and film strength, there are cases where use of such compounds is undesirable from the standpoints of development speed and precipitation in developing solutions. Furthermore, a selection of addition-polymerizable compounds and methods of using these are important factors which influence compatibility with and dispersibility in other ingredients in the recording layer (e.g., the binder polymer, initiator, colorant, etc.). For example, there are cases where use of a low-purity compound or use of a combination of two or more compounds can improve compatibility. There also are cases where a specific structure is selected for the purpose of improving adhesion to the substrate or the overcoat layer which will be described later or to another layer. With respect to the proportion of the radical-polymerizable compound in the recording layer, larger proportions are advantageous from the standpoint of sensitivity. However, too large proportions thereof not only result in undesirable phase separation, but also pose problems concerning production steps due to the tackiness of the recording layer (e.g., production failures due to transfer of recording layer components and adhesion) and other problems, e.g., precipitation from developing solutions. From these standpoints, those radical-polymerizable compounds are used in an amount in the range of preferably 5-80% by weight, more preferably 25-75% by weight, based on the nonvolatile components of the polymerizable composition. Those polymerizable compounds may be used alone or in combination of two or more thereof. In addition, with respect to methods of using radical-polymerizable compounds, it is possible to freely select appropriate structures, proportions, and addition amounts from the standpoints of the degree of polymerization inhibition by oxygen, resolution, susceptibility to fogging, refractive index change, surface tackiness, etc. In some cases, a layer constitution/coating method including undercoating and overcoating is possible.

(E) Other Binder Polymers

In the polymerizable composition of the invention, one or more other binder polymers (E) can be used according to need for the purpose of improving film properties, etc. It is preferred to use a linear organic polymer as another binder polymer. The "linear organic polymer" to be used can be any of known ones. It is, however, preferred to select a linear organic polymer which is soluble or swells in water or weakly alkaline water in order to enable development with water or with weakly alkaline water. A linear organic polymer to be used is selected according to not only use as a film-forming agent for image recording layers but also use as a development aid in development with water, weakly alkaline water, or an organic solvent. For example, use of a water-soluble organic polymer makes development with water possible. Examples of such linear organic polymers include radical polymers having carboxy groups in side chains, e.g., those shown in JP-A-59-44615, JP-B-54-34327, JP-B-58-12577, JP-B-54-25957, JP-A-54-92723, JP-A-59-53836, and JP-A-59-71048. Specifically, these polymers include methacrylic acid copolymers, acrylic acid copolymers, itaconic acid copolymers, crotonic acid copolymers, maleic acid copolymers, and partially esterified maleic acid copolymers. Examples thereof further include acid cellulose derivatives likewise having carboxy groups in side chains. Also useful besides these is a polymer obtained by causing a polymer having hydroxy groups to add a cyclic acid anhydride.

Especially preferred of those are (meth) acrylic resins having benzyl or aryl groups and carboxy groups in side chains and the alkali-soluble resins having double bonds in side chains which are described in, e.g., JP-A-2000-187322, JP-A-2002-62648, Japanese Patent Applications Nos. 2001-253217 and 2002-287920, and JP-A-2002-62648. These polymers have an excellent balance among film strength, sensitivity, and developability.

Furthermore, the urethane binder polymers containing acid groups which are described in, e.g., JP-B-7-12004, JP-B-7-120041, JP-B-7-120042, JP-B-8-12424, JP-A-63-287944, JP-A-63-287947, JP-A-1-271741, and Japanese Patent Application No. 10-116232 have highly excellent strength and are hence advantageous from the standpoints of printing durability and suitability for low-energy exposure.

Other useful water-soluble linear organic polymers include polyvinylpyrrolidone and poly(ethylene oxide). For heightening the strength of cured films, an alcohol-soluble nylon and a polyether obtained from 2,2-bis(4-hydroxyphenyl)propane and epichlorohydrin are also useful.

The weight-average molecular weight of such other binder polymers optionally usable in the invention is preferably 5,000 or higher, more preferably in the range of 10,000-300,000. The number-average molecular weight thereof is preferably 1,000 or higher, more preferably in the range of 2,000-250,000. The polydispersity coefficient (weight-average molecular weight/number-average molecular weight) thereof is preferably 1 or higher, more preferably in the range of 1.1-10.

Although these polymers may be any of random polymers, block polymers, graft polymers, and the like, they preferably are random polymers.

Such polymers optionally usable in the invention can be synthesized by known methods. Examples of solvents usable for the synthesis include tetrahydrofuran, ethylene dichloride, cyclohexanone, methyl ethyl ketone, acetone, methanol, ethanol, ethylene glycol monomethyl ether, ethylene glycol monoethyl ether, 2-methoxyethyl acetate, diethylene glycol dimethyl ether, 1-methoxy-2-propanol, 1-methoxy-2-propyl acetate, N,N-dimethylformamide, N,N-dimethylacetamide, toluene, ethyl acetate, methyl lactate, ethyl lactate, dimethyl sulfoxide, and water. These solvents may be used alone or as a mixture of two or more thereof.

In synthesizing binder polymers optionally usable in the invention, radical polymerization initiators selected from known compounds such as azo initiators and peroxide initiators can be used.

The optional binder polymers may be used alone or as a mixture of two or more thereof in the invention. In the case where the polymerizable composition of the invention is used as the image-recording layer of a lithographic printing plate precursor, the amount of the optional binder polymers to be added is preferably up to 90% by weight, more preferably up to 60% by weight, based on all polymeric compounds including the specific polyamide resin and polyester resin (A).

The polymerizable composition of the invention thus obtained is excellent in the strength of films formed therefrom and is especially suitable for use as the image-recording layer of a negative type lithographic printing plate precursor.

Application to Lithographic Printing Plate Precursor

When the polymerizable composition of the invention is used as the image-recording layer of a lithographic printing plate precursor, the polymerizable composition is dissolved in a solvent and the resultant solution is applied to an appropriate base to thereby produce the printing plate precursor. According to the intended use, the various additives described below can be added and other layers such as a back coat layer, interlayer, and protective layer can be formed in the same manner.

A dye showing intense absorption in the visible light region can be used as a colorant for images in the polymerizable composition of the invention. Examples thereof include Oil Yellow #101, Oil Yellow #103, Oil Pink #312, Oil Green BG, Oil Blue BOS, Oil Blue #603, Oil Black BY, Oil Black BS, and Oil Black T-505 (all manufactured by Orient Chemical Industries Ltd.), Victoria Pure Blue, Crystal Violet (CI 42555), Methyl Violet (CI 42535), Ethyl Violet, Rhodamine B (CI 145170B), Malachite Green (CI 42000), Methylene Blue (CI 52015), and the dyes shown in JP-A-62-293247. Furthermore, pigments such as phthalocyanine pigments, azo pigments, carbon black, and titanium oxide can also be advantageously used.

It is preferred to add any of these colorants because the addition thereof facilitate distinction between image areas and nonimage areas after image formation. The amount of the colorant to be added may be 0.01-10% by weight based on all solid components of the coating fluid for recording layer formation.

It is desirable in the invention that a heat polymerization inhibitor be added in a small amount in order to inhibit the radical-polymerizable compound from unnecessarily undergoing heat polymerization during the production or storage of the polymerizable composition. Appropriate heat polymerization inhibitors include hydroquinone, p-methoxyphenol, di-t-butyl-p-cresol, pyrogallol, t-butylcatechol, benzoquinone, 4,4'-thiobis(3-methyl-6-t-butylphenol), 2,2'-methylenebis(4-methyl-6-t-butylphenol), and N-nitroso-N-phenylhydroxylamine aluminum salt. The amount of the heat polymerization inhibitor to be added is preferably about 0.01-5% by weight based on the whole composition. A higher fatty acid derivative or the like, such as behenic acid or behenamide, may be added according to need so as to become present in a higher concentration in the image-recording layer surface during drying after coating, for the purpose of preventing the polymerization inhibition caused by oxygen. The amount of the higher fatty acid derivative to be added is preferably about 0.1-10% by weight based on the whole composition.

The polymerizable composition of the invention is used mainly for forming the recording layers of lithographic printing plate precursors. For the purpose of enabling the development of such recording layers to be stably conducted under a wider range of development conditions, the nonionic surfactants shown in JP-A-62-251740 and JP-A-3-208514 and the amphoteric surfactants shown in JP-A-59-121044 and JP-A-4-13149 can be added.

Examples of the nonionic surfactants include sorbitan tristearate, sorbitan monopalmitate, sorbitan trioleate, stearic acid monoglyceride, and polyoxyethylene nonylphenyl ether.

Examples of the amphoteric surfactants include alkyl di(aminoethyl)glycines, alkyl polyaminoethylglycine hydrochlorides, 2-alkyl-N-carboxyethyl-N-hydroxyethylimidazolinium betaines, and the N-tetradecyl-N,N-betaine type (e.g., trade name Amorgen K, manufactured by Dai-ichi Kogyo Seiyaku Co., Ltd.).

The proportion of the nonionic surfactants and amphoteric surfactants in the coating fluid for recording layer formation is preferably 0.05-15% by weight, more preferably 0.1-5% by weight.

A plasticizer is optionally added according to need to the coating fluid for recording layer formation according to the invention in order to impart coating film flexibility, etc. For example, use is made of polyethylene glycol, tributyl citrate, diethyl phthalate, dibutyl phthalate, dihexyl phthalate, dioctyl phthalate, tricresyl phosphate, tributyl phosphate, trioctyl phosphate, tetrahydrofurfuryl oleate, and the like.

For producing a lithographic printing plate precursor using the polymerizable composition of the invention, use may be made of a method in which the constituent ingredients for the polymerizable composition are dissolved in a solvent together with ingredients necessary for coating fluid preparation and the resultant coating fluid is applied to an appropriate base. Examples of the solvent to be used here include ethylene dichloride, cyclohexanone, methyl ethyl ketone, methanol, ethanol, propanol, ethylene glycol monomethyl ether, 1-methoxy-2-propanol, 2-methoxyethyl acetate, 1-methoxy-2-propyl acetate, dimethoxyethane, methyl lactate, ethyl lactate, N,N-dimethylacetamide, N,N-dimethylformamide, tetramethylurea, N-methylpyrrolidone, dimethyl sulfoxide, sulfolane, γ-butyrolactone, toluene, and water. However, the solvent should not be construed as being limited to these examples. These solvents may be used alone or as a mixture of two or more thereof. The concentration of the ingredients described above (all solid components including additives) in the coating fluid is preferably 1-50% by weight.

The amount of the recording layer to be formed on a base through coating and drying (on a dry basis) varies depending on uses. However, in the case of lithographic printing plate precursors, the amount thereof is generally preferably 0.5-5.0 g/m$^2$. As the amount of the recording layer decreases, the film properties of the recording layer decrease although apparent sensitivity increases.

For applying the coating fluid, various methods can be used. Examples thereof include bar coater coating, spin coating, spray coating, curtain coating, dip coating, air knife coating, blade coating, and roll coating.

A surfactant for improving applicability, e.g., any of the fluorochemical surfactants shown in JP-A-62-170950, can be added to the coating fluid for recording layer formation according to the invention. The amount of the surfactant to be added is preferably 0.01-1% by weight, more preferably 0.05-0.5% by weight, based on all solid components of the recording layer.

(Base)

The base to be used in forming a lithographic printing plate precursor using the polymerizable composition of the invention is not particularly limited as long as it is a platy material having dimensional stability. Examples thereof include paper, paper laminated with a plastic (e.g., polyethylene, polypropylene, or polystyrene), metal sheets (e.g., aluminum, zinc, and copper), and plastic films (e.g., cellulose diacetate, cellulose triacetate, cellulose propionate, cellulose butyrate, cellulose acetate butyrate, cellulose nitrate, poly(ethylene terephthalate), polyethylene, polystyrene, polypropylene, polycarbonates, and poly(vinyl acetal)). These may be sheets made of a single material, such as resin films and metal sheets, or may be laminates of two or more materials. Examples of such laminates include paper or plastic films to which any of those metals has been laminated or vapor-deposited and laminated sheets formed by laminating different plastic films to each other.

Preferred examples of the base are polyester films and aluminum sheets. Of these, aluminum sheets are especially preferred because they have satisfactory dimensional stability and are relatively inexpensive. Preferred aluminum sheets are sheets of pure aluminum and sheets of an alloy of aluminum as the main component with a slight amount of one or more other elements. Also usable is a plastic film to which aluminum has been laminated or vapor-deposited. Examples of the non-aluminum elements contained in the aluminum alloy include silicon, iron, manganese, copper, magnesium, chromium, zinc, bismuth,nickel, and titanium. The content of such non-aluminum elements in the alloy is up to 10% by weight at the most. Although the aluminum especially preferred in the invention is pure aluminum, an aluminum sheet containing a slight amount of non-aluminum elements may be used because completely pure aluminum is difficult to produce by the current refining technology. The aluminum sheet to be used in the invention is not limited in composition as described above and can be suitably selected from sheets of aluminum materials which have been known and in general use.

The thickness of the aluminum sheet is about 0.1-0.6 mm, preferably 0.15-0.4 mm, especially preferably 0.2-0.3 mm.

Before being subjected to a surface-roughening treatment, the aluminum sheet may be degreased according to need with, e.g., a surfactant, organic solvent, or alkaline aqueous solution to remove a rolling oil remaining on the surface thereof.

The surface-roughening treatment of the aluminum sheet may be conducted by various methods. Examples thereof include: a method in which the surface is mechanically roughened; a method in which a surface layer is electrochemically dissolved away to roughen the surface; and a method in which the surface is selectively dissolved away chemically. For the mechanical method, known techniques can be used, such as ball polishing, brushing, blasting, and buffing. Examples of techniques for the electrochemical surface-roughening method include a method in which the aluminum sheet is treated in a hydrochloric-acid or nitric-acid electrolytic solution while applying an alternating or direct current thereto. Furthermore, a combination of the two methods can be utilized as disclosed in JP-A-54-63902.

The aluminum sheet the surface of which has been thus roughened can be subjected according to need to an alkali etching treatment and a neutralization treatment and then to an anodization treatment for enhancing the water retentivity and wearing resistance of the surface. For the anodization treatment of the aluminum sheet, various electrolytes which enable the formation of a porous oxide film can be used. In general, sulfuric acid, phosphoric acid, oxalic acid, chromic acid, or a mixture of two or more of these acids is used. The concentration of these electrolytes is suitably determined according to the kinds of the electrolytes.

Conditions for the anodization treatment cannot be unconditionally specified because they vary over a wide range depending on the electrolyte to be used. In general, however, appropriate conditions include an electrolyte concentration in the solution of 1-80% by weight, solution temperature of 5-70° C., current density of 5-60 A/dm$^2$, voltage of 1-100 V, and electrolysis period of 10 seconds to 5 minutes.

The amount of the film to be formed by anodization is preferably 1.0 g/m$^2$ or higher, more preferably 2.0-6.0 g/m$^2$. In case where the amount of the film formed by anodization is smaller than 1.0 g/m$^2$, the lithographic printing plate precursor to be obtained gives a printing plate which has insufficient printing durability and is apt to be marred in the nonimage areas. As a result, the so-called "mar staining" is apt to occur in which the ink adheres to the marred parts during printing.

Although that side of the lithographic printing plate base which is to be used for printing is subjected to the anodization treatment, an anodization film is generally formed also on the back side in an amount of 0.01-3 g/m$^2$ because lines of electric force reach to the back side.

After the anodization treatment, the surface of the base is subjected to a hydrophilizing treatment. A known method is used for this treatment. Examples of methods for this hydrophilizing treatment include the alkali metal silicate (e.g., aqueous sodium silicate solution) method disclosed in U.S. Pat. Nos. 2,714,066, 3,181,461, 3,280,734, and 3,902,734. In this method, a base is treated by immersing it in an aqueous sodium silicate solution or by electrolysis in the solution. Examples thereof further include the method in which a base is treated with potassium fluorozirconate as disclosed in JP-B-36-22063 and the method in which a base is treated with poly(vinylphosphonic acid) as disclosed in U.S. Pat. Nos. 3,276,868, 4,153,461, and 4,689,272.

Of these, the silicate treatment is an especially preferred hydrophilizing treatment in the invention. The silicate treatment will be explained below.

The anodization film of the aluminum sheet which has been treated by the methods described above is immersed in an aqueous solution having an alkali metal silicate concentration of 0.1-30% by weight, preferably 0.5-10% by weight, and a pH at 25° C. of 10-13. This immersion is conducted, for example, at 15-80° C. for 0.5-120 seconds. In case where the pH of the aqueous alkali metal silicate solution is lower than 10, the solution gels. In case where the pH thereof is higher than 13.0, the oxide film is dissolved away. Examples of the alkali metal silicate to be used in the invention include sodium silicate, potassium silicate, and lithium silicate. A hydroxide is used for heightening the pH of the aqueous alkali silicate solution, and examples of the hydroxide include sodium hydroxide, potassium hydroxide, and lithium hydroxide. An alkaline earth metal salt or a Group IVB metal salt may be incorporated into the treating liquid. Examples of the alkaline earth metal salt include water-soluble salts such as nitrates, e.g., calcium nitrate, strontium nitrate, magnesium nitrate, and barium nitrate, sulfates, hydrochlorides, phosphates, acetates, oxalates, and borates. Examples of the Group IVB metal salt include titanium tetrachloride, titanium trichloride, potassium fluorotitanate, potassium titanium oxalate, titanium sulfate, titanium tetraiodide, zirconium chloride oxide, zirconium dioxide, zirconium oxychloride, and zirconium tetrachloride. Such alkaline earth metal salts or Group IVB metal salts may be used alone or in combination of two or more thereof. The amount of such metal salts to be added is in the range of preferably 0.01-10% by weight, more preferably 0.05-5.0% by weight.

The silicate treatment further improves the hydrophilicity of the surface of the aluminum sheet. Because of this, the printing plate obtained from the printing plate precursor is less apt to suffer ink adhesion to the nonimage areas during printing and hence shows improved non-smearing properties.

(Back Coat Layer)

A back coat layer is formed on the back side of the base according to need. Preferred examples of this back coat layer include the coating layer made of an organic polymeric compound described in JP-A-5-45885 and the coating layer made of a metal oxide obtained by hydrolyzing and condensation-polymerizing an organometallic compound or inorganic metal compound as described in JP-A-6-35174.

Especially preferred of these coating layers is the coating layer made of a metal oxide formed from $Si(OCH_3)_4$, $Si(OC_2H_5)_4$, $Si(OC_3H_7)_4$, $Si(OC_4H_9)_4$, or the like because such alkoxy compounds of silicon are inexpensive and easily available and this coating layer has excellent resistance to development.

(Interlayer)

An interlayer maybe formed in the lithographic printing plate precursor according to the invention for the purpose of improving adhesion between the recording layer and the base and non-smearing properties. Examples of this interlayer include those described in JP-B-50-7481, JP-A-54-72104, JP-A-59-101651, JP-A-60-149491, JP-A-60-232998, JP-A-3-56177, JP-A-4-282637, JP-A-5-16558, JP-A-5-246171, JP-A-7-159983, JP-A-7-314937, JP-A-8-202025, JP-A-8-320551, JP-A-9-34104, JP-A-9-236911, JP-A-9-269593, JP-A-10-69092, JP-A-10-115931, JP-A-10-161317, JP-A-10-260536, JP-A-10-282682, JP-A-11-84674, and Japanese Patent Applications Nos. 8-225335, 8-270098, 9-195863, 9-195864, 9-89646, 9-106068, 9-183834, 9-264311, 9-127232, 9-245419, 10-127602, 10-170202, 11-36377, 11-165861, 11-284091, and 2000-14697.

(Protective Layer)

It is preferred that a protective layer be further formed in the lithographic printing plate precursor according to the invention on the recording layer described above because exposure of the precursor is generally conducted in the air. The protective layer serves to prevent low-molecular compounds present in the air, such as, e.g., oxygen and basic substances, which inhibit the image-forming reaction caused in the recording layer by exposure, from coming into the recording layer and to thereby enable exposure in the air. Consequently, the protective layer having such function is desired to have the following properties: to have low permeability to low-molecular compounds including oxygen; not to substantially inhibit transmission of the light to be used for exposure; to have excellent adhesion to the recording layer; and to be capable of being easily removed in a development step after exposure. Various techniques for obtaining such protective layers have been proposed hitherto, and some of these are described in detail in U.S. Pat. No. 3,458,311 and JP-A-55-49729. Preferred materials for the protective layer are, for example, water-soluble polymeric compounds having relatively high crystallinity. Known examples thereof include water-soluble polymers such as poly(vinyl alcohol), polyvinylpyrrolidone, acid celluloses, gelatin, gum arabic, and poly(acrylic acid). Of these, poly(vinyl alcohol) gives most satisfactory results concerning basic properties such as oxygen barrier properties and removability in development, when used as the main component. As long as the poly (vinyl alcohol) to be used for the protective layer contains unsaturated vinyl alcohol units, which impart the necessary oxygen barrier properties and water solubility, it may be one which has been partly substituted with an ester, ether, and acetal or may be one which partly has other comonomer units. Examples of the poly(vinyl alcohol) include ones having a degree of hydrolysis of 71-100% and a degree of polymerization in the range of 300-2,400. Specific examples thereof include PVA-105, PVA-110, PVA-117, PVA-117H, PVA-120, PVA-124, PVA-124H, PVA-CS, PVA-CST, PVA-HC, PVA-203, PVA-204, PVA-205, PVA-210, PVA-217, PVA-220, PVA-224, PVA-217EE, PVA-217E, PVA-220E, PVA-224E, PVA-405, PVA-420, PVA-613, and L-8, manufactured by Kuraray Co., Ltd.

Ingredients for the protective layer (selection of PVA and use of additives), the amount of the layer to be formed by coating, etc. are selected while taking account of susceptibility to fogging, adhesion, and marring resistance besides oxygen barrier properties and removability in development. In general, the higher the degree of hydrolysis of the PVA used (i.e., the higher the content of unsubstituted vinyl alcohol units in the protective layer) and the larger the film thickness, the higher the oxygen barrier properties and the more the protective layer is advantageous from the standpoint of sensitivity. However, to excessively heighten oxygen barrier properties results in problems, for example, that an unnecessary polymerization reaction occurs during production and storage and that undesirable fogging or line thickening occurs in imagewise exposure. Furthermore, adhesion to image areas and marring resistance also are highly important in the handling of the printing plate precursor. This is because when a hydrophilic layer comprising a water-soluble polymer is superposed on the recording layer, which is hydrophobic, then the layer superposed is apt to peel off due to insufficient adhesive force and the areas from which the superposed layer has peeled off develop defects such as, e.g., film cure failures caused by polymerization inhibition by oxygen. Various proposals have been made on improvements in adhesion between these two layers so as to eliminate such failures. For example, U.S. Pat. Nos. 292,501 and 44,563 describe a technique in which a hydrophilic polymer consisting mainly of poly (vinyl alcohol) is mixed with 20-60% by weight acrylic emulsion, water-insoluble vinylpyrrolidone/vinyl acetate copolymer, or the like and this mixture is applied to a recording layer to form a layer thereon and thereby obtain sufficient adhesion.

In forming the protective layer in the invention, any of these known techniques can be applied. Coating methods for forming such protective layers are described in detail in, e.g., U.S. Pat. No. 3,458,311 and JP-A-55-49729.

(Exposure, Development, and Printing)

The lithographic printing plate precursor which comprises the base described above and a recording layer formed on a surface thereof by applying the polymerizable composition of the invention can be subjected to recording with an infrared layer. It is capable of recording with an ultraviolet lamp or thermal head. In the invention, imagewise exposure with a solid laser or semiconductor laser which emits infrared having a wavelength of 760-1,200 nm is preferred.

After exposure with an infrared laser, the polymerizable composition of the invention is developed preferably with water or an alkaline aqueous solution.

In the case where an alkaline aqueous solution is used as a developing solution for the polymerizable composition of the invention, known alkaline aqueous solutions can be used as the developing solution and as a replenisher therefor. Examples of usable alkalis include inorganic alkali salts such as sodium silicate, potassium silicate, sodium tertiary phosphate, potassium tertiary phosphate, ammonium tertiary phosphate, sodium secondary phosphate, potassium secondary phosphate, ammonium secondary phosphate, sodium carbonate, potassium carbonate, ammonium carbonate, sodium hydrogen carbonate, potassium hydrogen carbonate, ammonium hydrogen carbonate, sodium borate, potassium borate, ammonium borate, sodium hydroxide, ammonium hydroxide, potassium hydroxide, and lithium hydroxide. Also usable are organic alkalis such as monomethylamine, dimethylamine, trimethylamine, monoethylamine, diethylamine, triethylamine, monoisopropylamine, diisopropylamine, triisopropylamine, n-butylamine, monoethanolamine, diethanolamine, triethanolamine, monoisopropanolamine, diisopropanolamine, ethyleneimine, ethylenediamine, and pyridine.

These alkalis may be used alone or in combination of two or more thereof.

It is known that in the case where an automatic processor is used to conduct development, a large amount of lithographic printing plate precursors can be processed, without replacing the developing solution in the developing tank over long, by adding to the developing solution either an aqueous solution having the same composition as the developing solution or an aqueous solution (replenisher) having a higher alkali concentration than the developing solution. In the invention also, this replenishment technique can be advantageously used.

Various surfactants, organic solvents, and the like can be added to the developing solution and replenisher according to need for the purposes of enhancing or diminishing developability, dispersing debris resulting from development, and enhancing the ink receptivity of image areas of the printing plate. Preferred examples of the surfactants include anionic, cationic, nonionic, and amphoteric surfactants. Preferred examples of the organic solvents include benzyl alcohol. It is also preferred to add polyethylene glycol or a derivative thereof, polypropylene glycol or a derivative thereof, or the like. Furthermore, a non-reducing sugar such as arabitol, sorbitol, or mannitol may be added.

Moreover, hydroquinone, resorcinol, an inorganic salt reducing agent such as sodium sulfite, sodium hydrogen sulfite, potassium sulfite, or potassium hydrogen sulfite, an organic carboxylic acid, an antifoamer, and a water softener may be added.

The printing plate which has been developed with the developing solution and replenisher described above is subjected to after-treatments with washing water, a rinse containing a surfactant, and a desensitizing liquid containing gum arabic or a starch derivative. Any of various combinations of these treatments can be used as after-treatments in the case where the polymerizable composition of the invention is used as a material for printing plates.

In the platemaking/printing industry, automatic processors for printing plates are extensively used in recent years for the purpose of rationalization and standardization of platemaking operations. These automatic processors generally comprise a development part and an after-treatment part and include a device for conveying printing plates, treating liquid tanks, and spraying devices. In these apparatus, printing plates which have undergone exposure are developed, while being horizontally conveyed, by pumping up each treating liquid and spraying it over the printing plates from a spray nozzle. Furthermore, a technique in which printing plates are processed by conveying them with, e.g., underliquid guide rolls through a treating liquid tank filled with a treating liquid and thus immersing them in the liquid has become known recently. In such automatic processing, printing plates can be processed while supplying replenishers to the respective treating liquids according to the amount of the printing plates to be processed, operation time, etc. It is also possible to conduct automatic replenishment based on the detection of a change in electrical conductivity with a sensor.

Furthermore, a so-called use-once processing technique is also applicable in which each printing plate is treated with a substantially fresh treating liquid.

The lithographic printing plate thus obtained can be coated with a desensitizing gum according to need before being subjected to a printing step. However, in the case where the lithographic printing plate is desired to have a higher degree of printing durability, it is subjected to a burning treatment.

In the case where the lithographic printing plate is burned, it is preferred to treat the printing plate with a surface conditioner, such as those described in JP-B-61-2518, JP-B-55-28062, JP-A-62-31859, and JP-A-61-159655, before burning.

Methods usable for the treatment with a surface conditioner include: a method in which the surface conditioner is applied to the lithographic printing plate with a sponge or absorbent cotton impregnated with the conditioner or by putting the printing plate in a vat filled with the surface conditioner; and a method in which the surface conditioner is applied with an automatic coater. Treating the thus-coated surface with a squeezee or squeezee roller to make the amount of the applied surface conditioner even gives more preferred results.

The amount of the surface conditioner to be applied is generally desirably 0.03-0.8 g/m² (on a dry basis).

After having been optionally dried, the lithographic printing plate coated with the surface conditioner is heated to a high temperature with, e.g., a burning processor (e.g., burning processor BP-1300, sold by Fuji Photo Film Co., Ltd.). The heating temperature and period in this burning are preferably in the ranges of 180-300° C. and 1-20 minutes, respectively, although they depend on the kinds of the ingredients constituting the image.

The lithographic printing plate which has undergone the burning treatment can be suitably subjected to treatments which have been conducted hitherto, such as water washing and gumming, according to need. However, in the case where a surface conditioner containing a water-soluble polymeric compound or the like has been used, the so-called desensitizing treatment such as gumming can be omitted.

The lithographic printing plate obtained from the polymerizable composition of the invention through such treatments is attached to an offset press or another printing machine and used for printing on many sheets.

EXAMPLES

The invention will be explained below in detail by reference to Examples, but the invention should not be construed as being limited to the following Examples. In the Examples, lithographic printing plates each employing a recording layer formed from a polymerizable composition of the invention were evaluated to thereby evaluate the compositions of the invention.

(Synthesis Example for Specific Polyamide Resins)

Specific polyamide resins were synthesized according to the formulations given in Table 1 in the following manner. The diamino compound [corresponding to ingredient (a) in the table] was dissolved in N,N-dimethylacetamide in a concentration of 30 wt %. In a nitrogen stream, this solution was cooled to 0° C. and the carboxylic acid derivative [corresponding to ingredient (b) in the table] was added thereto. After this mixture was stirred for 3 hours, the tetracarboxylic dianhydride [corresponding to ingredient (c) in the table] was added thereto with stirring and the resultant mixture was reacted at 60° C. for 3 hours. This reaction mixture was cooled to room temperature and then diluted with methyl ethyl ketone to 10 wt %. Thereto were added the unsaturated-group-containing epoxy compound [corresponding to ingredient (d) in the table] or unsaturated-group-containing halogenated alkyl compound [corresponding to ingredient (e) in the table], 500 ppm p-methoxyphenol, and 5 wt % tetrabutylammonium bromide. Thereafter, the mixture was heated to 80° C. and reacted for 10 hours to incorporate carbon-carbon unsaturated bonds into side chains. The resultant reaction mixture was poured into water, the amount of which was 10 times the amount of the N,N-dimethylacetamide, to thereby obtain a specific polyamide resin. The structures of the ingredients (a) to (e) used here are also shown below.

TABLE 1

| Polyamide resin No. | (a) molar amount | (b) molar amount | (c) molar amount | (d) molar amount | (e) molar amount | Molecular weight |
|---|---|---|---|---|---|---|
| 1 | (a-2) 0.05 | — | (c-1) 0.05 | (d-1) 0.05 | — | 42,000 |
| 2 | (a-2) 0.05 | — | (c-1) 0.05 | (d-1) 0.07 | — | 45,000 |
| 3 | (a-2) 0.05 | — | (c-1) 0.05 | (d-3) 0.06 | — | 53,000 |
| 4 | (a-2) 0.06 | (b-1) 0.05 | (c-1) 0.05 | (d-3) 0.06 | — | 63,000 |
| 5 | (a-3) 0.06 | (b-2) 0.05 | (c-1) 0.05 | (d-3) 0.06 | — | 59,000 |
| 6 | (a-3) 0.06 | (b-2) 0.05 | (c-1) 0.05 | (d-1) 0.05 | — | 51,000 |
| 7 | (a-2) 0.05 | — | (c-1) 0.05 | (d-2) 0.06 | — | 52,000 |
| 8 | (a-1) 0.05 | — | (c-1) 0.05 | (d-2) 0.06 | — | 50,000 |
| 9 | (a-4) 0.05 | (b-2) 0.05 | (c-1) 0.05 | (d-3) 0.06 | — | 78,000 |
| 10 | (a-2) 0.05 | — | (c-1) 0.05 | — | (e-1) 0.05 | 42,000 |
| 11 | (a-2) 0.05 | — | (c-1) 0.05 | — | (e-2) 0.07 | 55,000 |
| 12 | (a-4) 0.05 | (b-3) 0.05 | (c-1) 0.05 | (d-3) 0.06 | — | 40,000 |
| 13 | (a-2) 0.05 | — | (c-2) 0.05 | (d-3) 0.04 | — | 53,000 |
| 14 | (a-2) 0.06 | (b-1) 0.05 | (c-2) 0.05 | (d-3) 0.05 | — | 53,000 |
| 15 | (a-2) 0.05 | — | (c-2) 0.05 | — | (e-1) 0.04 | 49,000 |
| 16 | (a-2) 0.05 | — | (c-2) 0.05 | — | — | 65,000 |

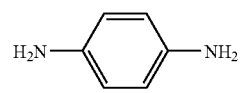
(a-1)

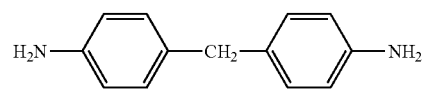
(a-2)

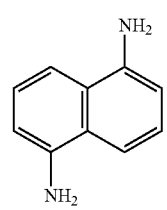
(a-3)

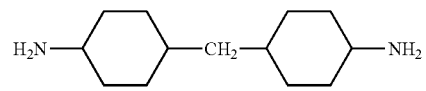
(a-4)

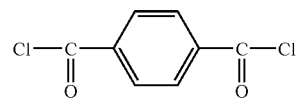
(b-1)

(b-2)

TABLE 1-continued

| Polyamide resin No. | (a) molar amount | (b) molar amount | (c) molar amount | (d) molar amount | (e) molar amount | Molecular weight |
|---|---|---|---|---|---|---|

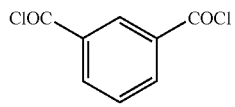

(b-3)

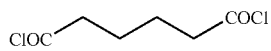

(c-1)

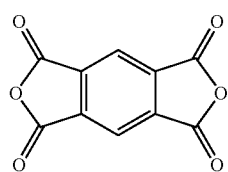

(c-2)

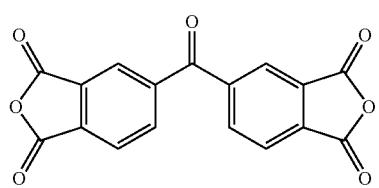

(d-1)

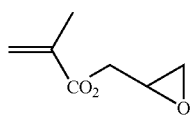

(d-2)

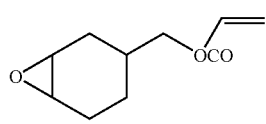

(d-3)

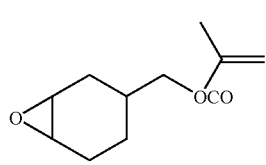

(e-1)

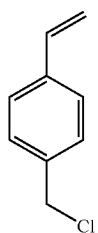

(e-2)

TABLE 1-continued

| Polyamide resin No. | (a) molar amount | (b) molar amount | (c) molar amount | (d) molar amount | (e) molar amount | Molecular weight |
|---|---|---|---|---|---|---|

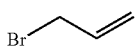

(Production of Base)

A melt of a JIS A1050 alloy comprising at least 99.5% aluminum, 0.30% iron, 0.10% silicon, 0.02% titanium, and 0.013% copper was subjected to a cleaning treatment and cast. In the cleaning treatment, a degassing treatment and a ceramic tube filter treatment were performed in order to remove unnecessary gases, e.g., hydrogen. The casting was conducted by the DC casting method. The solidified platy cast having a thickness of 500 mm was faced to remove a surface layer having a thickness of 10 mm, and then subjected to a 10-hour homogenizing treatment at 550° C. so as to prevent intermetallic compounds from enlarging.

Subsequently, the cast was hot-rolled at 400° C., subjected to process annealing at 500° C. for 60 seconds in a continuous annealing furnace, and then cold-rolled to obtain a rolled aluminum sheet having a thickness of 0.30 mm. The center-line average surface roughness Ra after the cold rolling was regulated to 0.2 μm by regulating the surface roughness of the rolls. Thereafter, the aluminum sheet was processed with a tension leveler in order to improve flatness.

Thereafter, the aluminum sheet was subjected to surface treatments in order to obtain a lithographic printing plate base.

First, a degreasing treatment with 10% aqueous sodium aluminate solution was conducted at 50° C. for 30 seconds in order to remove the rolling oil remaining on the aluminum sheet surface. The degreased aluminum sheet was treated with 30% aqueous sulfuric acid solution at 50° C. for 30 seconds for neutralization and smut removal.

The so-called graining was then conducted. In this treatment, the base surface was roughened in the following manner for the purpose of attaining satisfactory adhesion of a recording layer to the base and imparting water retentivity to nonimage areas. An aqueous solution containing 1% nitric acid and 0.5% aluminum nitrate was kept at 45° C. While the aluminum web was kept being conveyed in the aqueous solution, electricity having an alternating waveform was supplied thereto in a quantity on the anode side of 240° C./dm$^2$ at a current density of 20 A/dm$^2$ and a duty ratio of 1:1 by means of an indirect feeder cell to thereby conduct graining. Thereafter, the web was etched with 10% aqueous sodium aluminate solution at 50° C. for 30 seconds and then treated with 30% aqueous sulfuric acid solution at 50° C. for 30 seconds for neutralization and smut removal.

The resultant base was further anodized to form an oxide film thereon in order to improve wearing resistance, chemical resistance, and water retentivity. A 20% aqueous sulfuric acid solution was used at 35° C. as an electrolyte. While the aluminum web was kept being conveyed through the electrolyte, it was treated with electrolysis by permitting a direct current to flow at 14 A/dm$^2$ by means of an indirect feeder cell. Thus, an anodization film was deposited in an amount of 2.5 g/m$^2$.

Examples 1-6 and Comparatives Examples 1 and 2

(Formation of Recording Layer)

Recording layer coating fluid 1, which had the following composition, was prepared and applied with a wire-wound bar to the aluminum base obtained in the manner described above. The coating was dried in a hot-air drying oven at 115° C. for 45 seconds to form a recording layer. The amount of the coating after the drying was in the range of 1.2-1.3 g/m². Furthermore, an overcoarting fluid having the following composition was applied with a slide hopper and the coating was dried in a hot-air drying oven at 120° C. for 75 seconds. Thus, lithographic printing plate precursors according to the invention were obtained. The amount of the overcoat layer formed was 2.3 g/m².

<Recording Layer Coating Fluid 1>

| | |
|---|---|
| Ingredient (A): binder polymer (compound shown in Table 2) | 2.00 g |
| Ingredient (B): infrared absorber "IR-1" (having the structure shown below) | 0.08 g |
| Ingredient (C): radical polymerization initiator "S-1" (having the structure shown below) | 0.35 g |
| Ingredient (D): radical-polymerizable compound (compound shown in Table 2) | 2.00 g |
| Naphthalenesulfonate of Victoria Pure Blue | 0.04 g |
| Fluorochemical surfactant (Megafac F-176, manufactured by Dainippon Ink & Chemicals Inc.) | 0.01 g |
| Methyl ethyl ketone | 9.0 g |
| Methanol | 10.0 g |
| 1-Methoxy-2-propanol | 8.0 g |

<Overcoating Fluid>

| | |
|---|---|
| Poly(vinyl alcohol) (degree of saponification, 98.5 mol %; degree of polymerization, 500) | 2.5 g |
| Polyvinylpyrrolidone (K30, manufactured by Tokyo Kasei Kogyo Co., Ltd.; molecular weight, 40,000) | 0.5 g |
| Nonionic surfactant (EMAREX NP-10, manufactured by Nihon Emulsion Co., Ltd.) | 0.05 g |
| Ion-exchanged water | 96.95 g |

Incidentally, the binder polymers used as ingredient (A) in the Examples 2-1 to 2-26 are some of the specific polyamide resins (A) synthesized in the Synthesis Example, while the binder polymers used in the Comparative Examples 2-1 to 2-7 are binder polymers (P-1) to (P-3) having the following structures, use of which is outside the scope of the invention.

(P-1)
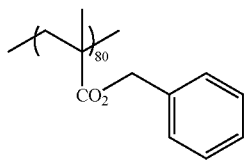

Mw 55,000

(P-2)
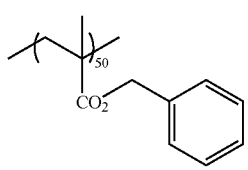

(P-3)
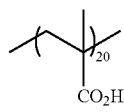

Mw 85,000

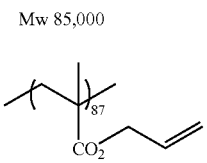 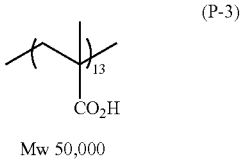

Mw 50,000

The structures of infrared absorbers (IR-1) to (IR-3), which were used in the Examples according to the invention and in the Comparative Examples, are shown below.

(IR-1)
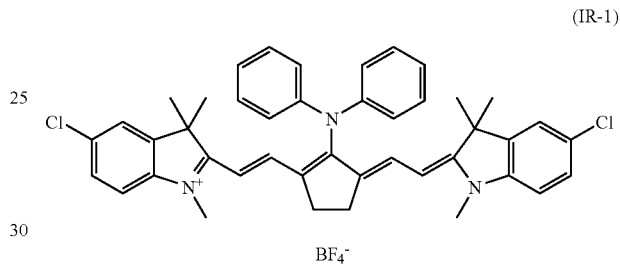

(IR-2)
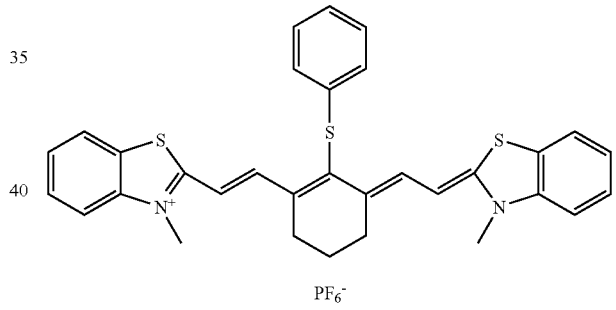

(IR-3)
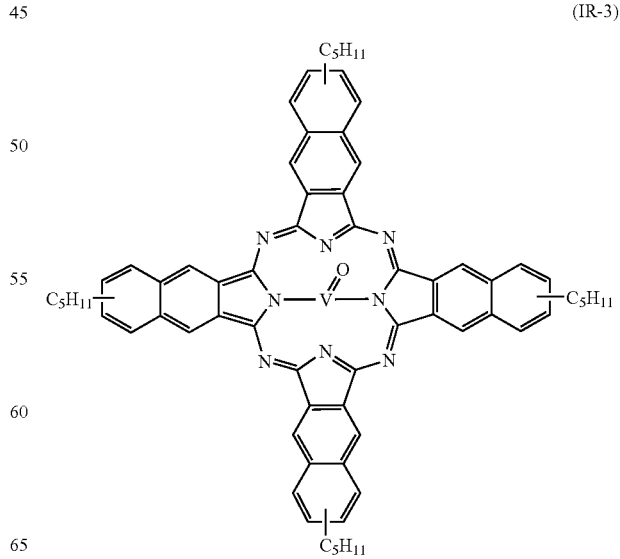

The structures of radical polymerization initiators (S-1) to (S-6), which were used in the Examples according to the invention and in the Comparative Examples, are shown below.
(S-1)
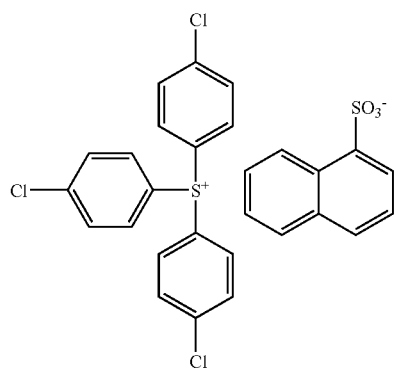
(S-2)
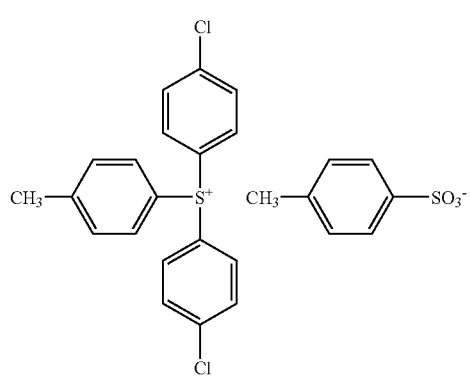
(S-3)
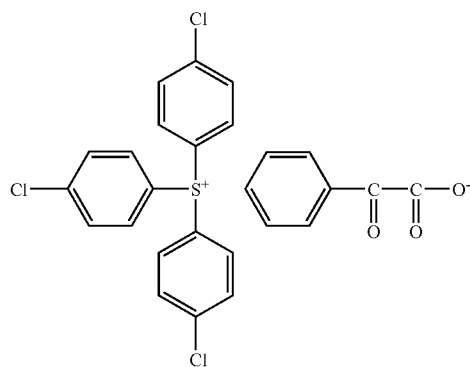
(S-4)
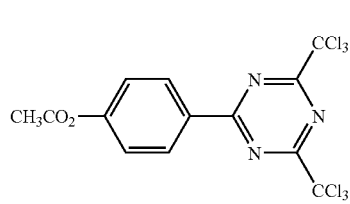
-continued
(S-5)
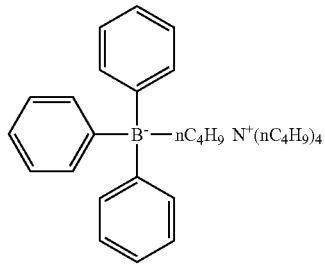
(S-6)
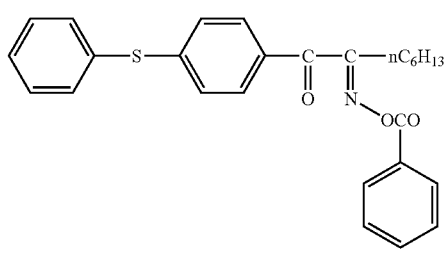
The structures of radical-polymerizable compounds (M-1) to (M-3), which were used in the Examples according to the invention and in the Comparative Examples, are shown below.
(M-1)
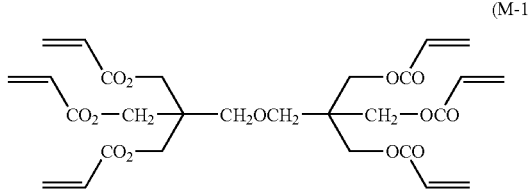
(M-2)
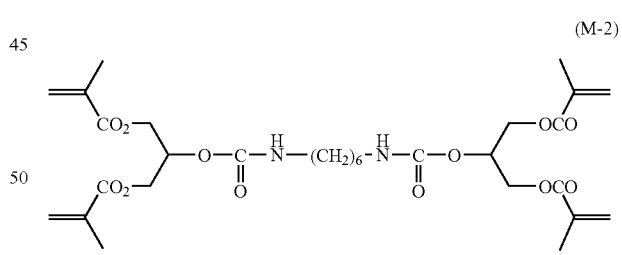
(M-3)
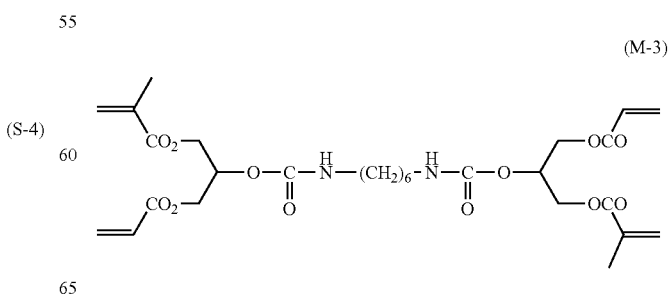

(Exposure)

Each of the negative type lithographic printing plate precursors obtained was exposed with Trendsetter 3244VFS, manufactured by Creo Co., Ltd. and equipped with a 40-W infrared semiconductor laser of the water cooling type. The exposure was conducted under the conditions of an output of 9 W, outer-drum revolution speed of 210 rpm, plate surface energy of 100 mJ/cm$^2$, and resolution of 2,400 dpi.

(Development)

After the exposure, the printing plate precursor was developed using automatic processor Stablon 900N, manufactured by Fuji Photo Film Co., Ltd. The developing solution used as a developing solution fed initially and also as a replenisher was a dilution prepared by diluting DV-2, manufactured by Fuji Photo Film Co., Ltd., with water in a ratio of 1:4. The temperature of the developing bath was regulated to 30° C. As a finisher was used a dilution (pH=10.8) prepared by diluting FN-6, manufactured by Fuji Photo Film Co., Ltd., with water in a ratio of 1:1.

[Evaluation of Printing Durability]

The lithographic printing plate obtained was attached to printing machine R201, manufactured by Roland Co., to conduct printing with ink GEOS-G(N), manufactured by Dainippon Ink & Chemicals Inc. The solid-image part of each printed matter was examined. The printing durability of the printing plate was evaluated in terms of the number of printed sheets obtained by the time when the image began to be blurred. The larger the number, the better the printing durability. The results obtained are also shown in Table 2.

[Evaluation of Sensitivity]

The amount of energy necessary for recording was calculated from the line widths of the image obtained through the exposure (with an infrared laser emitting a light having a wavelength of about 830-850 nm) and development described above and from the laser output, loss in the optical system, and scanning speed. The smaller the value of energy amount, the higher the sensitivity. The results obtained are also shown in Table 2.

TABLE 2

| | Binder polymer | Polymerizable compound | Sensitivity (mJ/cm$^2$) | Printing durability (number of sheets, ×10$^4$) |
|---|---|---|---|---|
| Example 1 | specific polyamide resin 1 | M-1 | 70 | 6.2 |
| Example 2 | specific polyamide resin 1 | M-2 | 60 | 7.2 |
| Example 3 | specific polyamide resin 1 | M-3 | 55 | 8.5 |
| Example 4 | specific polyamide resin 2 | M-2 | 60 | 9.1 |
| Example 5 | specific polyamide resin 3 | M-2 | 55 | 7.3 |
| Example 6 | specific polyamide resin 5 | M-3 | 40 | 9.8 |
| Comparative Example 1 | P-1 | M-1 | 100 | 3.2 |
| Comparative Example 2 | P-1 | M-2 | 100 | 2.7 |

As Table 2 shows, the lithographic printing plates of Examples 1-6, for which specific polyamide resins according to the invention had been added, were found to be superior in printing durability and sensitivity to the lithographic printing plates of Comparative Examples 1 and 2, for which no specific polyamide resin according to the invention had been added.

Examples 7 to 13 and Comparative Examples 3 and 4

(Formation of Undercoat Layer)

An undercoating fluid having the following composition was applied with a wire-wound bar to the same aluminum base as in Example 1. The coating was dried in a hot-air drying oven at 90° C. for 30 seconds. The amount of the coating after the drying was 10 mg/m$^2$.

<Undercoating Fluid>

| | |
|---|---|
| β-Alanine | 0.1 g |
| Phenylphosphonic acid | 0.1 g |
| Methanol | 40 g |
| Pure water | 60 g |

(Formation of Recording Layer)

Subsequently, recording layer coating fluid 2, which had the following composition, was prepared and applied with a wire-wound bar to the undercoated aluminum sheet. This coating was dried in a hot-air drying oven at 115° C. for 45 seconds to form a recording layer. The amount of the recording layer after the drying was in the range of 1.2-1.3 g/m$^2$. Furthermore, the same overcoating fluid as in Example 1 was applied with a slide hopper and the coating was dried in a hot-air drying oven at 120° C. for 75 seconds. Thus, lithographic printing plate precursors were obtained. The amount of the overcoat layer formed was 2.3 g/m$^2$.

<Recording Layer Coating Fluid 2>

| | |
|---|---|
| Ingredient (A): binder polymer (compound shown in Table 3) | 2.10 g |
| Ingredient (B): infrared absorber "IR-1" (having the structure shown above) | 0.08 g |
| Ingredient (C): radical polymerization initiator "S-2" (having the structure shown above) | 0.35 g |
| Ingredient (D): radical-polymerizable compound (compound shown in Table 3) | 1.90 g |
| Naphthalenesulfonate of Victoria Pure Blue | 0.04 g |
| Fluorochemical surfactant (Megafac F-176, manufactured by Dainippon Ink & Chemicals Inc.) | 0.01 g |
| Methyl ethyl ketone | 9.0 g |
| Methanol | 10.0 g |
| 1-Methoxy-2-propanol | 8.0 g |

(Exposure and Development)

The negative type lithographic printing plate precursors obtained were exposed with an infrared laser and developed in the same manner as in Example 1 to obtain lithographic printing plates.

[Evaluation of Printing Durability, Non-Smearing Property of Nonimage Area, and Storage Stability]

Each of the lithographic printing plates obtained was attached to printing machine Lithrone, manufactured by Komori Corp., to conduct printing using black ink DIC-GEOS(N), manufactured by Dainippon Ink & Chemicals Inc. Whether the printed sheets retained a sufficient ink density was visually examined, and printing durability and the non-smearing properties of the nonimage areas were evaluated in terms of the number of printed sheets retaining a sufficient ink density.

Furthermore, each of the lithographic printing plate precursors obtained was subjected to an accelerated aging test in which the precursor was stored at 60° C. for 3 days or stored at 45° C. and 75% RH for 3 days. Thereafter, the precursor was exposed and developed in the same manner as in Example 1, and the printing plate obtained was used to conduct printing in the same manner to evaluate printing durability and the non-smearing properties of nonimage areas (storage stability) The results obtained are also shown in Table 3.

As Table 3 shows, the lithographic printing plates of Examples 7-13, for which specific polyamide resins according to the invention had been added, were ascertained to be superior in printing durability to the lithographic printing plates of Comparative Examples 3 and 4, for which no specific polyamide resin according to the invention had been added. In addition, the printing plate precursors obtained in Examples 7-13 were ascertained to have excellent storage stability because the nonimage areas of the printing plates obtained therefrom after the accelerated aging caused no smearing.

TABLE 3

| | | | Printing durability/Non-smearing property of nonimage area | | |
|---|---|---|---|---|---|
| | Binder polymer | Polymerizable compound | Without accelerated aging | 60° C., 3 days | 45° C., 75% RH, 3 days |
| Example 7 | specific polyamide resin 1 | M-1 | no smearing in $8.5 \times 10^4$ sheets | no smearing in $8.5 \times 10^4$ sheets | no smearing in $8.5 \times 10^4$ sheets |
| Example 8 | specific polyamide resin 1 | M-2 | no smearing in $9.5 \times 10^4$ sheets | no smearing in $9.5 \times 10^4$ sheets | no smearing in $9.5 \times 10^4$ sheets |
| Example 9 | specific polyamide resin 1 | M-3 | no smearing in $9.5 \times 10^4$ sheets | no smearing in $9.5 \times 10^4$ sheets | no smearing in $9.5 \times 10^4$ sheets |
| Example 10 | specific polyamide resin 3 | M-2 | no smearing in $10.5 \times 10^4$ sheets | no smearing in $10.5 \times 10^4$ sheets | no smearing in $10.5 \times 10^4$ sheets |
| Example 11 | specific polyamide resin 4 | M-2 | no smearing in $10.6 \times 10^4$ sheets | no smearing in $10.6 \times 10^4$ sheets | no smearing in $10.6 \times 10^4$ sheets |
| Example 12 | specific polyamide resin 11 | M-2 | no smearing in $6.0 \times 10^4$ sheets | no smearing in $6.0 \times 10^4$ sheets | no smearing in $6.0 \times 10^4$ sheets |
| Example 13 | specific polyamide resin 10 | M-3 | no smearing in $9.7 \times 10^4$ sheets | no smearing in $9.7 \times 10^4$ sheets | no smearing in $9.7 \times 10^4$ sheets |
| Comparative Example 3 | P-1 | M-2 | no smearing in $4.0 \times 10^4$ sheets | smearing in $4.0 \times 10^4$ sheets | smearing in $3.5 \times 10^4$ sheets |
| Comparative Example 4 | P-2 | M-2 | no smearing in $5.0 \times 10^4$ sheets | smearing in $5.0 \times 10^4$ sheets | smearing in $2.5 \times 10^4$ sheets |

Examples 14 to 22 and Comparative Examples 5 and 6

(Formation of Undercoat Layer)

A liquid composition (sol liquid) was prepared by the SG method in the following manner, and applied to the same aluminum base as in Example 1 to form an undercoat layer.

<Sol Liquid Composition>

| | |
|---|---|
| Methanol | 130 g |
| Water | 20 g |
| 85 wt % Phosphoric acid | 16 g |
| Tetraethoxysilane | 50 g |
| 3-Methacryloxypropyltrimethoxysilane | 60 g |

The sol liquid composition was mixed and stirred. Heat generation began to be observed in about 5 minutes. After the mixture was allowed to react for 60 minutes, the contents were transferred to another vessel and 3,000 g of methanol was added thereto. Thus, a sol liquid was obtained.

This sol liquid was diluted with methanol/ethylene glycol=9/1 (by weight). The resultant dilution was applied to the same base as in Example 1 in such an amount that the amount of silicon deposited on the base became 30 mg/m$^2$. The coating was dried at 100° C. for 1 minute to form an undercoat layer.

(Formation of Recording Layer)

Recording layer coating fluid 3, which had the following composition, was applied with a wire-wound bar to the undercoated aluminum base. This coating was dried in a hot-air drying oven at 115° C. for 45 seconds to form a recording layer. The amount of the recording layer after the drying was in the range of 1.2-1.3 g/m$^2$. Furthermore, the same overcoating fluid as in Example 1 was applied with a slide hopper and the coating was dried in a hot-air drying oven at 120° C. for 75 seconds. Thus, lithographic printing plate precursors were obtained. The amount of the overcoat layer formed was 2.3 g/m$^2$.

<Recording Layer Coating Fluid 3>

| | |
|---|---|
| Ingredient (A): binder polymer (compound shown in Table 4) | 2.00 g |
| Ingredient (B): infrared absorber (compound shown in Table 4) | 0.08 g |
| Ingredient (C): radical polymerization initiator (compound shown in Table 4) | 0.35 g |
| Ingredient (D): radical-polymerizable compound "M-1" (having the structure shown above) | 2.00 g |
| Naphthalenesulfonate of Victoria Pure Blue | 0.04 g |
| Fluorochemical surfactant (Megafac F-176, manufactured by Dainippon Ink & Chemicals Inc.) | 0.01 g |
| Methyl ethyl ketone | 9.0 g |
| Methanol | 10.0 g |
| 1-Methoxy-2-propanol | 8.0 g |

(Exposure and Development)

The negative type lithographic printing plate precursors obtained were exposed with an infrared laser and developed in the same manner as in Example 1 to obtain lithographic printing plates.

Evaluation of Sensitivity, Printing Durability, Non-Smearing Property of Nonimage Area, and Storage Stability The lithographic printing plates obtained were evaluated for sensitivity in the same manner as in Example 1.

Furthermore, the lithographic printing plate precursors obtained were evaluated for printing durability and non-smearing properties of nonimage areas (storage stability) in the same manner as in Example 7. The results obtained are also shown in Table 4.

TABLE 4

| | Binder polymer | Radical initiator | Infrared absorber | Sensitivity (mJ/cm$^2$) | Printing durability/Non-smearing property of nonimage area | | |
|---|---|---|---|---|---|---|---|
| | | | | | Without accelerated aging | 60° C., 3 days | 45° C., 75% RH, 3 days |
| Example 14 | specific polyamide resin 4 | S-2 | IR-1 | 40 | no smearing in 10.0 × 10$^4$ sheets | no smearing in 10.0 × 10$^4$ sheets | no smearing in 10.0 × 10$^4$ sheets |
| Example 15 | specific polyamide resin 4 | S-4 | IR-1 | 40 | no smearing in 8.0 × 10$^4$ sheets | no smearing in 8.0 × 10$^4$ sheets | no smearing in 8.0 × 10$^4$ sheets |
| Example 16 | specific polyamide resin 4 | S-4 | IR-2 | 40 | no smearing in 8.5 × 10$^4$ sheets | no smearing in 8.5 × 10$^4$ sheets | no smearing in 8.5 × 10$^4$ sheets |
| Example 17 | specific polyamide resin 4 | S-5 | IR-3 | 45 | no smearing in 8.5 × 10$^4$ sheets | no smearing in 8.5 × 10$^4$ sheets | no smearing in 8.5 × 10$^4$ sheets |
| Example 18 | specific polyamide | S-6 | IR-1 | 40 | no smearing | no smearing | no smearing |

TABLE 4-continued

| | Binder polymer | Radical initiator | Infrared absorber | Sensitivity (mJ/cm$^2$) | Printing durability/Non-smearing property of nonimage area | | |
|---|---|---|---|---|---|---|---|
| | | | | | Without accelerated aging | 60° C., 3 days | 45° C., 75% RH, 3 days |
| | resin 4 | | | | in 8.0 × 10$^4$ sheets | in 8.0 × 10$^4$ sheets | in 8.0 × 10$^4$ sheets |
| Example 19 | specific polyamide resin 5 | S-2 | IR-1 | 38 | no smearing in 12.0 × 10$^4$ sheets | no smearing in 12.0 × 10$^4$ sheets | no smearing in 12.0 × 10$^4$ sheets |
| Example 20 | specific polyamide resin 12 | S-2 | IR-1 | 38 | no smearing in 10.0 × 10$^4$ sheets | no smearing in 10.0 × 10$^4$ sheets | no smearing in 10.0 × 10$^4$ sheets |
| Example 21 | specific polyamide resin 13 | S-2 | IR-1 | 40 | no smearing in 11.0 × 10$^4$ sheets | no smearing in 11.0 × 10$^4$ sheets | no smearing in 11.0 × 10$^4$ sheets |
| Example 22 | specific polyamide resin 6 | S-2 | IR-1 | 45 | no smearing in 8.0 × 10$^4$ sheets | no smearing in 8.0 × 10$^4$ sheets | no smearing in 8.0 × 10$^4$ sheets |
| Comparative Example 5 | P-2 | S-4 | IR-1 | 50 | no smearing in 6.0 × 10$^4$ sheets | no smearing in 6.0 × 10$^4$ sheets | smearing in 3.5 × 10$^4$ sheets |
| Comparative Example 6 | P-1 | S-4 | IR-2 | 55 | no smearing in 3.0 × 10$^4$ sheets | no smearing in 3.0 × 10$^4$ sheets | no smearing in 3.0 × 10$^4$ sheets |

As Table 4 shows, the lithographic printing plates of Examples 14-22, for which specific polyamide resins according to the invention had been added, were ascertained to be superior in sensitivity and printing durability to the lithographic printing plates of Comparative Examples 5 and 6, for which no specific polyamide resin according to the invention had been added. In addition, the printing plate precursors obtained in Examples 14-22 were ascertained to have excellent storage stability because the nonimage areas of the printing plates obtained therefrom after the accelerated aging caused no smearing.

Examples 23 to 26 and Comparative Example 7

(Formation of Undercoat Layer)
The same aluminum base as in Example 1 was subjected to a silicate treatment in order to secure the hydrophilicity required of nonimage areas of a printing plate. In the treatment, the aluminum web was conveyed through a 1.5% aqueous solution of #3 sodium silicate kept at 70° C., in such a manner that the web was in contact with the solution for 15 seconds. The web was then washed with water. The amount of silicon thus deposited was 10 mg/m$^2$. The base thus produced had a value of Ra (center-line surface roughness) of 0.25 μm.

(Formation of Recording Layer)
Recording layer coating fluid 4, which had the following composition, was applied with a wire-wound bar to the undercoated aluminum base. This coating was dried in a hot-air drying oven at 115° C. for 45 seconds to form a recording layer. The amount of the recording layer after the drying was in the range of 1.2-1.3 g/m$^2$. Furthermore, the same overcoating fluid as in Example 1 was applied with a slide hopper and the coating was dried in a hot-air drying oven at 120° C. for 75 seconds. Thus, lithographic printing plate precursors were obtained. The amount of the overcoat layer formed was 2.3 g/m$^2$.

<Recording Layer Coating Fluid 4>

| | |
|---|---|
| Ingredient (A): binder polymer (compound shown in Table 5) | 2.10 g |
| Ingredient (B): infrared absorber "IR-1" (having the structure shown above) | 0.06 g |
| Ingredient (C): radical polymerization initiator "S-1" (having the structure shown above) | 0.40 g |
| Ingredient (D): radical-polymerizable compound "M-2" (having the structure shown above) | 1.80 g |
| Sensitization aid "Z-1" (having the structure shown below) | 0.08 g |
| Naphthalenesulfonate of Victoria Pure Blue | 0.04 g |
| Fluorochemical surfactant (Megafac F-176, manufactured by Dainippon Ink & Chemicals Inc.) | 0.01 g |
| Methyl ethyl ketone | 9.0 g |
| Methanol | 10.0 g |
| 1-Methoxy-2-propanol | 8.0 g |

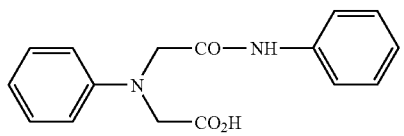

Z-1

(Exposure and Development)

The negative type lithographic printing plate precursors obtained were exposed with an infrared laser and developed in the same manner as in Example 1 to obtain lithographic printing plates.

[Evaluation of Printing Durability and Sensitivity]

The lithographic printing plates obtained were evaluated for printing durability and sensitivity in the same manner as in Example 1. The results obtained are also shown in Table 5.

TABLE 5

|  | Binder polymer | Sensitivity (mJ/cm$^2$) | Printing durability (number of sheets, ×10$^4$) |
| --- | --- | --- | --- |
| Example 23 | specific polyamide resin 1 | 70 | 8.5 |
| Example 24 | specific polyamide resin 6 | 65 | 8.3 |
| Example 25 | specific polyamide resin 14 | 55 | 9.0 |
| Example 26 | specific polyamide resin 5 | 50 | 9.2 |
| Comparative Example 7 | P-3 | 110 | 4.2 |

As Table 5 shows, the lithographic printing plates of Examples 23-26, for which specific polyamide resins according to the invention had been added, were superior in printing durability and sensitivity to the lithographic printing plate of Comparative Example 7, for which no specific polyamide resin according to the invention had been added.

As demonstrated by the Examples given above, the polymerizable compositions of the invention, which each contained a specific polyamide resin as a binder polymer, were found to be excellent in printing durability, sensitivity, and storage stability and useful as the image-recording layer of a lithographic printing plate precursor.

(Synthesis Example for Specific Polyester Resins 2-1 to 2-12)

To a mixture of a dicarboxylic acid ingredient and a diol ingredient (each of the compositions shown in Tables 2-2 and 2-3) was added 0.5 wt % dibutyltin dilaurate. The resultant mixture was heated to 180° C. and reacted for 3 hours with stirring in a nitrogen gas atmosphere. At that temperature, the pressure inside the reactor was reduced to 50 mmHg and the contents were heated with stirring for further 3 hours while removing the distillate. After the temperature of the reactor was returned to room temperature, N, N-dimethylacetamide was added as a solvent to the contents to obtain a 60 wt % solution. Thereafter, the tetracarboxylic dianhydride shown in Tables 2-2 and 2-3 was added thereto with stirring. The resultant mixture was heated to 110° C. and reacted for 8 hours, and then diluted with methyl ethyl ketone to give a 20 wt % solution.

Thus, specific polyester resins 2-1 to 2-12 were obtained.

TABLE 2-2

|  |  | Polyester resin | | | | | |
| --- | --- | --- | --- | --- | --- | --- | --- |
|  |  | 1 | 2 | 3 | 4 | 5 | 6 |
| Dicarboxylic acid ingredient | succinic anhydride | 50.0 g |  |  |  |  | 50.0 g |
|  | phthalic anhydride |  | 74.1 g |  | 74.1 g |  |  |
|  | hexahydrophthalic anhydride |  |  | 77.1 g |  | 77.1 g |  |
| Diol ingredient | bisphenol A | 91.3 g | 68.5 g |  |  |  | 45.7 g |
|  | HO—(CH$_2$)$_4$—OH |  |  | 18.0 g |  |  | 27.0 g |

TABLE 2-2-continued
| | | Polyester resin | | | | | |
|---|---|---|---|---|---|---|---|
| | | 1 | 2 | 3 | 4 | 5 | 6 |
| | 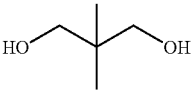 | 20.8 g | | | 41.7 g | | |
| |  | | 43.3 g | 57.7 g | | | 28.8 g |
| | 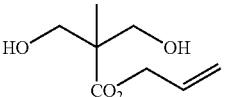 | | | | 34.8 g | | |
| | 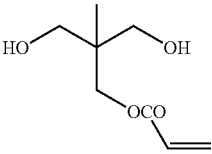 | | | | | 52.3 g | |
| | 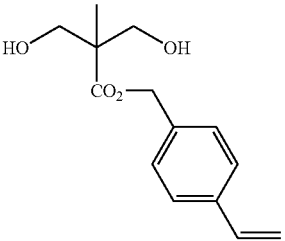 | | | | | | 50.1 g |
| Tetra-carboxylic anhydride | 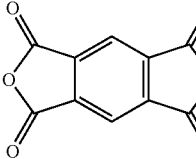 | 11.4 g | 12.8 g | 10.5 g | 8.4 g | 8.4 g | 12.2 g |
| Weight-average molecular weight | | 45,000 | 52,000 | 35,000 | 33,000 | 75,000 | 68,000 |
TABLE 2-3
| | | Polyester resin | | | | | |
|---|---|---|---|---|---|---|---|
| | | 7 | 8 | 9 | 10 | 11 | 12 |
| Dicarboxylic acid ingredient | 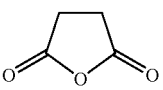 | | | 50.0 g | | | 50.0 g |
| | 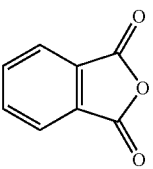 | 74.1 g | | | 74.1 g | | |

TABLE 2-3-continued

| | | Polyester resin | | | | | |
|---|---|---|---|---|---|---|---|
| | | 7 | 8 | 9 | 10 | 11 | 12 |
| | 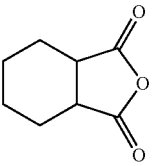 | | 77.1 g | | | 77.1 g | |
| Diol ingredient | 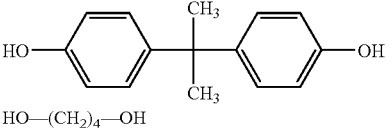 | | | 114.1 g | | 136.9 g | |
| | HO—(CH$_2$)$_4$—OH | | | | 9.0 g | | |
| | 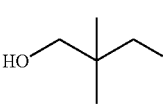 | | 20.8 g | | | | 10.4 g |
| |  | | 43.3 g | | 14.4 g | | 28.8 g |
| | 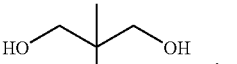 | 104.5 g | | | | | 52.3 g |
| | 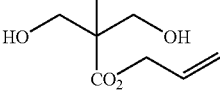 | | | 17.4 g | 69.7 g | | |
| | 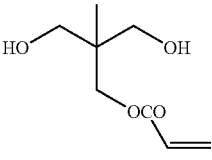 | | | | 150.2 g | | |
| Tetra-carboxylic anhydride | 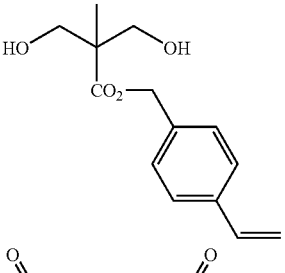 | 7.9 g | 6.2 g | 10.5 g | 13.4 g | 16.2 g | 12.2 g |
| Weight-average molecular weight | | 49,000 | 32,000 | 32,000 | 33,000 | 75,000 | 63,000 |

(Production of Base)

A melt of a JIS A1050 alloy comprising at least 99.5% aluminum, 0.30% iron, 0.10% silicon, 0.02% titanium, and 0.013% copper was subjected to a cleaning treatment and cast. In the cleaning treatment, a degassing treatment and a ceramic tube filter treatment were performed in order to remove unnecessary gases, e.g., hydrogen. The casting was conducted by the DC casting method. The solidified platy cast having a thickness of 500 mm was faced to remove a surface layer having a thickness of 10 mm, and then subjected to a 10-hour homogenizing treatment at 550° C. so as to prevent intermetallic compounds from enlarging.

Subsequently, the cast was hot-rolled at 400° C., subjected to process annealing at 500° C. for 60 seconds in a continuous annealing furnace, and then cold-rolled to obtain a rolled aluminum sheet having a thickness of 0.30 mm. The center-line average surface roughness Ra after the cold rolling was regulated to 0.2 μm by regulating the surface roughness of the rolls. Thereafter, the aluminum sheet was processed with a tension leveler in order to improve flatness.

Thereafter, the aluminum sheet was subjected to surface treatments in order to obtain a lithographic printing plate base.

First, a degreasing treatment with 10% aqueous sodium aluminate solution was conducted at 50° C. for 30 seconds in order to remove the rolling oil remaining on the aluminum sheet surface. The degreased aluminum sheet was treated with 30% aqueous sulfuric acid solution at 50° C. for 30 seconds for neutralization and smut removal.

The so-called graining was then conducted. In this treatment, the base surface was roughened in the following manner for the purpose of attaining satisfactory adhesion of a recording layer to the base and imparting water retentivity to nonimage areas. An aqueous solution containing 1% nitric acid and 0.5% aluminum nitrate was kept at 45° C. While the aluminum web was kept being conveyed in the aqueous solution, electricity having an alternating waveform was supplied thereto in a quantity on the anode side of 240 C/dm$^2$ at a current density of 20 A/dm$^2$ and a duty ratio of 1:1 by means of an indirect feeder cell to thereby conduct graining. Thereafter, the web was etched with 10% aqueous sodium aluminate solution at 50° C. for 30 seconds and then treated with 30% aqueous sulfuric acid solution at 50° C. for 30 seconds for neutralization and smut removal.

The resultant base was further anodized to form an oxide film thereon in order to improve wearing resistance, chemical resistance, and water retentivity. A 20% aqueous sulfuric acid solution was used at 35° C. as an electrolyte. While the aluminum web was kept being conveyed through the electrolyte, it was treated with electrolysis by permitting a direct current to flow at 14 A/dm$^2$ by means of an indirect feeder cell. Thus, an anodization film was deposited in an amount of 2.5 g/m$^2$.

Examples 2-1 to 2-6 and Comparative Examples 2-1 and 2-2

(Formation of Recording Layer)

Recording layer coating fluid 1, which had the following composition, was prepared and applied with a wire-wound bar to the aluminum base obtained in the manner described above. The coating was dried in a hot-air drying oven at 115° C. for 45 seconds to form a recording layer. The amount of the coating after the drying was in the range of 1.2-1.3 g/m$^2$. Furthermore, an overcoarting fluid having the following composition was applied with a slide hopper and the coating was dried in a hot-air drying oven at 120° C. for 75 seconds. Thus, lithographic printing plate precursors according to the invention were obtained. The amount of the overcoat layer formed was 2.3 g/m$^2$.

<Recording Layer Coating Fluid 2-1>

| | |
|---|---|
| Ingredient (A): binder polymer (compound shown in Table 2-4) | 2.00 g |
| Ingredient (B): infrared absorber "IR-1" (having the structure shown below) | 0.08 g |
| Ingredient (C): radical polymerization initiator "S-1" (having the structure shown below) | 0.35 g |
| Ingredient (D): radical-polymerizable compound (compound shown in Table 2-4) | 2.00 g |
| Naphthalenesulfonate of Victoria Pure Blue | 0.04 g |
| Fluorochemical surfactant (Megafac F-176, manufactured by Dainippon Ink & Chemicals Inc.) | 0.01 g |
| Methyl ethyl ketone | 9.0 g |
| Methanol | 10.0 g |
| 1-Methoxy-2-propanol | 8.0 g |

<Overcoating Fluid>

| | |
|---|---|
| Poly(vinyl alcohol) (degree of saponification, 98.5 mol %; degree of polymerization, 500) | 2.5 g |
| Polyvinylpyrrolidone (K30, manufactured by Tokyo Kasei Kogyo Co., Ltd.; molecular weight, 40,000) | 0.5 g |
| Nonionic surfactant (EMAREX NP-10, manufactured by Nihon Emulsion Co., Ltd.) | 0.05 g |
| Ion-exchanged water | 96.95 g |

Incidentally, the binder polymers used as ingredient (A) in the Examples 2-1 to 2-26 are some of the specific polyester resins (A) synthesized in the Synthesis Example, while the binder polymers used in the Comparative Examples 2-1 to 2-7 are binder polymers (P-1) to (P-3) having the following structures, use of which is outside the scope of the invention.

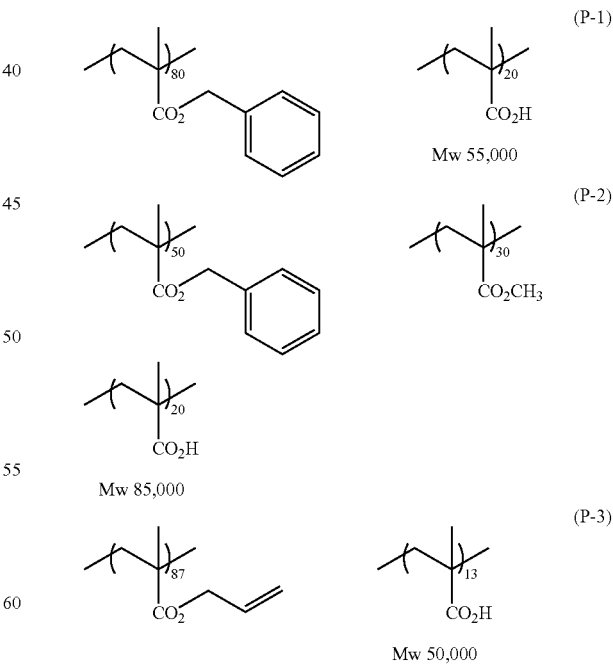

The structures of infrared absorbers (IR-1) to (IR-3), which were used in the Examples according to the invention and in the Comparative Examples, are shown below.

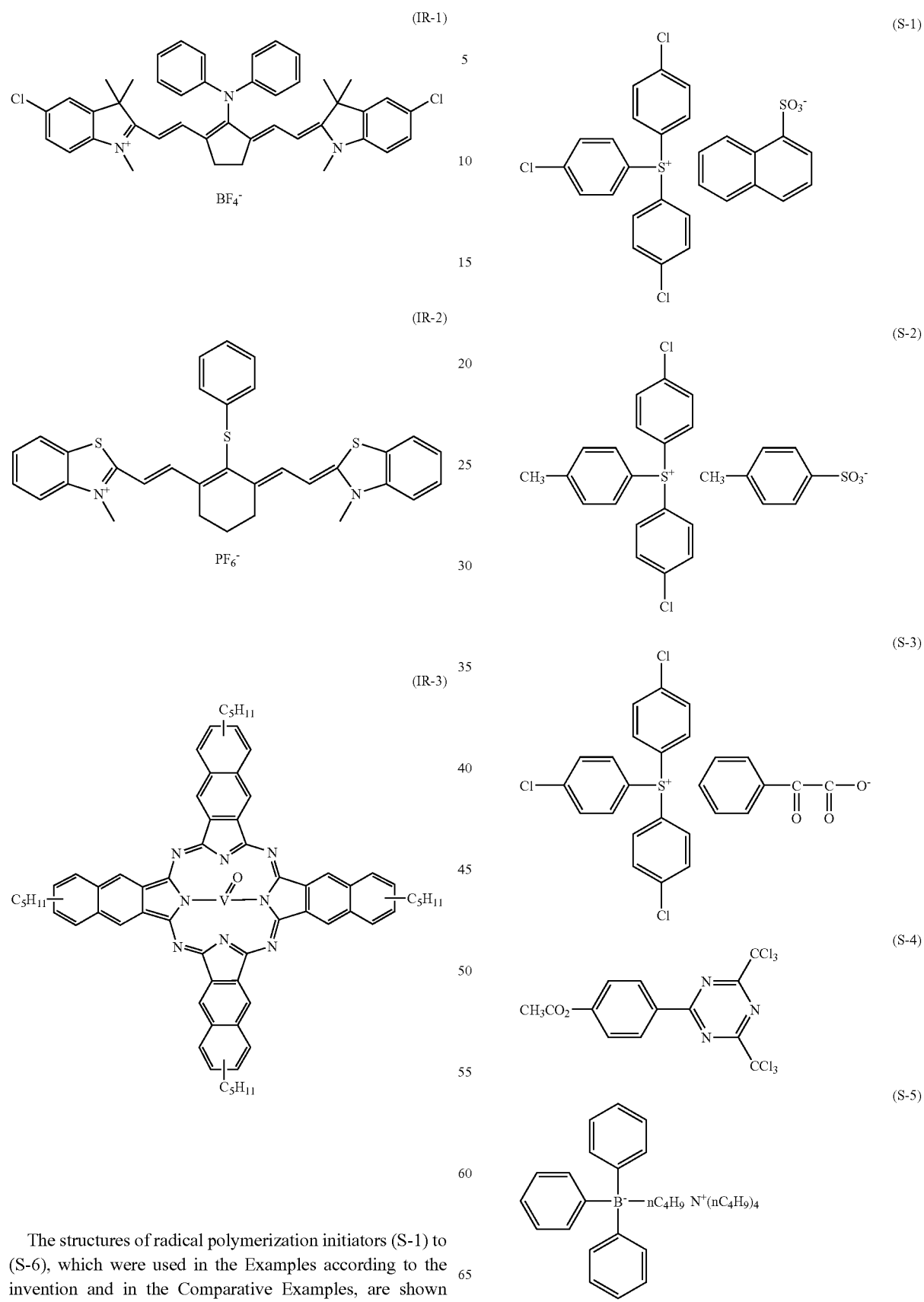
The structures of radical polymerization initiators (S-1) to (S-6), which were used in the Examples according to the invention and in the Comparative Examples, are shown below.

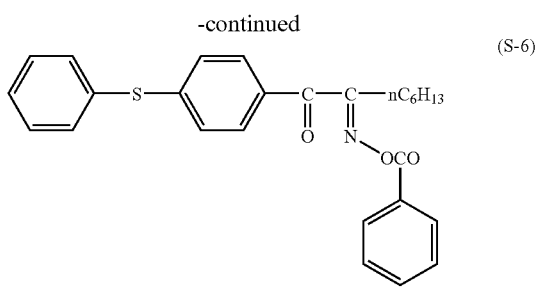
(S-6)

The structures of radical-polymerizable compounds (M-1) to (M-3), which were used in the Examples according to the invention and in the Comparative Examples, are shown below.

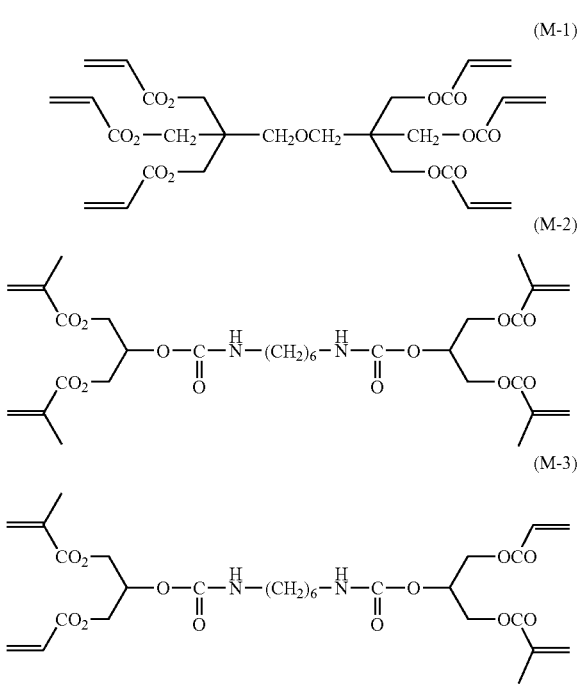

(Exposure)

Each of the negative type lithographic printing plate precursors obtained was exposed with Trendsetter 3244VFS, manufactured by Creo Co., Ltd. and equipped with a 40-W infrared semiconductor laser of the water cooling type. The exposure was conducted under the conditions of an output of 9 W, outer-drum revolution speed of 210 rpm, plate surface energy of 100 mJ/cm$^2$, and resolution of 2,400 dpi.

(Development)

After the exposure, the printing plate precursor was developed using automatic processor Stablon 900N, manufactured by Fuji Photo Film Co., Ltd. The developing solution used as a developing solution fed initially and also as a replenisher was a dilution prepared by diluting DV-2, manufactured by Fuji Photo Film Co., Ltd., with water in a ratio of 1:4. The temperature of the developing bath was regulated to 30° C. As a finisher was used a dilution (pH=10.8) prepared by diluting FN-6, manufactured by Fuji Photo Film Co., Ltd., with water in a ratio of 1:1.

[Evaluation of Printing Durability]

The lithographic printing plate obtained was attached to printing machine R201, manufactured by Roland Co., to conduct printing with ink GEOS-G(N), manufactured by Dainippon Ink & Chemicals Inc. The solid-image part of each printed matter was examined. The printing durability of the printing plate was evaluated in terms of the number of printed sheets obtained by the time when the image began to be blurred. The larger the number, the better the printing durability. The results obtained are also shown in Table 2-4.

[Evaluation of Sensitivity]

The amount of energy necessary for recording was calculated from the line widths of the image obtained through the exposure (with an infrared laser emitting a light having a wavelength of about 830-850 nm) and development described above and from the laser output, loss in the optical system, and scanning speed. The smaller the value of energy amount, the higher the sensitivity. The results obtained are also shown in Table 2-4.

TABLE 2-4

| | Binder polymer | Polymerizable compound | Sensitivity (mJ/cm$^2$) | Printing durability (number of sheets, ×10$^4$) |
|---|---|---|---|---|
| Example 2-1 | specific polyester resin 1 | M-1 | 70 | 6.2 |
| Example 2-2 | specific polyester resin 1 | M-2 | 60 | 7.2 |
| Example 2-3 | specific polyester resin 1 | M-3 | 55 | 8.5 |
| Example 2-4 | specific polyester resin 2 | M-2 | 60 | 9.1 |
| Example 2-5 | specific polyester resin 5 | M-2 | 55 | 7.3 |
| Example 2-6 | specific polyester resin 10 | M-3 | 40 | 9.8 |
| Comparative Example 2-1 | P-1 | M-1 | 100 | 3.2 |
| Comparative Example 2-2 | P-1 | M-2 | 100 | 2.7 |

As Table 2-4 shows, the lithographic printing plates of Examples 2-1 to 2-6, for which specific polyester resins according to the invention had been added, were found to be superior in printing durability and sensitivity to the lithographic printing plates of Comparative Examples 2-1 and 2-2, for which no specific polyester resin according to the invention had been added.

Examples 2-7 to 2-13 and Comparative Examples 2-3 and 2-4

(Formation of Undercoat Layer)

An undercoating fluid having the following composition was applied with a wire-wound bar to the same aluminum base as in Example 2-1. The coating was dried in a hot-air drying oven at 90° C. for 30 seconds. The amount of the coating after the drying was 10 mg/m$^2$.

<Undercoating Fluid>

| | |
|---|---|
| β-Alanine | 0.1 g |
| Phenylphosphonic acid | 0.1 g |
| Methanol | 40 g |
| Pure water | 60 g |

(Formation of Recording Layer)

Subsequently, recording layer coating fluid 2-2, which had the following composition, was prepared and applied with a wire-wound bar to the undercoated aluminum sheet. This coating was dried in a hot-air drying oven at 115° C. for 45 seconds to form a recording layer. The amount of the recording layer after the drying was in the range of 1.2-1.3 g/m$^2$. Furthermore, the same overcoating fluid as in Example 2-1 was applied with a slide hopper and the coating was dried in a hot-air drying oven at 120° C. for 75 seconds. Thus, lithographic printing plate precursors were obtained. The amount of the overcoat layer formed was 2.3 g/m$^2$.

<Recording Layer Coating Fluid 2-2>

| | |
|---|---|
| Ingredient (A): binder polymer (compound shown in Table 2-5) | 2.10 g |
| Ingredient (B): infrared absorber "IR-1" (having the structure shown above) | 0.08 g |
| Ingredient (C): radical polymerization initiator "S-2" (having the structure shown above) | 0.35 g |
| Ingredient (D): radical-polymerizable compound (compound shown in Table 2-5) | 1.90 g |
| Naphthalenesulfonate of Victoria Pure Blue | 0.04 g |
| Fluorochemical surfactant (Megafac F-176, manufactured by Dainippon Ink & Chemicals Inc.) | 0.01 g |
| Methyl ethyl ketone | 9.0 g |
| Methanol | 10.0 g |
| 1-Methoxy-2-propanol | 8.0 g |

(Exposure and Development)

The negative type lithographic printing plate precursors obtained were exposed with an infrared laser and developed in the same manner as in Example 2-1 to obtain lithographic printing plates.

[Evaluation of Printing Durability, Non-Smearing Property of Nonimage Area, and Storage Stability]

Each of the lithographic printing plates obtained was attached to printing machine Lithrone, manufactured by Komori Corp., to conduct printing using black ink DIC-GEOS(N), manufactured by Dainippon Ink & Chemicals Inc. Whether the printed sheets retained a sufficient ink density was visually examined, and printing durability and the non-smearing properties of the nonimage areas were evaluated in terms of the number of printed sheets retaining a sufficient ink density.

Furthermore, each of the lithographic printing plate precursors obtained was subjected to an accelerated aging test in which the precursor was stored at 60° C. for 3 days or stored at 45° C. and 75% RH for 3 days. Thereafter, the precursor was exposed and developed in the same manner as in Example 2-1, and the printing plate obtained was used to conduct printing in the same manner to evaluate printing durability and the non-smearing properties of nonimage areas (storage stability). The results obtained are also shown in Table 2-5.

TABLE 2-5

| | | | Printing durability/Non-smearing property of nonimage area | | |
|---|---|---|---|---|---|
| | Binder polymer | Polymerizable compound | Without accelerated aging | 60° C., 3 days | 45° C., 75% RH, 3 days |
| Example 2-7 | specific polyester resin 1 | M-1 | no smearing in 9.5 × 10$^4$ sheets | no smearing in 9.5 × 10$^4$ sheets | no smearing in 9.5 × 10$^4$ sheets |
| Example 2-8 | specific polyester resin 1 | M-2 | no smearing in 9.5 × 10$^4$ sheets | no smearing in 9.5 × 10$^4$ sheets | no smearing in 9.5 × 10$^4$ sheets |
| Example 2-9 | specific polyester resin 1 | M-3 | no smearing in 9.5 × 10$^4$ sheets | no smearing in 9.5 × 10$^4$ sheets | no smearing in 9.5 × 10$^4$ sheets |
| Example 2-10 | specific polyester resin 6 | M-2 | no smearing in 10.5 × 10$^4$ sheets | no smearing in 10.5 × 10$^4$ sheets | no smearing in 10.5 × 10$^4$ sheets |
| Example 2-11 | specific polyester resin 7 | M-2 | no smearing in 10.6 × 10$^4$ sheets | no smearing in 10.6 × 10$^4$ sheets | no smearing in 10.6 × 10$^4$ sheets |
| Example 2-12 | specific polyester resin 11 | M-2 | no smearing in 6.0 × 10$^4$ sheets | no smearing in 6.0 × 10$^4$ sheets | no smearing in 6.0 × 10$^4$ sheets |

TABLE 2-5-continued

| | Binder polymer | Polymerizable compound | Printing durability/Non-smearing property of nonimage area | | |
|---|---|---|---|---|---|
| | | | Without accelerated aging | 60° C., 3 days | 45° C., 75% RH, 3 days |
| Example 2-13 | specific polyester resin 4 | M-3 | no smearing in $9.7 \times 10^4$ sheets | no smearing in $9.7 \times 10^4$ sheets | no smearing in $9.7 \times 10^4$ sheets |
| Comparative Example 2-3 | P-1 | M-2 | no smearing in $4.0 \times 10^4$ sheets | smearing in $4.0 \times 10^4$ sheets | smearing in $3.5 \times 10^4$ sheets |
| Comparative Example 2-4 | P-2 | M-2 | no smearing in $5.0 \times 10^4$ sheets | smearing in $5.0 \times 10^4$ sheets | smearing in $2.5 \times 10^4$ sheets |

As Table 2-5 shows, the lithographic printing plates of Examples 2-7 to 2-13, for which specific polyester resins according to the invention had been added, were ascertained to be superior in printing durability to the lithographic printing plates of Comparative Examples 2-3 and 2-4, for which no specific polyester resin according to the invention had been added. In addition, the printing plate precursors obtained in Examples 2-7 to 2-13 were ascertained to have excellent storage stability because the nonimage areas of the printing plates obtained therefrom after the accelerated aging caused no smearing.

Examples 2-14 to 2-22 and Comparative Examples 2-5 and 2-6

(Formation of Undercoat Layer)

A liquid composition (sol liquid) was prepared by the SG method in the following manner, and applied to the same aluminum base as in Example 2-1 to form an undercoat layer.

<Sol Liquid Composition>

| Methanol | 130 g |
|---|---|
| Water | 20 g |
| 85 wt % Phosphoric acid | 16 g |
| Tetraethoxysilane | 50 g |
| 3-Methacryloxypropyltrimethoxysilane | 60 g |

The sol liquid composition was mixed and stirred. Heat generation began to be observed in about 5 minutes. After the mixture was allowed to react for 60 minutes, the contents were transferred to another vessel and 3,000 g of methanol was added thereto. Thus, a sol liquid was obtained.

This sol liquid was diluted with methanol/ethylene glycol=9/1 (by weight). The resultant dilution was applied to the same base as in Example 1 in such an amount that the amount of silicon deposited on the base became 30 mg/m². The coating was dried at 100° C. for 1 minute to form an undercoat layer.

(Formation of Recording Layer)

Recording layer coating fluid 2-3, which had the following composition, was applied with a wire-wound bar to the undercoated aluminum base. This coating was dried in a hot-air drying oven at 115° C. for 45 seconds to form a recording layer. The amount of the recording layer after the drying was in the range of 1.2-1.3 g/m². Furthermore, the same overcoating fluid as in Example 2-1 was applied with a slide hopper and the coating was dried in a hot-air drying oven at 120° C. for 75 seconds. Thus, lithographic printing plate precursors were obtained. The amount of the overcoat layer formed was 2.3 g/m².

<Recording Layer Coating Fluid 2-3>

| Ingredient (A): binder polymer (compound shown in Table 2-6) | 2.00 g |
|---|---|
| Ingredient (B): infrared absorber (compound shown in Table 2-6) | 0.08 g |
| Ingredient (C): radical polymerization initiator (compound shown in Table 2-6) | 0.35 g |
| Ingredient (D): radical-polymerizable compound "M-1" (having the structure shown above) | 2.00 g |
| Naphthalenesulfonate of Victoria Pure Blue | 0.04 g |
| Fluorochemical surfactant (Megafac F-176, manufactured by Dainippon Ink & Chemicals Inc.) | 0.01 g |
| Methyl ethyl ketone | 9.0 g |
| Methanol | 10.0 g |
| 1-Methoxy-2-propanol | 8.0 g |

(Exposure and Development)

The negative type lithographic printing plate precursors obtained were exposed with an infrared laser and developed in the same manner as in Example 2-1 to obtain lithographic printing plates.

[Evaluation of Sensitivity, Non-Smearing Property of Nonimage Area, and Storage Stability]

The lithographic printing plates obtained were evaluated for sensitivity in the same manner as in Example 2-1.

Furthermore, the lithographic printing plate precursors obtained were evaluated for non-smearing properties of nonimage areas (storage stability) in the same manner as in Example 2-7. The results obtained are also shown in Table 2-6.

TABLE 2-6

| | Binder polymer | Radical initiator | Infrared absorber | Sensitivity (mJ/cm$^2$) | Printing durability/Non-smearing property of nonimage area | | |
|---|---|---|---|---|---|---|---|
| | | | | | Without accelerated aging | 60° C., 3 days | 45° C., 75% RH, 3 days |
| Example 2-14 | specific polyester resin 4 | S-2 | IR-1 | 40 | no smearing in 10.0 × 10$^4$ sheets | no smearing in 10.0 × 10$^4$ sheets | no smearing in 10.0 × 10$^4$ sheets |
| Example 2-15 | specific polyester resin 4 | S-4 | IR-1 | 40 | no smearing in 8.0 × 10$^4$ sheets | no smearing in 8.0 × 10$^4$ sheets | no smearing in 8.0 × 10$^4$ sheets |
| Example 2-16 | specific polyester resin 4 | S-4 | IR-2 | 40 | no smearing in 8.5 × 10$^4$ sheets | no smearing in 8.5 × 10$^4$ sheets | no smearing in 8.5 × 10$^4$ sheets |
| Example 2-17 | specific polyester resin 4 | S-5 | IR-3 | 45 | no smearing in 8.5 × 10$^4$ sheets | no smearing in 8.5 × 10$^4$ sheets | no smearing in 8.5 × 10$^4$ sheets |
| Example 2-18 | specific polyester resin 4 | S-6 | IR-1 | 40 | no smearing in 8.0 × 10$^4$ sheets | no smearing in 8.0 × 10$^4$ sheets | no smearing in 8.0 × 10$^4$ sheets |
| Example 2-19 | specific polyester resin 10 | S-2 | IR-1 | 38 | no smearing in 12.0 × 10$^4$ sheets | no smearing in 12.0 × 10$^4$ sheets | no smearing in 12.0 × 10$^4$ sheets |
| Example 2-20 | specific polyester resin 12 | S-2 | IR-1 | 38 | no smearing in 10.0 × 10$^4$ sheets | no smearing in 10.0 × 10$^4$ sheets | no smearing in 10.0 × 10$^4$ sheets |
| Example 2-21 | specific polyester resin 5 | S-2 | IR-1 | 40 | no smearing in 11.0 × 10$^4$ sheets | no smearing in 11.0 × 10$^4$ sheets | no smearing in 11.0 × 10$^4$ sheets |
| Example 2-22 | specific polyester resin 6 | S-2 | IR-1 | 45 | no smearing in 8.0 × 10$^4$ sheets | no smearing in 8.0 × 10$^4$ sheets | no smearing in 8.0 × 10$^4$ sheets |
| Comparative Example 2-5 | P-2 | S-4 | IR-1 | 50 | no smearing in 6.0 × 10$^4$ sheets | no smearing in 6.0 × 10$^4$ sheets | no smearing in 3.5 × 10$^4$ sheets |
| Comparative Example 2-6 | P-1 | S-4 | IR-2 | 55 | no smearing in 3.0 × 10$^4$ sheets | no smearing in 3.0 × 10$^4$ sheets | no smearing in 3.0 × 10$^4$ sheets |

As Table 2-6 shows, the lithographic printing plates of Examples 2-14 to 2-22, for which specific polyester resins according to the invention had been added, were ascertained to be superior in sensitivity and printing durability to the lithographic printing plates of Comparative Examples 2-5 and 2-6, for which no specific polyester resin according to the invention had been added. In addition, the printing plate precursors obtained in Examples 2-14 to 2-22 were ascertained to have excellent storage stability because the nonimage areas of the printing plates obtained therefrom after the accelerated aging caused no smearing.

Examples 2-23 to 2-26 and Comparative Example 2-7

(Formation of Undercoat Layer)

The same aluminum base as in Example 2-1 was subjected to a silicate treatment in order to secure the hydrophilicity required of nonimage areas of a printing plate. In the treatment, the aluminum web was conveyed through a 1.5% aqueous solution of #3 sodium silicate kept at 70° C., in such a manner that the web was in contact with the solution for 15 seconds. The web was the washed with water.

The amount of silicon thus deposited was 10 mg/m². The base thus produced had a value of Ra (center-line surface roughness) of 0.25 µm.

(Formation of Recording Layer)

Recording layer coating fluid 2-4, which had the following composition, was applied with a wire-wound bar to the undercoated aluminum base. This coating was dried in a hot-air drying oven at 115° C. for 45 seconds to form a recording layer. The amount of the recording layer after the drying was in the range of 1.2-1.3 g/m². Furthermore, the same overcoating fluid as in Example 2-1 was applied with a slide hopper and the coating was dried in a hot-air drying oven at 120° C. for 75 seconds. Thus, lithographic printing plate precursors were obtained. The amount of the overcoat layer formed was 2.3 g/m².

<Recording Layer Coating Fluid 2-4>

| | |
|---|---|
| Ingredient (A): binder polymer (compound shown in Table 2-7) | 2.10 g |
| Ingredient (B): infrared absorber "IR-1" (having the structure shown above) | 0.06 g |
| Ingredient (C): radical polymerization initiator "S-1" (having the structure shown above) | 0.40 g |
| Ingredient (D): radical-polymerizable compound "M-2" (having the structure shown above) | 1.80 g |
| Sensitization aid "Z-1" (having the structure shown above) | 0.08 g |
| Naphthalenesulfonate of Victoria Pure Blue | 0.04 g |
| Fluorochemical surfactant (Megafac F-176, manufactured by Dainippon Ink & Chemicals Inc.) | 0.01 g |
| Methyl ethyl ketone | 9.0 g |
| Methanol | 10.0 g |
| 1-Methoxy-2-propanol | 8.0 g |

(Exposure and Development)

The negative type lithographic printing plate precursors obtained were exposed with an infrared laser and developed in the same manner as in Example 1 to obtain lithographic printing plates.

[Evaluation of Printing Durability and Sensitivity]

The lithographic printing plates obtained were evaluated for printing durability and sensitivity in the same manner as in Example 2-1. The results obtained are also shown in Table 2-7.

TABLE 2-7

| | Binder polymer | Sensitivity (mJ/cm²) | Printing durability (number of sheets, ×10⁴) |
|---|---|---|---|
| Example 2-23 | specific polyester resin 2 | 70 | 8.5 |
| Example 2-24 | specific polyester resin 3 | 65 | 8.3 |
| Example 2-25 | specific polyester resin 7 | 55 | 9.0 |
| Example 2-26 | specific polyester resin 10 | 50 | 9.2 |
| Comparative Example 2-7 | P-3 | 110 | 4.2 |

As Table 2-7 shows, the lithographic printing plates of Examples 2-23 to 2-26, for which specific polyester resins according to the invention had been added, were superior in printing durability and sensitivity to the lithographic printing plate of Comparative Example 2-7, for which no specific polyester resin according to the invention had been added.

As demonstrated by the Examples given above, the polymerizable compositions of the invention, which each contained a specific polyester resin as a binder polymer, were found to be excellent in printing durability, sensitivity, and storage stability and useful as the image-recording layer of a lithographic printing plate precursor.

The polymerizable composition of the invention is usable in, e.g., image-recording materials in applications such as three-dimensional optical shaping, holography, lithographic printing plates, color proofs, photoresists, and color filters and in inks, coating materials, adhesives, and the like. This composition is expected to be advantageously used especially as the recording layer of a negative type lithographic printing plate precursor of the so-called direct platemaking type, from which a printing plate can be directly obtained with an infrared laser based on digital signals from, e.g., a computer.

This application is based on Japanese Patent application JP 2003-284336, filed Jul. 31, 2003, and Japanese Patent application JP 2003-284337, filed Jul. 31, 2003, the entire contents of which are hereby incorporated by reference, the same as if set forth at length.

What is claimed is:

1. A polymerizable composition comprising
   (A) a resin selected from the group consisting of a polyamide resin which is soluble or swells in water or aqueous alkali solutions and a polyester resin which is soluble or swells in water or aqueous alkali solutions,
   (B) an infrared absorber,
   (C) a radical polymerization initiator, and
   (D) a radical-polymerizable compound,
   wherein the resin (A) has carboxy groups in side chains thereof; and
   wherein the resin (A) has bonds represented by one of the following formulae (II) to (V) in side chains thereof:

Formula (II)

Formula (III)

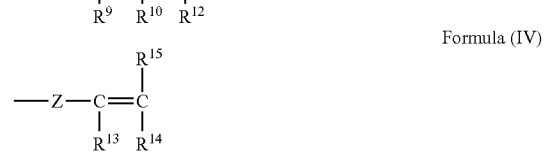

Formula (IV)

Formula (V)

wherein $R^5$ to $R^7$ each independently represents a hydrogen atom or a monovalent organic group; X represents an oxygen atom, a sulfur atom, or —N($R^{17}$)—, in which $R^{17}$ represents a hydrogen atom or a monovalent organic group; $R^8$ to $R^{12}$ each independently represents a hydrogen atom or a monovalent organic group; Y represents an oxygen atom, a sulfur atom, or —N($R^{18}$)—, in which $R^{18}$ represents a hydrogen atom or a monovalent organic group; $R^{13}$ to $R^{15}$ each independently represents a hydrogen atom or a monovalent organic group; Z represents an oxygen atom, a sulfur atom, —N($R^{19}$)—, or optionally substituted phenylene, in which $R^{19}$ represents a hydrogen atom or a monovalent organic group; $R^{16}$ represents a hydrogen atom or a monovalent organic group; and A represents an optionally substituted alkylene or optionally substituted phenylene group.

2. The polymerizable composition according to claim 1, wherein the content of carbon-carbon unsaturated bonds in the side chains of the resin (A) is 0.1 meq/g or higher.

3. The polymerizable composition according to claim 1, wherein the content of the carbon-carbon unsaturated bonds in the side chains of the resin (A) is 0.5-3.0 meq/g.

4. The polymerizable composition according to claim 1, wherein the resin (A) has ethylenic bonds in side chains thereof.

5. The polymerizable composition according to claim 1, wherein the resin (A) has a weight-average molecular weight is 5,000 or higher.

6. The polymerizable composition according to claim 1, wherein a content of the resin (A) in the polymerizable composition is 10-95% by weight.

7. The polymerizable composition according to claim 1, wherein a content of the resin (A) in the polymerizable composition is 30-85% by weight.

8. The polymerizable composition according to claim 1, wherein the resin (A) contains aromatic groups in an amount of 10% by weight or larger.

9. The polymerizable composition according to claim 1, wherein the resin (A) contains aromatic groups in an amount of 20% by weight or larger.

10. The polymerizable composition according to claim 1, wherein the ratio of the weight-average molecular weight of the resin (A) to the number-average molecular weight of the resin (A) is 1 or higher.

11. The polymerizable composition according to claim 1, wherein the ratio of the weight-average molecular weight of the resin (A) to the number-average molecular weight of the resin (A) is 1.1 to 10.

12. A lithographic printing plate precursor comprising an image-recording layer on a support, the image-recording layer containing a polymerizable composition according to claim 1.

* * * * *